(12) United States Patent
Shimoshikiryoh et al.

(10) Patent No.: US 11,243,438 B2
(45) Date of Patent: Feb. 8, 2022

(54) LIQUID CRYSTAL DISPLAY PANEL

(71) Applicant: SHARP KABUSHIKI KAISHA, Sakai (JP)

(72) Inventors: Fumikazu Shimoshikiryoh, Sakai (JP); Takehisa Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/110,642

(22) Filed: Dec. 3, 2020

(65) Prior Publication Data

US 2021/0116730 A1 Apr. 22, 2021

Related U.S. Application Data

(63) Continuation of application No. 15/760,825, filed as application No. PCT/JP2016/076733 on Sep. 12, 2016, now Pat. No. 10,871,679.

(30) Foreign Application Priority Data

Sep. 17, 2015 (JP) .................................. 2015-184341

(51) Int. Cl.
*G02F 1/1343* (2006.01)
*G02F 1/1337* (2006.01)
*G02F 1/1368* (2006.01)

(52) U.S. Cl.
CPC .......... *G02F 1/1337* (2013.01); *G02F 1/1343* (2013.01); *G02F 1/1368* (2013.01); *G02F 1/133746* (2021.01); *G02F 2201/123* (2013.01)

(58) Field of Classification Search
CPC .................................................. G02F 1/1337
See application file for complete search history.

(56) References Cited

U.S. PATENT DOCUMENTS

| RE45,283 E | 12/2014 | Shimoshikiryo |
| RE46,025 E | 6/2016 | Shimoshikiryo |

(Continued)

FOREIGN PATENT DOCUMENTS

| JP | 11-352486 A | 12/1999 |
| JP | 2004-062146 A | 2/2004 |

(Continued)

OTHER PUBLICATIONS

Office Action of U.S. Appl. No. 15/760,825 dated May 8, 2020.
Notice of Allowance of U.S. Appl. No. 15/760,825 dated Aug. 18, 2020.

*Primary Examiner* — Sang V Nguyen
(74) *Attorney, Agent, or Firm* — ScienBiziP, P.C.

(57) ABSTRACT

A liquid crystal display panel includes in the following order: a first substrate including pixel electrodes; a liquid crystal layer containing liquid crystal molecules; and a second substrate including a counter electrode, the liquid crystal display panel including pixels each including at least four alignment regions of a first alignment region, a second alignment region, a third alignment region, and a fourth alignment region, the four alignment regions providing different tilt azimuths to the liquid crystal molecules, the first alignment region, the second alignment region, the third alignment region, and the fourth alignment region being arranged in the given order in a longitudinal direction of each pixel, the first alignment region and the second alignment region providing tilt azimuths approximately 180° different from each other to the liquid crystal molecules or the third alignment region and the fourth alignment region providing tilt azimuths approximately 180° different from each other to the liquid crystal molecules.

14 Claims, 44 Drawing Sheets

(56) References Cited

U.S. PATENT DOCUMENTS

| | | |
|---|---|---|
| 2003/0227429 A1 | 12/2003 | Shimoshikiryo |
| 2005/0213015 A1* | 9/2005 | Shimoshikiryo ............................ G02F 1/134336 349/144 |
| 2006/0256271 A1 | 11/2006 | Shimoshikiryo |
| 2012/0002144 A1 | 1/2012 | Shoraku et al. |
| 2013/0114029 A1 | 5/2013 | Shoraku et al. |
| 2015/0036073 A1* | 2/2015 | Im .................... G02F 1/136209 349/48 |

FOREIGN PATENT DOCUMENTS

| | | |
|---|---|---|
| JP | 2011-085738 A | 4/2011 |
| JP | 5184618 B2 | 4/2013 |
| JP | 2015-031961 A | 2/2015 |

* cited by examiner

Polarization axis

Polarization axis (a)

(b)

LIQUID CRYSTAL DISPLAY PANEL

TECHNICAL FIELD

The present invention relates to liquid crystal display panels. More specifically, the present invention relates to a liquid crystal display panel including regions providing different tilt azimuths to liquid crystal molecules.

BACKGROUND ART

Liquid crystal display devices utilize a liquid crystal composition to provide display. A typical display method for such devices irradiates a liquid crystal display panel including a liquid crystal composition enclosed between paired substrates with light from the backlight and applies voltage to the liquid crystal composition to change the alignment of liquid crystal molecules, thereby controlling the amount of light passing through the liquid crystal display panel. Such liquid crystal display devices have a thin profile, light weight, and low power consumption, and are therefore utilized in electronic products such as smartphones, tablet PCs, and automotive navigation systems.

Alignment division techniques have been studied which divide one pixel into multiple alignment regions (domains) to align the liquid crystal molecules at different azimuths in different alignment regions such that the viewing angle characteristics are enhanced. The alignment of a pixel can be divided by, for example, a method that divides a half-pixel into four alignment regions of two rows by two columns. Examples of such an alignment mode include 4 domain-reverse twisted nematic (4D-RTN) mode (e.g., Patent Literature 1, Patent Literature 2, Patent Literature 3) and 4 domain-electrically controlled birefringence (4D-ECB) mode (e.g., Patent Literature 2).

CITATION LIST

Patent Literature

Patent Literature 1: JP H11-352486 A
Patent Literature 2: JP 2011-85738 A
Patent Literature 3: JP 5184618 B

SUMMARY OF INVENTION

Technical Problem

At borders of regions providing different alignment azimuths to liquid crystal molecules, the alignment of liquid crystal molecules is irregular. In provision of liquid crystal display, the regions with irregular alignment of liquid crystal molecules do not transmit light and are therefore observed as dark lines, decreasing the transmittance (contrast ratio) and deteriorating the response performance. For this reason, in the case of dividing one pixel into multiple alignment regions, increasing the number of alignment regions formed in each alignment region enhances the viewing angle characteristics, but also unfortunately increases the number of regions with irregular alignment of liquid crystal molecules, whereby the number of regions observed as dark lines tends to increase.

FIG. 44 is a schematic plan view of a half pixel, showing exemplary regions observed as dark lines in a conventional 4D-RTN mode liquid crystal display panel with voltage applied. In FIG. 44, the half pixel is divided into four alignment regions of two rows by two columns where liquid crystal molecules 341 are aligned at different tilt azimuths. As shown in FIG. 44, in a 4D-RTN mode liquid crystal display panel 300, dark lines 320 appearing as a fylfot cross are generated. The present inventors have further simulated generation of dark lines and observed the alignment state of the liquid crystal molecules 341. FIG. 45 is a photograph of a half pixel showing a simulation result of dark line generation in a conventional 4D-RTN mode liquid crystal display panel. FIG. 45 shows that the alignment of liquid crystal molecules is irregular near the outer edges of the pixel and at the borders of alignment regions, giving dark lines. This means that the proportion of regions with regularly aligned liquid crystal molecules, i.e., regions other than dark lines, is low as in the case where, for example, one pixel has a size of 82 μm in width and 245 μm in length and the width of the dark line is about 10 μm. Also, in regions where the alignment of liquid crystal molecules is irregular, the response performance of the liquid crystal molecules is low. This may cause a white tailing phenomenon (phenomenon in which a line which looks like a white tail is observed) and a black tailing phenomenon (phenomenon in which a line which looks like a black tail is observed). A white tailing phenomenon may be observed when, for example, a black rectangular image moving from one side to the other side of the display screen of a liquid crystal display panel is provided on the display screen with an intermediate grayscale background. This is because the luminance of the region opposite to the moving direction of the black rectangular image may be higher than that of the intermediate grayscale background. As with the case of the white tailing phenomenon, a black tailing phenomenon may be observed when, for example, a moving black rectangular image is provided on the liquid crystal display panel with an intermediate grayscale background.

In Patent Literature 2, increase in the transmittance of a 4D-RTN mode liquid crystal display panel is considered using an electrode configuration including a main part and multiple branches extending parallel to each other from the main part. FIG. 46 is a schematic plan view of a half pixel showing regions observed as dark lines in another conventional 4D-RTN mode liquid crystal display panel with voltage applied. In FIG. 46, the half pixel is divided into four alignment regions of two rows by two columns where liquid crystal molecules 441 are aligned at different tilt azimuths. A 4D-RTN liquid crystal display panel 400 reduces alignment disorder of the liquid crystal molecules 441 by utilizing the electrode configuration of a pixel electrode 431. This reduces regions with irregular alignment of the liquid crystal molecules 441 and can thereby reduce a response function decrease, so that a white tailing phenomenon is presumed to be less observed. This configuration can reduce the width of the dark lines, but produces dark lines 420 appearing as a cross shape.

In Patent Literature 3, 4D-RTN mode liquid crystal display panels have been studied including one in which the alignment of one pixel is divided into four row by one column.

The recent increase in definition of pixels requires reduction in area per pixel. The area of dark lines, however, remains the same even when the size of pixels is reduced, and thus the proportion of the area of dark lines in a pixel increases to more significantly deteriorate the properties such as transmittance. Hence, more studies are needed to achieve favorable viewing angle characteristics and a high transmittance while responding to the increase in definition.

The present invention has been made in view of the above current state of the art, and aims to provide a liquid crystal display panel having excellent viewing angle characteristics and reducing generation of dark lines to achieve a high transmittance.

Solution to Problem

The present inventors have made studies on the method for dividing a pixel in a liquid crystal display panel into multiple alignment regions while reducing generation of dark lines. Based on the studies, the present inventors have found that the viewing angle characteristics can be achieved by dividing a pixel into at least four alignment regions providing different tilt azimuths to liquid crystal molecules. Also, the inventors have found that generation of dark lines can be reduced by defining the four alignment regions as a first alignment region, a second alignment region, a third alignment region, and a fourth alignment region in the given order in the longitudinal direction of the pixel and setting the first alignment region and the second alignment region to provide tilt azimuths approximately 180° different from each other to the liquid crystal molecules or setting the third alignment region and the fourth alignment region to provide tilt azimuths approximately 180° different from each other to the liquid crystal molecules. The inventors have thereby arrived at a solution to the above problem, and completed the present invention.

In other words, one aspect of the present invention may be a liquid crystal display panel including in the following order: a first substrate including pixel electrodes; a liquid crystal layer containing liquid crystal molecules; and a second substrate including a counter electrode, the liquid crystal display panel including pixels each including at least four alignment regions of a first alignment region, a second alignment region, a third alignment region, and a fourth alignment region, the four alignment regions providing different tilt azimuths to the liquid crystal molecules, the first alignment region, the second alignment region, the third alignment region, and the fourth alignment region being arranged in the given order in a longitudinal direction of each pixel, the first alignment region and the second alignment region providing tilt azimuths approximately 180° different from each other to the liquid crystal molecules or the third alignment region and the fourth alignment region providing tilt azimuths approximately 180° different from each other to the liquid crystal molecules. The "azimuth" as used herein means a direction in a view projected on a substrate surface without consideration of the tilt angle (i.e., polar angle, pre-tilt angle) from the normal direction of the substrate surface. For example, if an x-axis and a y-axis perpendicular to the x-axis form an xy plane parallel to the substrate surfaces and the x-axis direction is defined as 0°, the azimuth is determined counterclockwise in a positive value. The "tilt azimuth" as used herein means an azimuth at which liquid crystal molecules tilt relative to the first substrate. The expression "approximately 180°" means the range up to an angle of 15°, preferably an angle of 5°, from the 180° point in the clockwise or counterclockwise direction.

Advantageous Effects of Invention

The liquid crystal display panel of the present invention can achieve favorable viewing angle characteristics and increase the transmittance, with its configuration in which one pixel is divided into at least four alignment regions of a first alignment region, a second alignment region, a third alignment region, and a fourth alignment region providing different tilt azimuths to the liquid crystal molecules, and the first alignment region and the second alignment region provide tilt azimuths approximately 180° different from each other to the liquid crystal molecules or the third alignment region and the fourth alignment region provide tilt azimuths approximately 180° different from each other.

DESCRIPTION OF EMBODIMENTS

Hereinafter, embodiments of the present invention are described. The following embodiments, however, are not intended to limit the scope of the present invention, and appropriate modifications can be made within the spirit of the present invention.

Figure 1:
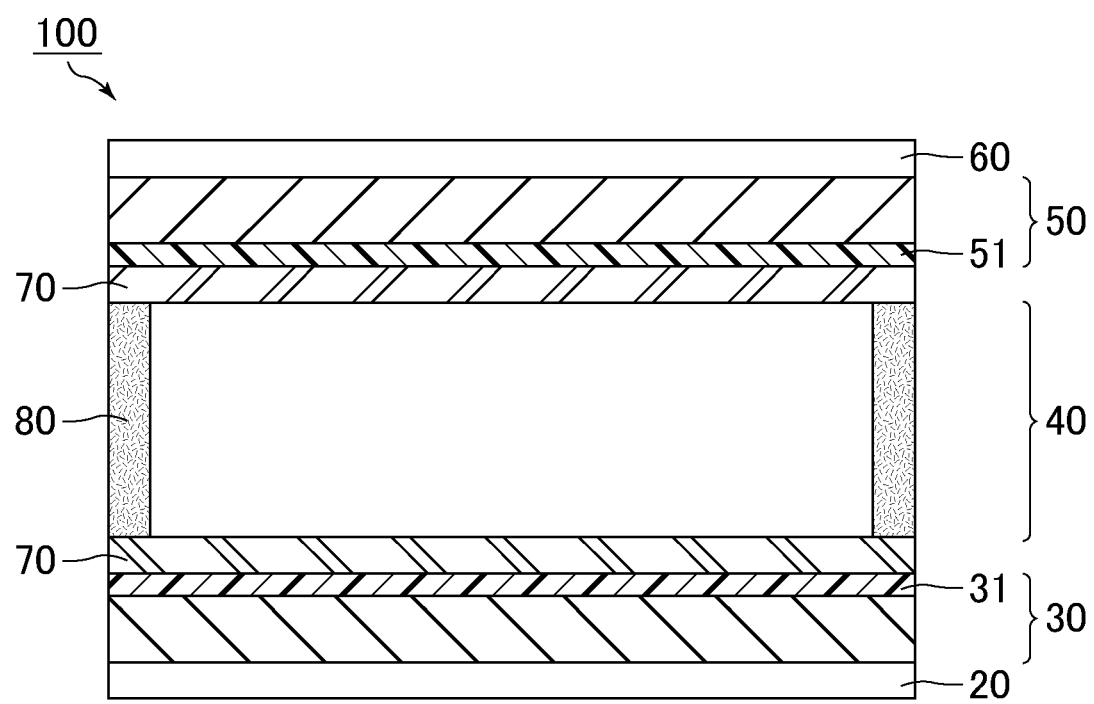
FIG. 1 is a cross-sectional view schematically showing an exemplary liquid crystal display panel of the present embodiment.
Figure 2:
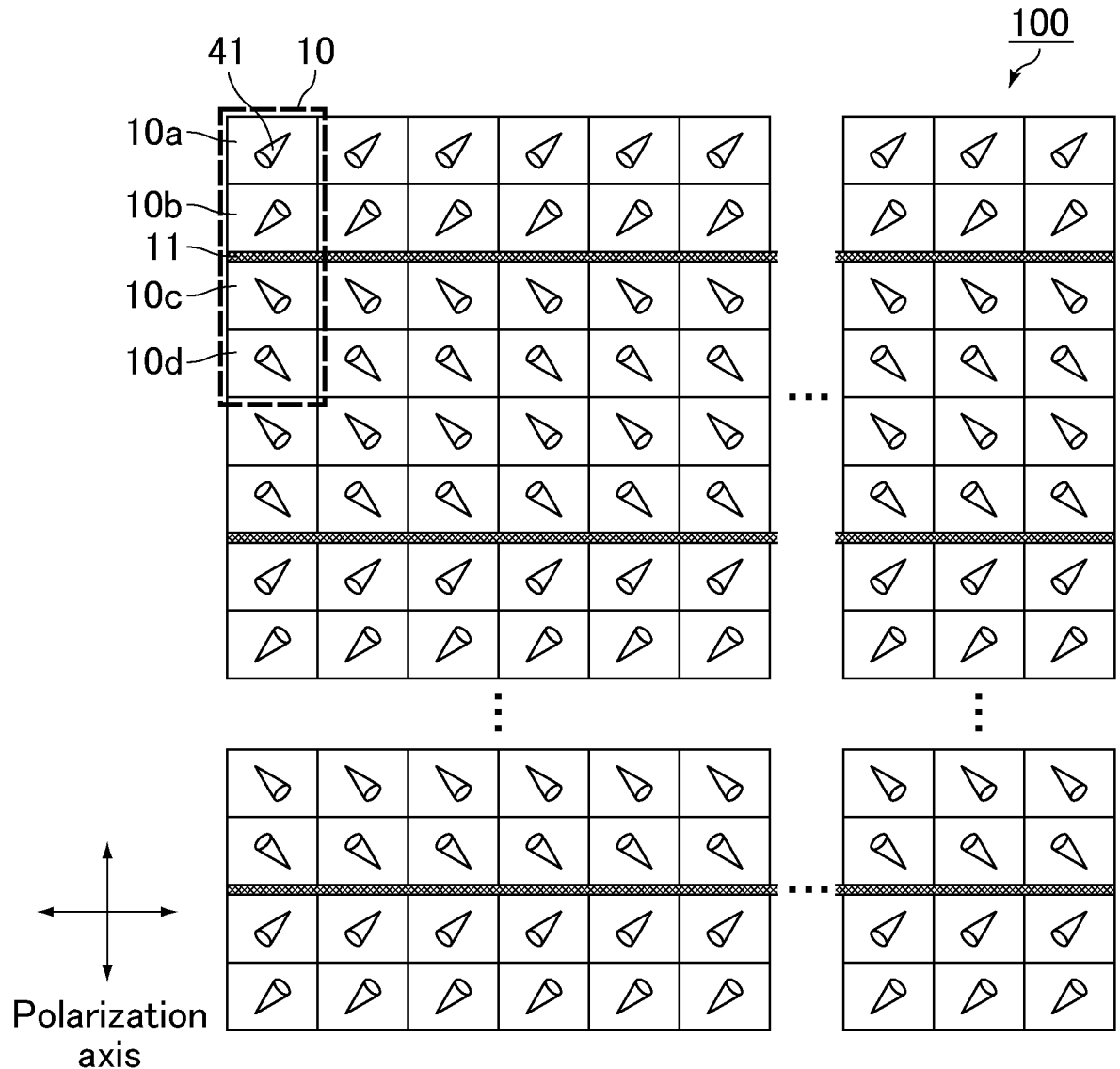
FIG. 2 is a plan view schematically showing an exemplary liquid crystal display panel of the present embodiment.

FIG. 1 is a cross-sectional view schematically showing an exemplary liquid crystal display panel of the present embodiment. FIG. 2 is a plan view schematically showing an exemplary liquid crystal display panel of the present embodiment. As shown in FIG. 1, a liquid crystal display panel 100 of the present embodiment includes, in the following order, a first substrate 30 including pixel electrodes 31, a liquid crystal layer 40 including liquid crystal molecules, and a second substrate 50 including a counter electrode 51. The liquid crystal layer 40 includes liquid crystal molecules and is surrounded by a sealing material 80. As shown in FIG. 2, the liquid crystal display panel 100 of the present embodiment includes pixels 10 arranged in a matrix.

Figure 3:
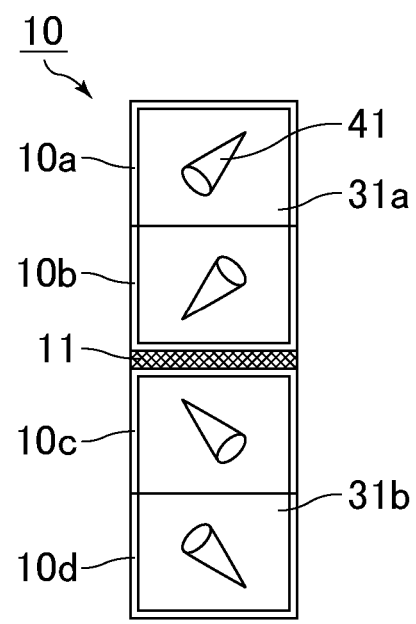
FIG. 3 is a schematic plan view of an exemplary pixel.

FIG. 3 is a schematic plan view of an exemplary pixel. As shown in FIG. 3, each pixel 10 in the liquid crystal display panel 100 of the present embodiment includes at least four alignment regions of a first alignment region 10a, a second alignment region 10b, a third alignment region 10c, and a fourth alignment region 10d. The four alignment regions provide different tilt azimuths to liquid crystal molecules 41, and the alignment regions are arranged in the longitudinal direction of the pixel 10 in the order of the first alignment region 10a, the second alignment region 10b, the third alignment region 10c, and the fourth alignment region 10d. This arrangement can achieve a high transmittance because, for example, the number of alignment regions in one pixel can be reduced and thus regions with irregular alignment of the liquid crystal molecules 41 are reduced as compared with a conventional 4D-RTN mode liquid crystal display panel in which one pixel is divided into alignment regions of two columns by four rows. Furthermore, the first alignment region 10a and the second alignment region 10b provide tilt azimuths approximately 180° different from each other to the liquid crystal molecules 41 or the third alignment region and the fourth alignment region providing tilt azimuths approximately 180° different from each other to the liquid crystal molecules 41. Such two alignment regions next to each other providing tilt azimuths approximately 180° different from each other to the liquid crystal molecules 41 can give excellent viewing angle characteristics.

Figure 4:
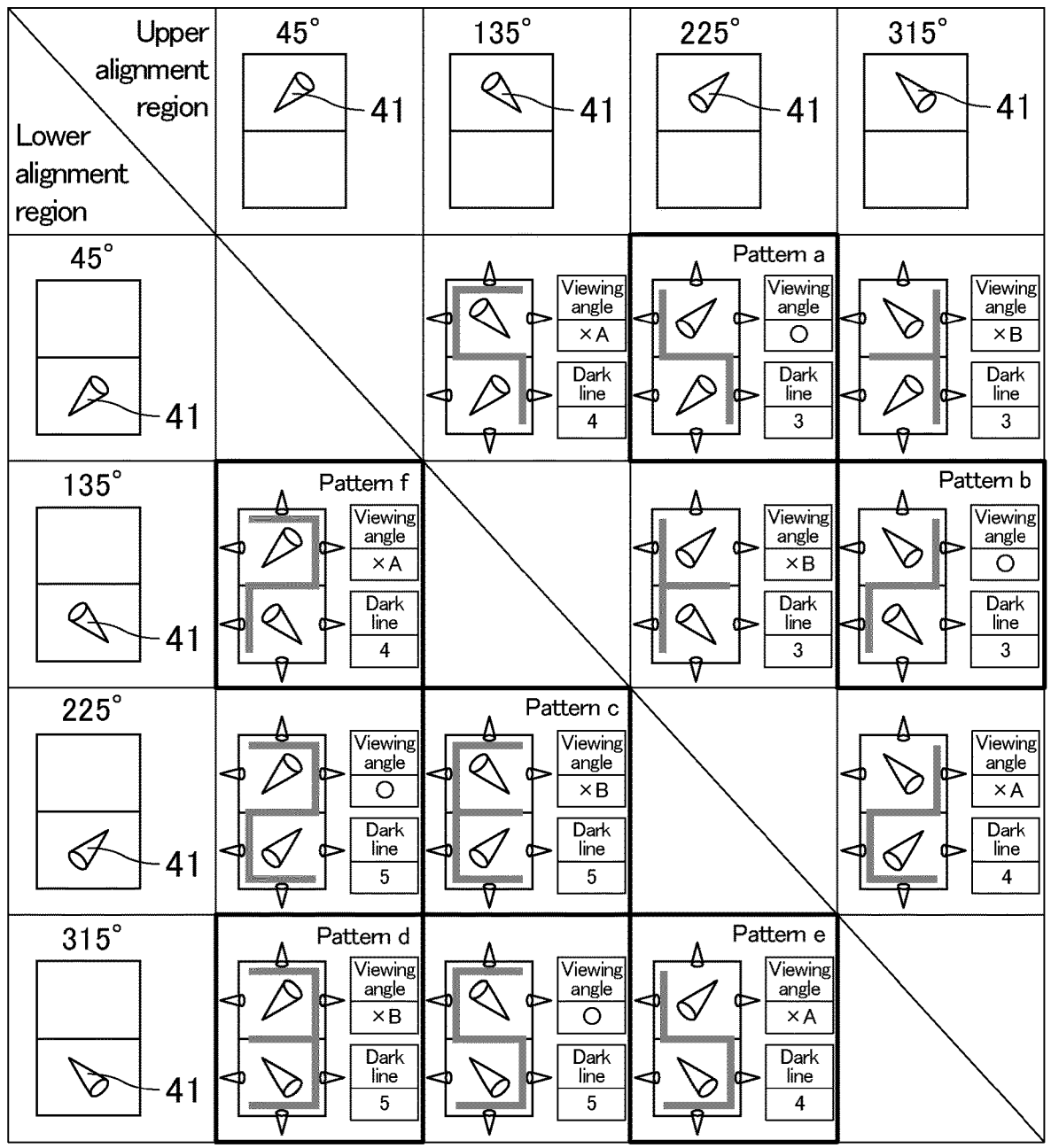
FIG. 4 is a view of simulation results of the viewing angle characteristics and the numbers of dark lines in half pixels.

The inventors studied the tilt azimuths of the liquid crystal molecules 41 in the four alignment regions 10a, 10b, 10c, and 10d in the following manner. The viewing angle characteristics and the number of generated dark lines were simulated by dividing one pixel into two alignment division parts (hereinafter, also referred to as half pixels) and providing a tilt azimuth of 45°, 135°, 225°, or 315° to the liquid crystal molecules 41 in the upper alignment region and the lower alignment region in each half pixel, with the azimuth in the transverse direction of each pixel 10 defined as 0°. The results are shown in FIG. 4. FIG. 4 is a view of simulation results of the viewing angle characteristics and the numbers of dark lines in half pixels. The simulation was performed on the assumption that voltage was applied to the liquid crystal layer 40. The liquid crystal molecules 41 near the outer edge of each pixel are aligned from the outside to the inside of the pixel, while the liquid crystal molecules 41 near the center of the pixel tilt at an azimuth in the alignment treatment direction. In the drawings, the liquid crystal molecules 41 are depicted as cones whose base is oriented to the observer.

The viewing angle characteristics were evaluated based on the symmetry of the liquid crystal molecules 41 and grayscale inversion. The evaluation criteria are shown in the following Table 1. The symmetry of the liquid crystal molecules 41 was determined by observing the half pixel from the horizontal and vertical directions and at an angle of 45°, and a pattern giving symmetric display is marked with "o" and a pattern giving asymmetric display with "x". Also, grayscale inversion was observed from the horizontal and vertical directions, and a pattern not causing grayscale inversion was marked with "o" and a pattern causing grayscale inversion with "x". Here, the observation from the horizontal direction means observation at an azimuth in the transverse direction of one pixel at a polar angle of 45° to 60°. The observation from the vertical direction means observation at an azimuth in the longitudinal direction of one pixel at a polar angle of 45° to 60°. The observation from a direction at an angle of 45° means observation at an azimuth of 45° from the azimuth in the transverse direction or longitudinal direction of one pixel at a polar angle of 45° to 60°.

TABLE 1

| Evaluation | Symmetry | | | Grayscale inversion |
| --- | --- | --- | --- | --- |
| | Horizontal | Vertical | At 45° | |
| o | o | o | x | o |
| xA | o | x | x | x |
| xB | x | o | x | x |

FIG. 4 shows that the display appears symmetric at least in the vertical direction or horizontal direction when the upper alignment region and the lower alignment region in one half pixel each provide a tilt azimuth of 45°, 135°, 225° or 315° to the liquid crystal molecules 41, with the azimuth in the transverse direction of the pixel 10 defined as 0°. This means that each of the first alignment region 10a, the second alignment region 10b, the third alignment region 10c, and the fourth alignment region 10d may be, with the azimuth in the transverse direction of the pixel 10 defined as 0°, any of an alignment region providing a tilt azimuth of approximately 45°, an alignment region providing a tilt azimuth of approximately 135°, an alignment region providing a tilt azimuth of approximately 225°, and an alignment region providing a tilt azimuth of approximately 315°. This configuration can achieve even better viewing angle characteristics. Here, a tile azimuth of approximately 45°, a tile azimuth of approximately 135°, a tilt azimuth of approximately 225°, and a tilt azimuth of approximately 315° with the azimuth in the transverse direction of the pixel 10 defined as 0° mean the ranges up to an angle of 15°, preferably an angle of 5°, from the 45°, 135°, 225°, and 315° points in the clockwise or counterclockwise direction, respectively, with the azimuth in the transverse direction of the pixel defined as 0°.

Figure 5:
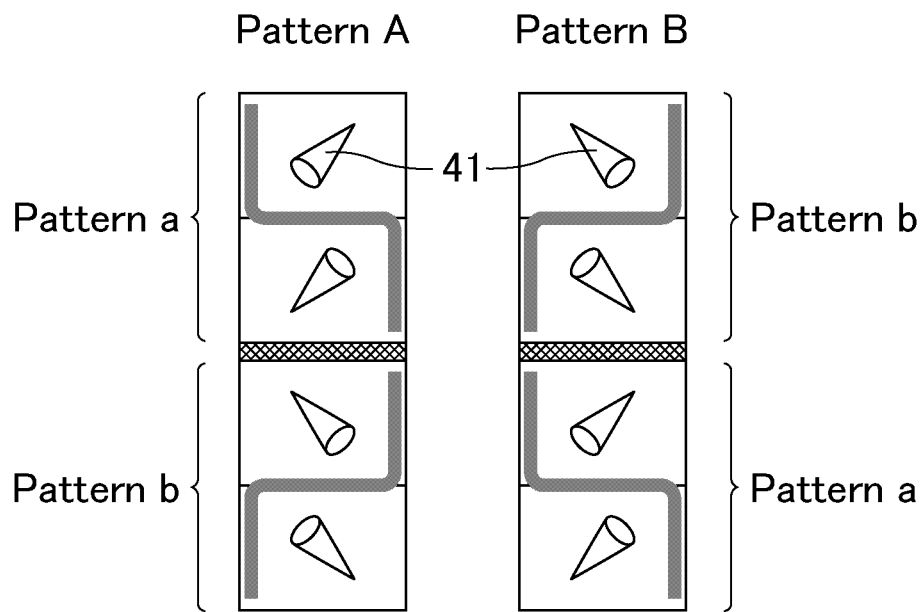
FIG. 5 includes schematic views of one pixel having an alignment division pattern which gives good viewing angle characteristics and a small number of dark lines.

The inventors also studied the optimum alignment pattern of the liquid crystal molecules 41 in one pixel. FIG. 4 shows that Pattern a and Pattern b achieved favorable viewing angle characteristics and a small number of dark lines, among the alignment patterns of the liquid crystal molecules 41 in a half pixel. FIG. 5 includes schematic views of one pixel having an alignment division pattern which gives good viewing angle characteristics and a small number of dark lines. As shown in FIG. 5, Pattern A and Pattern B, which are combinations of Pattern a and Pattern b, are suitable as the alignment pattern of the liquid crystal molecules 41 in one pixel as they can achieve a further reduced number of dark lines and excellent viewing angle characteristics. In other words, with the azimuth in the transverse direction of the pixel defined as 0°, each pixel may have a first alignment division pattern (Pattern A) in which the first alignment region providing a tilt azimuth of approximately 225°, the second alignment region providing a tilt azimuth of approximately 45°, the third alignment region providing a tilt azimuth of approximately 315°, and the fourth alignment region providing a tilt azimuth of approximately 135° are arranged in the given order, or a second alignment division pattern (Pattern B) in which the first alignment region providing a tilt azimuth of approximately 315°, the second alignment region providing a tilt azimuth of approximately 135°, the third alignment region providing a tilt azimuth of approximately 225°, and the fourth alignment region providing a tilt azimuth of approximately 45° are arranged in the given order.

Figure 6:
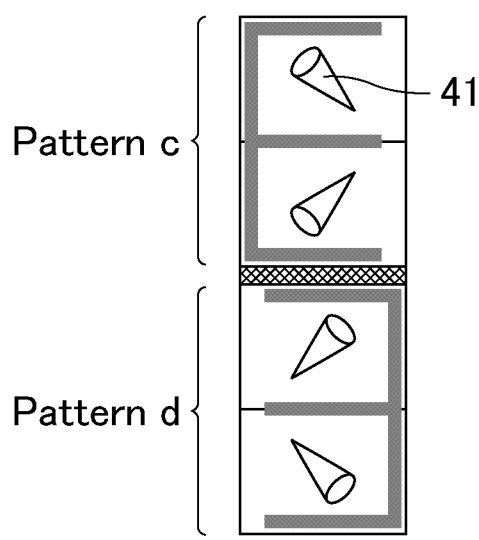
FIG. 6 is a schematic view of one pixel having an alignment division pattern which gives poor viewing angle characteristics and a large number of dark lines.

For example, in the case where a pixel has Pattern e shown in FIG. 4 in its upper half and Pattern f shown in FIG. 4 in its lower half, the alignment azimuths of the liquid crystal molecules 41 in the vertical direction are asymmetric and grayscale inversion occurs. Examples of an alignment division pattern generating a large number of dark lines include the alignment division pattern shown in FIG. 6. FIG. 6 is a schematic view of one pixel having an alignment division pattern which gives poor viewing angle characteristics and a large number of dark lines. Here, the pixel has Pattern c shown in FIG. 4 in its upper half and Pattern d shown in FIG. 4 in its lower half.

The liquid crystal display panel may include an alignment-stabilizing region between the first alignment region 10a and the second alignment region 10b and between the third alignment region 10c and the fourth alignment region 10d. The alignment-stabilizing region between the first alignment region 10a and the second alignment region 10b is a dark line region generated between the first alignment region 10a and the second alignment region 10b. The alignment-stabilizing region between the third alignment region 10c and the fourth alignment region 10d is a dark line region generated between the third alignment region 10c and the fourth alignment region 10d. In the above alignment-stabilizing regions, the liquid crystal molecules 41 are aligned stably in terms of energy, so that the alignment of the liquid crystal molecules 41 in two alignment regions sandwiching the alignment-stabilizing region is also stable.

The liquid crystal molecules 41 may be aligned substantially perpendicular to the first substrate 30 and the second substrate 50 and at a tilt in the respective tilt azimuth directions with no voltage applied to the liquid crystal layer 40 and may be more tilted in the tilt azimuth direction upon application of voltage to the liquid crystal layer 40. Here, the liquid crystal display panel can provide display when the liquid crystal molecules 41 are more tilted in the tilt azimuth direction. Also, whether or not voltage is applied to the liquid crystal layer 40, in each of the four alignment regions in a plan view of the liquid crystal display panel 100, the angle formed by the tilt azimuth of the liquid crystal molecules 41 near the first substrate 30 and the tilt azimuth of the liquid crystal molecules 41 near the second substrate 50 is preferably 45° or smaller, more preferably approximately 0°. In other words, the liquid crystal molecules 41 are preferably at a twist angle of 45° or smaller, more preferably approximately 0°, in each of the four alignment regions in a plan view of the liquid crystal display panel 100. The liquid crystal molecules 41 near the center of the liquid crystal layer 40 in the thickness direction as well as the liquid crystal molecules 41 near the first substrate 30 and the liquid crystal molecules 41 near the second substrate 50 are preferably at the same tilt azimuth. Here, being substantially perpendicular to the first substrate 30 and the second substrate 50 means that, for example, they are aligned at 85.0° to 89.0° relative to the first substrate 30 and the second substrate 50. The expression "approximately 0°" means the range up to an angle of 15°, preferably an angle of 5°, from the 0° point in the clockwise or counterclockwise direction.

Figure 46:
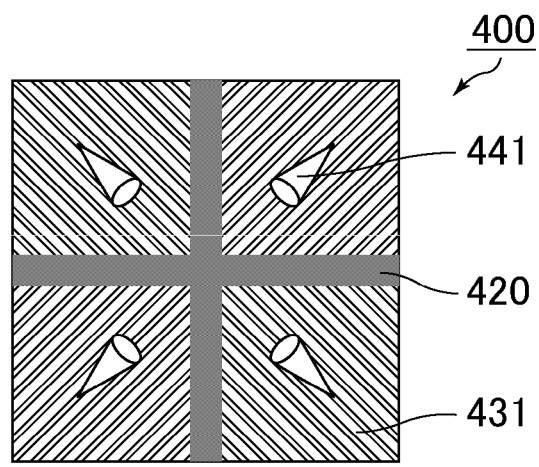
FIG. 46 is a schematic plan view of a half pixel showing regions observed as dark lines in another conventional 4D-RTN mode liquid crystal display panel.

In a conventional 4D-RTN mode as shown in FIG. 46, the pixel electrodes are each provided with slits and the liquid crystal molecules 441 in each alignment region are aligned by electric fields generated by the pixel electrodes provided with slits 431 when voltage is applied. However, the direction of rotation exerted to the liquid crystal molecules 441 by the electric fields is different from the tilt azimuth of the liquid crystal molecules 441 relative to the TFT substrate and the tilt azimuth of the liquid crystal molecules 441 relative to the CF substrate with no voltage applied. With this configuration, pushing the display screen of the liquid crystal display panel with a finger, for example, may disturb the alignment of the liquid crystal molecules 441 and leave a mark of pushing after the finger is removed. The present embodiment, in contrast, does not leave such a mark of pushing because in a plan view of the liquid crystal display panel 100, in each of the four alignment regions, the liquid crystal molecules 41 are at a twist angle of 45° or smaller, and the direction of rotation exerted to the liquid crystal molecules 41 by the electric fields generated by the pixel electrodes provided with the slits 33 is substantially parallel to the tilt azimuth of the liquid crystal molecules 41 relative to the TFT substrate and the tilt azimuth of the liquid crystal molecules 41 relative to the CF substrate with no voltage applied.

The first substrate 30 includes the pixel electrodes 31 and may be, for example, an active matrix substrate (TFT substrate). The TFT substrate can be one commonly used in the field of liquid crystal display panels. The pixel electrodes 31 include, as shown in FIG. 3, a first pixel electrode 31a configured to apply voltage to the first alignment region 10a and the second alignment region 10b and a second pixel electrode 31b configured to apply voltage to the third alignment region 10c and the fourth alignment region 10d, the first pixel electrode 31a and the second pixel electrode 31b configured to apply different voltages to the liquid crystal layer. The first substrate 30 may further include gate signal lines 11 (signal lines) which may be arranged to cross the pixel 10 in the transverse direction. The TFT substrate may have a configuration including on a transparent substrate, in a plan view thereof, parallel gate signal lines; parallel source signal lines extending perpendicular to the gate signal lines; active elements such as TFTs arranged at intersections of the gate signal lines and the source signal lines; and pixel electrodes arranged in a matrix in regions defined by the gate signal lines and the source signal lines. The TFTs preferably include channels formed of an oxide semiconductor. The oxide semiconductor may be, for example, a compound (In—Ga—Zn—O) formed of indium (In), gallium (Ga), zinc (Zn), and oxygen (O), a compound (In-Tin-Zn—O) formed of indium (In), tin (Tin), zinc (Zn), and oxygen (O), or a compound (In—Al—Zn—O) formed of indium (In), aluminum (Al), zinc (Zn), and oxygen (O).

Figure 7:
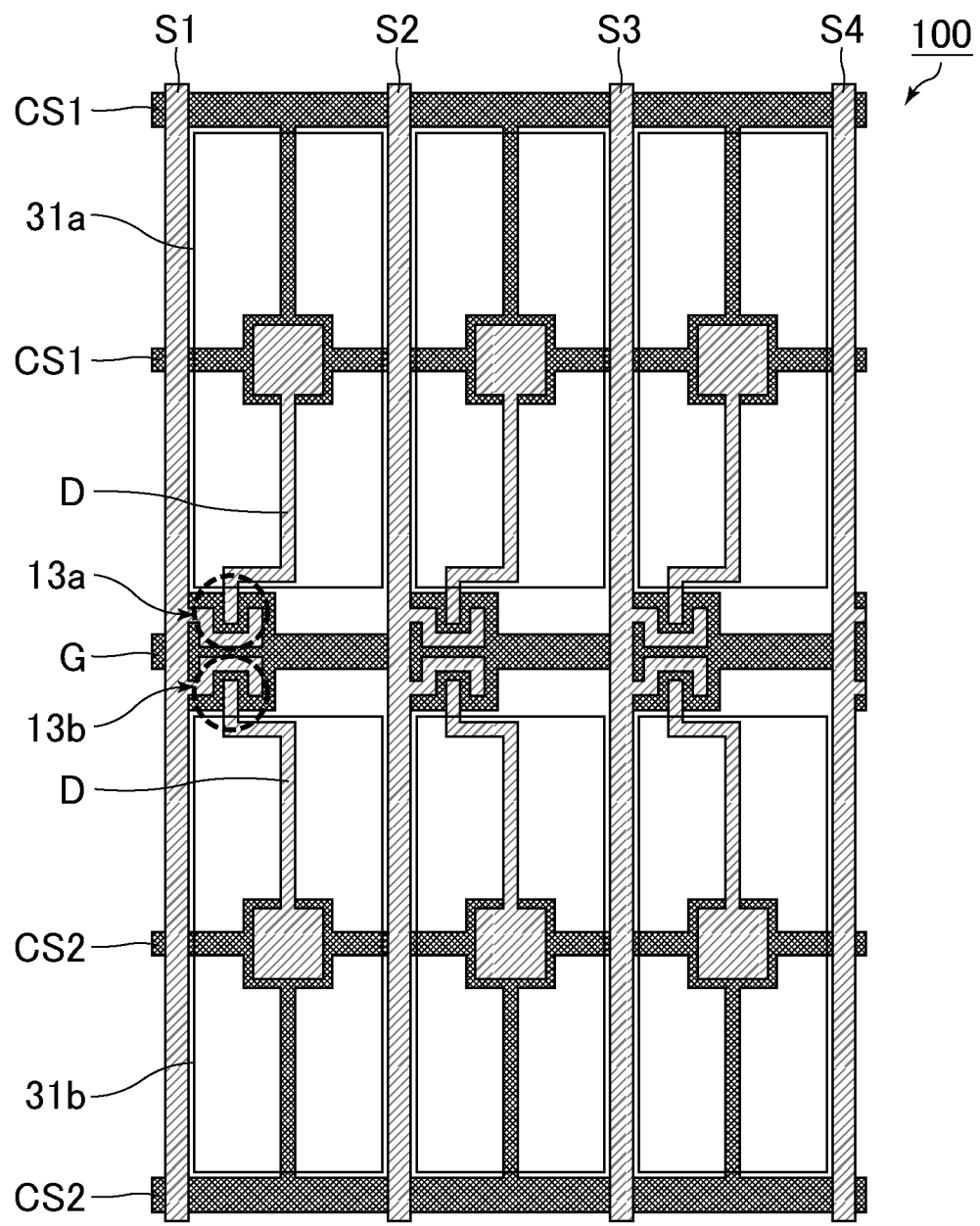
FIG. 7 is a plan view schematically showing an exemplary first substrate.
Figure 8:
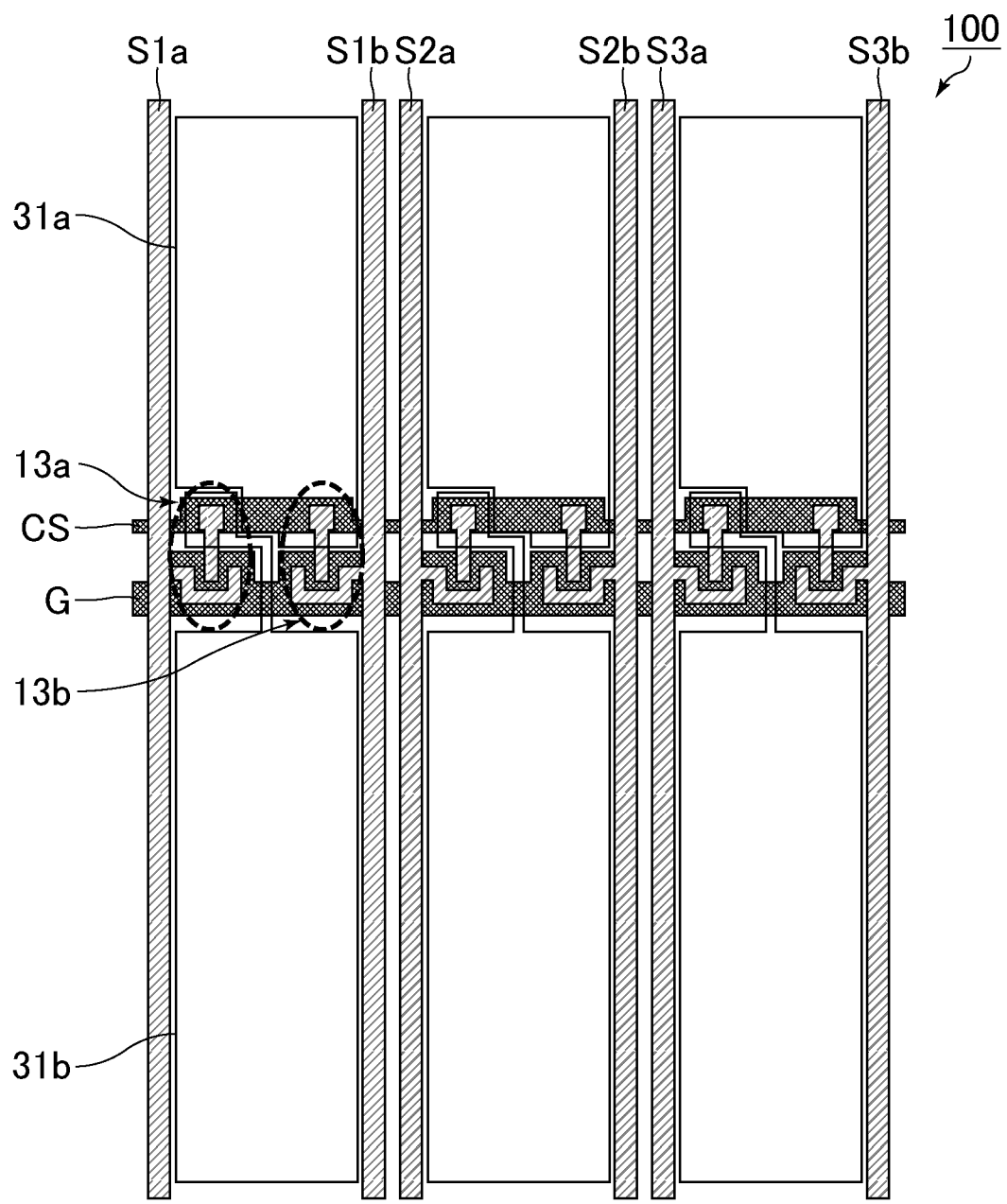
FIG. 8 is a plan view schematically showing another exemplary first substrate.
Figure 9:
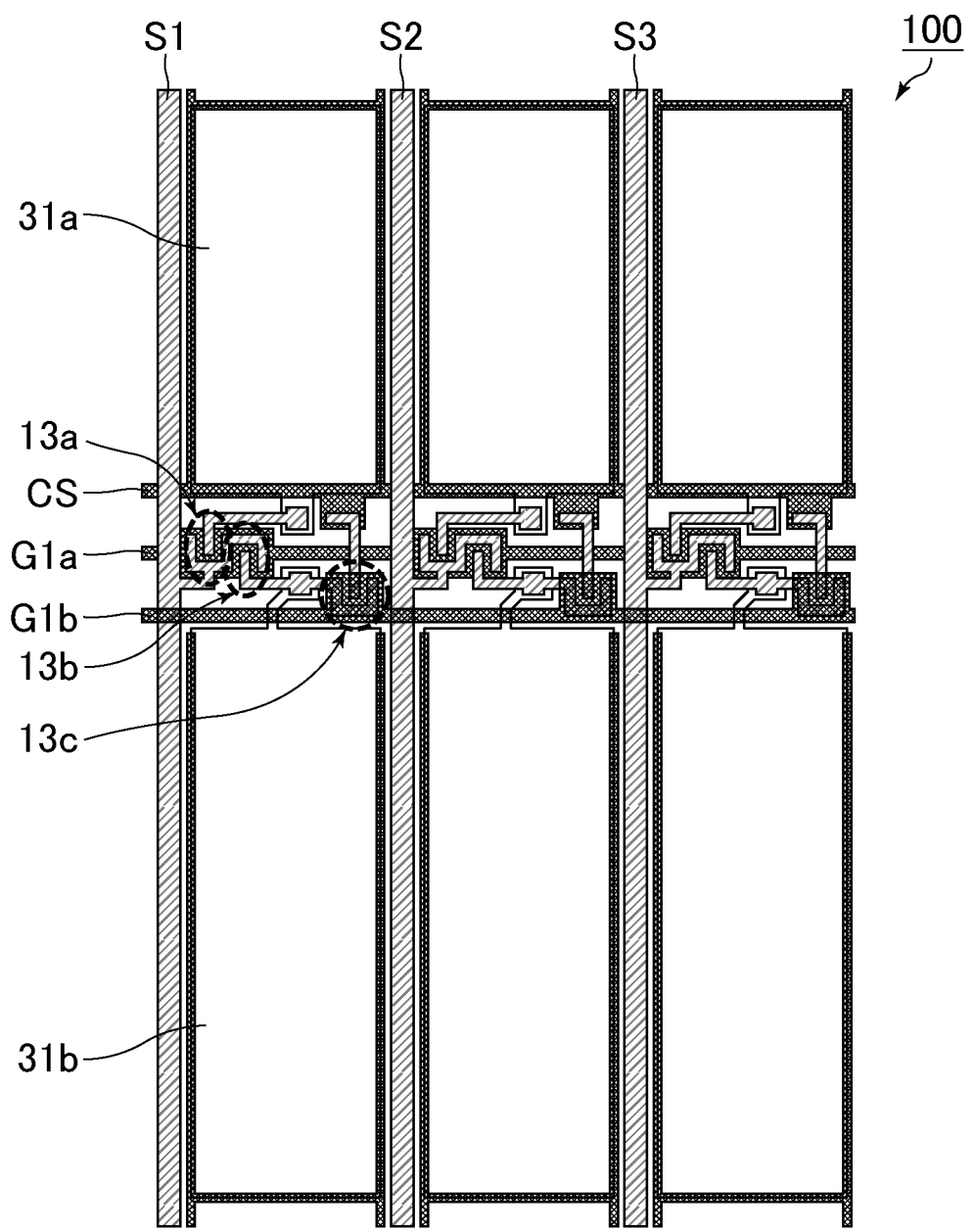
FIG. 9 is a plan view schematically showing yet another exemplary first substrate.

FIG. 7 to FIG. 9 are each a plan view schematically showing an exemplary first substrate. As shown in FIG. 7 to FIG. 9, one pixel may include two alignment division parts, and the first pixel electrode 31a and the second pixel electrode 31b may receive signals via different TFTs 13a and 13b.

As shown in FIG. 7, for example, one gate line G may be arranged to cross the center of each pixel in the transverse direction of the pixels, and source signal lines S1, S2, S3, and S4 may be arranged to be perpendicular to the gate signal line G. Capacitance lines CS1 and CS2 may be arranged parallel to the gate signal line G. The two TFTs 13a and 13b may be arranged at intersections of the gate signal line G and the source signal line S1. A drain line D connected to the TFT 13a may be electrically connected to the first pixel electrode 31a when the TFT 13a is turned on, and a drain line D connected to the TFT 13b may be electrically connected to the second pixel electrode 31b when the TFT 13b is turned on. Furthermore, the capacitance line CS1 may be formed at a position where the drain line D connected to the TFT 13a is connected to the first pixel electrode 31a, while the capacitance line CS2 may be formed at a position where the drain line D connected to the TFT 13b is connected to the second pixel electrode 31b. The capacitance lines CS1 and CS2 are each preferably arranged to cross the center of the half pixel in the transverse direction of the pixel. Arrangement of the capacitance lines CS1 and CS2 to superimpose them on the borders of two adjacent alignment regions reduces the chances of dark line observation.

As shown in FIG. 8, for example, one gate signal line G may be arranged to cross the center of each pixel in the transverse direction of the pixels, and source signal lines S1a, S1b, S2a, S2b, S3a, and S3b may be arranged to be perpendicular to the gate signal line G. In other words, one gate signal line G and two source signal lines may be arranged in one pixel. A capacitance line CS may be arranged to be parallel to the gate signal line G. The TFT 13a may be arranged at an intersection of the gate signal line G and the source signal line S1a, and the TFT 13b may be arranged at an intersection of the gate signal line G and the source signal line Sib. A drain line connected to the TFT 13a may be electrically connected to the second pixel electrode 31b when the TFT 13a is turned on, and a drain line connected to the TFT 13b may be electrically connected to the first pixel electrode 31a when the TFT 13b is turned on. Furthermore, the capacitance line CS may be formed at a position where the drain line connected to the TFT 13a is connected to the second pixel electrode 31b and at a position where the drain line connected to the TFT 13b is connected to the first pixel electrode 31a.

As shown in FIG. 9, for example, two gate signal lines G1a and G1b may be arranged to cross the center of each pixel in the transverse direction of the pixels, and source signal lines S1, S2, and S3 may be arranged to be perpendicular to the gate signal lines G1a and G1b. Three TFTs 13a, 13b, and 13c may be arranged in one pixel. The TFT 13a and the TFT 13b may be arranged at an intersection of the gate signal line G1a and the source signal line S1. A drain line connected to the TFT 13a may be electrically connected to the first pixel electrode 31a when the TFT 13a is turned on, and a drain line connected to the TFT 13b may be electrically connected to the second pixel electrode 31b when the TFT 13b is turned on. Furthermore, the drain line connected to the TFT 13b may form a TFT 13c with the gate signal line G1b, and a drain line connected to the TFT 13c may be connected to the capacitance line CS.

Figure 10:
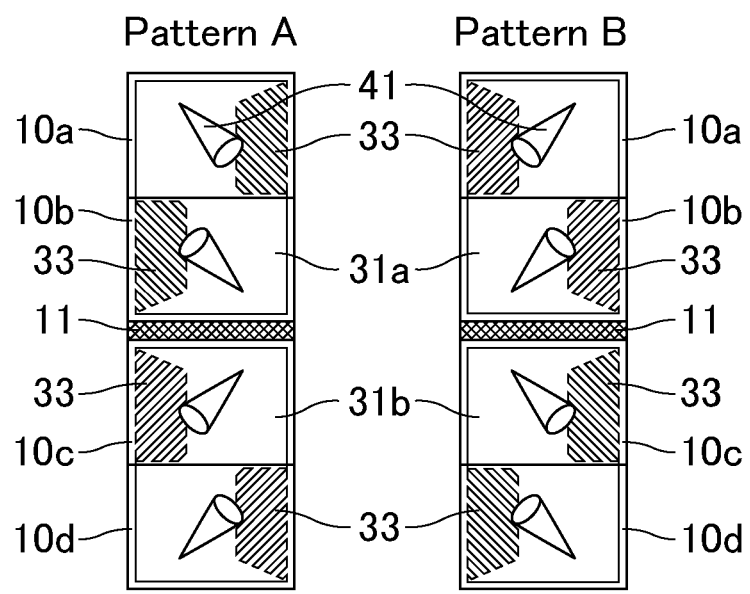
FIG. 10 includes schematic plan views of one pixel showing the relation between alignment regions and a pixel electrode including slits.

The first pixel electrode 31a and the second pixel electrode 31b may each be provided with slits 33 extending parallel to the tilt azimuth direction of the liquid crystal molecules 41. The slits 33 can further stabilize the tilt azimuth of the liquid crystal molecules 41 with voltage applied and can reduce the widths of dark lines generated. The tilt azimuth direction of the liquid crystal molecules 41 and the slit extension direction are preferably perfectly parallel to each other, but may form an angle of, for example, 15° or smaller. FIG. 10 includes schematic plan views of one pixel showing the relation between alignment regions and a pixel electrode including slits. As shown in FIG. 10, the widths of dark lines can be more effectively reduced by adjusting the positions of the slits 33 depending on whether the alignment pattern is Pattern A or Pattern B.

The pixels 10 are arranged next to each other, and the liquid crystal display panel is driven by applying voltage of the same polarity to the first pixel electrode 31a and the second pixel electrode 31b and making adjacent pixels 10 have different polarities from each other. In other words, the liquid crystal display panel may be driven with the polarity of a given pixel being different from the polarities of pixels arranged next to the given pixel in the vertical and horizontal directions such that pixels with different polarities are arranged in a checkered pattern over the entire liquid crystal display panel. Pixels with different polarities may be arranged in a checkered pattern of different rows by columns. In other words, the pixels 10 may constitute pixel 10 groups of N rows×M columns where N is an integer of 1 or greater and M is an integer of 1 or greater, and the liquid crystal display panel may be driven by applying voltage of the same polarity to the first pixel electrode 31a and the second pixel electrode 31b and making adjacent pixel 10 groups have different polarities from each other. The driving mode may invert the polarity of one pixel or the pixel groups of N rows×M columns in a constant cycle, such as a polarity inversion driving mode inverting the polarity in a cycle of 60 Hz or 120 Hz.

The liquid crystal display panel may include pixels with $|V1(k)|>|V2(k)|$ and pixels with $|V1(k)|<|V2(k)|$ in display at a grayscale value k in the range of 0 to n, where n is an integer of 2 or greater, k is $0<k<n$ and an integer of 1 or greater, $V1(k)$ is voltage applied to the liquid crystal layer 40 by the first pixel electrode 31a and $V2(k)$ is voltage applied to the liquid crystal layer 40 by the second pixel electrode 31b. In other words, in display at an intermediate grayscale value, which is at a grayscale value other than 0 and n, the liquid crystal display panel may include both pixels whose upper half is bright (hereinafter, such half pixels are also referred to as bright half pixels) and lower half is dark (hereinafter, such half pixels are also referred to as dark half pixels) and pixels whose upper half pixel is a dark half pixel and lower half pixel is a bright half pixel.

The liquid crystal display panel may include a pixel with $|V1(k)|>|V2(k)|$ resulting from application of positive voltage to the first pixel electrode 31a and a pixel with $|V1(k)|>|V2(k)|$ resulting from application of negative voltage to the first pixel electrode 31a, in a row or column direction, and a pixel with $|V1(k)|<|V2(k)|$ resulting from application of positive voltage to the second pixel electrode 31b and a pixel with $|V1(k)|<|V2(k)|$ resulting from application of negative voltage to the second pixel electrode 31b, in a row or column direction.

A pixel with $|V1(k)|>|V2(k)|$ may be arranged next to a pixel with $|V1(k)|>|V2(k)|$ in the column direction and next to a pixel with $|V1(k)|<|V2(k)|$ in the row direction. In other words, in display at an intermediate grayscale value, a checkered brightness pattern, which is a checkered pattern consisting of bright half pixels and dark half pixels, may be employed. The entire liquid crystal display panel may employ the checkered brightness pattern, or part of the liquid crystal display panel may employ the checkered brightness pattern.

The pixels with $|V1(k)|>|V2(k)|$ may be arranged consecutively in the row direction and the column direction or the pixels with $|V1(k)|<|V2(k)|$ may be arranged consecutively in the row direction and the column direction. In other words, in display at an intermediate grayscale value, bright half pixels and dark half pixels may form stripes.

A common liquid crystal display panel provides grayscale display in the state where the pixels with $|V1|>|V2|$ and the pixels with $|V1|<|V2|$ are fixed while maintaining the relations between V1 and V2. The present embodiment, in contrast, can be driven by inverting the brightness of the pixels in a constant cycle. Specifically, in one pixel, a brightness inversion driving may be employed which inverts the relations $|V1|>|V2|$ and $|V1|<|V2|$ in a constant cycle such as in a cycle of 120 Hz. Furthermore, the display quality of the liquid crystal display panel can be greatly improved by combining brightness inversion driving and the above polarity inversion driving and conducting the brightness inversion and the polarity inversion in different cycles. For example, the brightness inversion can be conducted in a cycle of 120 Hz and the polarity inversion can be conducted in a cycle of 60 Hz.

The second substrate 50 includes the counter electrode 51, and may be, for example, a color filter substrate (CF substrate). The color filter substrate can be one commonly used in the field of liquid crystal display panels.

The color filter substrate may have a configuration including, on a transparent substrate, components such as a black matrix formed in a grid pattern and color filters formed inside the grids, i.e., pixels. The black matrix may include a grid for each pixel such that the grid is superimposed on the boundaries of the pixels, and may also include a grid for each half pixel such that the grid crosses the center of the pixel in the transverse direction. A black matrix formed to be superimposed on dark line regions can reduce the chances of dark line observation.

The counter electrode 51 is arranged to face the pixel electrodes 31 across the liquid crystal layer 40. Vertical electric fields are generated between the counter electrode 51 and the pixel electrodes 31, so that the liquid crystal molecules 41 are tilted to provide display. Color filters may be arranged in the order of red (R), green (G), and blue (B), in the order of yellow (Y), red (R), green (G), and blue (B), or in the order of red (R), green (G), blue (B), and green (G) in each column, for example.

The counter electrode 51 is preferably a planar electrode. The counter electrode 51 may be a transparent electrode, and can be formed of, for example, a transparent conductive material such as indium tin oxide (ITO), indium zinc oxide (IZO), zinc oxide (ZnO), or tin oxide (SnO), or an alloy thereof.

An alignment film 70 may be provided between the first substrate 30 and the liquid crystal layer 40 and between the second substrate 50 and the liquid crystal layer 40. The alignment films 70 each have a function of controlling the alignment of the liquid crystal molecules 41 in the liquid crystal layer 40. When the voltage applied to the liquid crystal layer 40 is lower than the threshold voltage (including the case of no voltage application), the alignment of the liquid crystal molecules 41 in the liquid crystal layer 40 is mainly controlled by the function of the alignment films 70. The alignment films 70 may be vertical alignment films which align the liquid crystal molecules 41 at 85.0° to 89.0° relative to the substrates, for example.

The alignment films 70 may be photo-alignment films formed of a photo-alignment material. The photo-alignment material encompasses general materials that undergo structural change when irradiated with light (electromagnetic waves) such as ultraviolet light or visible light, and thereby exhibit an ability of controlling the alignment of the nearby liquid crystal molecules 41 (alignment controlling force) or change the alignment controlling force level and/or direction. Examples of the photo-alignment material include those containing a photo-reactive site which undergoes a reaction such as dimerization (formation of dimers), isomerization, photo-Fries rearrangement, or decomposition when irradiated with light. Examples of the photo-reactive site (functional group) which is dimerized and isomerized when irradiated with light include cinnamate, 4-chalcone, 4'-chalcone, coumarin, and stilbene. Examples of the photo-reactive site (functional group) which is isomerized when irradiated with light include azobenzene. Examples of the photo-reactive site which is photo-Fries rearranged when irradiated with light include phenolic ester structures. Examples of the photo-reactive site which is decomposed when irradiated with light include cyclobutane structures.

The liquid crystal molecules 41 can be tilted at a tilt azimuth by alignment treatment on the alignment films 70. The alignment treatment is preferably photo-alignment treatment which applies light (electromagnetic waves) such as ultraviolet light or visible light in the case where the alignment films 70 are photo-alignment films. Such photo-alignment treatment can be performed using, for example, a device that has a light source for applying light to the alignment films 70 and can perform continuous scan exposure over multiple pixels. Specific modes of the scan exposure include a mode of applying light from a light source to the substrate surfaces while moving the substrates; a mode of applying light from the light source to the substrate surfaces while moving the light source; and a mode of applying light from the light source to the substrate surfaces while moving the light source and the substrates.

For example, in each of the four alignment regions 10a, 10b, 10c, and 10d in a plan view of the liquid crystal display panel, the alignment film 70 on the first substrate 30 and the alignment film 70 on the second substrate 50 are set to provide pre-tilt azimuths opposite to each other and form an angle of 45° or smaller. The four alignment regions 10a, 10b, 10c, and 10d can thereby provide different tilt azimuths to the liquid crystal molecules 41. More preferably, the alignment film 70 on the first substrate 30 and the alignment film 70 on the second substrate 50 provide pre-tilt azimuths opposite to each other and parallel to each other. In this case, the alignment film 70 on the first substrate 30 and the alignment film 70 on the second substrate 50 provide pre-tilt azimuths substantially 180° different from each other. For example, in the case where the first alignment region 10a provides a tilt azimuth of approximately 225° to the liquid crystal molecules 41, the alignment film 70 on the first substrate 30 is set to provide a pre-tilt azimuth of approximately 225° and the alignment film 70 on the second substrate 50 is set to provide a pre-tilt azimuth of approximately 45°. Here, the pre-tilt azimuth provided by the alignment film 70 on the first substrate 30 is an azimuth at which the liquid crystal molecules 41 are tilted relative to the alignment film 70 on the first substrate 30 when no voltage is applied to the liquid crystal layer. The pre-tilt azimuth provided by the alignment film 70 on the second substrate 50 is an azimuth at which the liquid crystal molecules 41 are tilted relative to the alignment film 70 on the second substrate 50 when no voltage is applied to the liquid crystal layer. The expression "substantially 0°" means the range up to an angle of 15°, preferably an angle of 5°, from the 0° point in the clockwise or counterclockwise direction.

In the liquid crystal display panel of the present embodiment, the pixels 10 in the row direction and the column direction may consecutively have the first alignment division pattern or the second alignment division pattern. Also, the pixels 10 in the row direction may consecutively have the first alignment division pattern or the second alignment division pattern, and every multiple pixels in the column direction may alternately have the first alignment division pattern and the second alignment division pattern. The first alignment division pattern and the second alignment division pattern by themselves are, as shown in FIG. 4, alignment division patterns achieving favorable viewing angle characteristics in observation from the vertical and horizontal directions. Yet, in the case where these patterns are employed over the entire liquid crystal display panel, these patterns are preferably selectively set to avoid flicker, coloring, and luminance difference, particularly with consideration on the display quality from an oblique direction. In particular, when a pixel with $|V1(k)|>|V2(k)|$ is arranged next to a pixel with $|V1(k)|>|V2(k)|$ in the column direction and next to a pixel with $|V1(k)|<|V2(k)|$ in the row direction, the pixels in the row direction and the column direction preferably consecutively have the first alignment division pattern or the second alignment division pattern. When the pixels with $|V1(k)|>|V2(k)|$ are arranged consecutively in the row direction and the column direction or the pixels with $|V1(k)|<|V2(k)|$ are arranged consecutively in the row direction and the column direction, the pixels in the row direction preferably consecutively have the first alignment division pattern or the second alignment division pattern, and the pixels in the column direction preferably alternately have the first alignment division pattern and the second alignment division pattern.

A first polarizing plate 20 may be formed on or adjacent to the surface of the first substrate 30 opposite to the liquid crystal layer 40, and a second polarizing plate 60 may be formed on or adjacent to the surface of the second substrate 50 opposite to the liquid crystal layer 40. The polarization axis of the first polarizing plate 20 and the polarization axis of the second polarizing plate 60 may be perpendicular to each other. For example, the first polarizing plate 20 and the second polarizing plate 60 may be arranged such that one of the polarization axes is parallel to the azimuth in the transverse direction of the pixels 10 and the other polarization axis is perpendicular to the azimuth in the transverse direction of the pixels 10. The transmittance reaches the highest when the tilt azimuth of the liquid crystal molecules 41 forms an angle of 45° with the polarization axes of the polarizing plates. Hence, the transmittance can be made higher by arranging the azimuth in the transverse direction of the pixel 10 and the polarization axis of one of the polarizing plates to be parallel to each other and setting each of the first alignment region 10a, the second alignment region 10b, the third alignment region 10c, and the fourth alignment region 10d to be an alignment region providing a tilt azimuth of approximately 45°, an alignment region providing a tilt azimuth of approximately 135°, an alignment region providing a tilt azimuth of approximately 225°, or an alignment region providing a tilt azimuth of approximately 315°, with the azimuth in the transverse direction of the pixel 10 defined as 0°. Here, the polarization axis may be an absorption axis or a transmission axis of a polarizing plate. Typical examples of the first polarizing plate 20 and the second polarizing plate 60 include those obtained by adsorbing a dichroic anisotropic material such as an iodine complex on a polyvinyl alcohol (PVA) film and aligning the material. Typically, each surface of a PVA film is laminated with a protective film such as a triacetyl cellulose film for practical use. An optical film such as a retardation film may be arranged between the first polarizing plate 20 and the first substrate 30 or between the second polarizing plate 60 and the second substrate 50.

In the liquid crystal display panel 100 of the present embodiment, typically, the first substrate 30 and the second substrate 50 are bonded to each other by the sealing material 80 provided to surround the liquid crystal layer 40, so that the liquid crystal layer 40 is held in a predetermined region. The sealing material 80 may be, for example, an epoxy resin containing an inorganic or organic filler and a curing agent.

The present embodiment may utilize a polymer sustained alignment (PSA) technique. The PSA technique encloses a liquid crystal composition containing photo-polymerizable monomers between the first substrate 30 and the second substrate 50, irradiating the liquid crystal layer 40 with light to polymerize the photo-polymerizable monomers, thereby forming a polymer on the surface of each alignment film 70 so as to define the initial tilt (pre-tilt) of liquid crystal with the polymer.

The liquid crystal display panel of the present embodiment may be a liquid crystal display device including a backlight at the backside. A liquid crystal display device having such a configuration is typically called a transmissive liquid crystal display device. The backlight may be any backlight that emits light including only visible light or light including both visible light and ultraviolet light. In order to provide color display on the liquid crystal display device, a backlight emitting white light is suitable. Suitable kinds of the backlight include light emitting diodes (LEDs). The "visible light" as used herein means light (electromagnetic waves) having a wavelength of 380 nm or longer but shorter than 800 nm.

The liquid crystal display device has a configuration including, as well as the liquid crystal display panel and the backlight, multiple components including external circuits such as a tape-carrier package (TCP) and a printed circuit board (PCB); optical films such as a viewing angle-increasing film and a luminance-increasing film; and a bezel (frame). Some components, if appropriate, may be incorporated into another component. Components other than those described above are not particularly limited and are not described here because such components can be those commonly used in the field of liquid crystal display devices.

Hereinabove, an embodiment of the present invention has been described. Each and every detail described for the above embodiment of the present invention should be applied to all the aspects of the present invention.

The present invention is described in more detail below based on examples and reference examples. The present invention, however, is not limited to these examples.

Example 1

Figure 11:
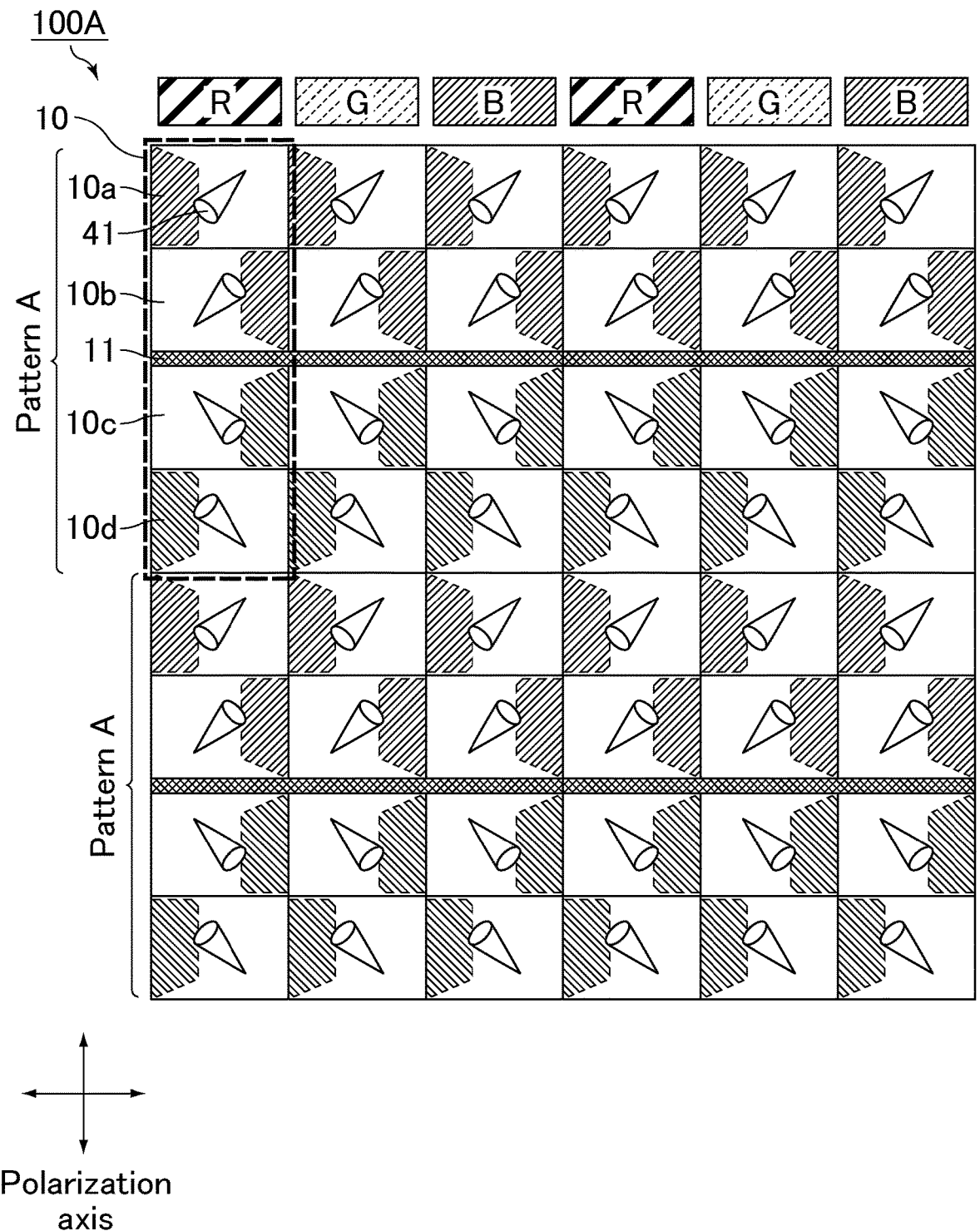
FIG. 11 is a schematic plan view of a liquid crystal display panel of Example 1.

In Example 1, pixels in the row direction and the column direction of the liquid crystal display panel consecutively had the same alignment division pattern. FIG. 11 is a schematic plan view of a liquid crystal display panel of Example 1. In FIG. 11, the portion surrounded by a dotted line corresponds to one pixel. In Example 1, a CF substrate was used which included color filters in the order of red (R), green (G), and blue (B) for the columns. Three pixels corresponding to the R, G, and B color filters constitute one unit of display.

A liquid crystal display panel 100A of Example 1 employed an alignment division pattern for the liquid crystal molecules 41 of Pattern A both in the row and column directions. The liquid crystal display panel was in a multi-sub-pixel driving mode which provides the bright tone and the dark tone in a checkered pattern to half pixels. Also, the liquid crystal display panel included pixels with positive voltage polarity and pixels with negative voltage polarity in a checkered pattern and was driven by inverting the polarities in cycles. The first pixel electrode and the second pixel electrode were each an electrode provided with slits extending parallel to the tilt azimuth of the liquid crystal molecules 41. The polarizing plates were arranged such that their polarization axes were perpendicular to each other and one of the polarization axes was perpendicular to the long sides of the pixels.

Display patterns, namely gray display, single color display, horizontal stripe display, and vertical stripe display at a grayscale value of 0 to 255, were shown on the obtained liquid crystal display panel, so that the influence on the display quality was determined. In order to achieve a grayscale value of 0, voltage giving a grayscale value of 0 was applied to both the first pixel electrode and the second pixel electrode. In order to achieve an intermediate grayscale value (grayscale value other than 0 and 255), voltage was applied such that the absolute value of the voltage applied to the first pixel electrode was greater than the absolute value of the voltage applied to the second pixel electrode or the absolute value of the voltage applied to the first pixel electrode was smaller than the absolute value of the voltage applied to the second pixel electrode. In order to achieve a grayscale value of 255, voltage giving a grayscale value of 255 was applied to both the first pixel electrode and the second pixel electrode. Gray display was achieved by applying voltage giving the same grayscale value of 255 or 0 or the same intermediate grayscale value to all the R, G, and B pixels. Gray display at a grayscale value of 255 shows a white color on the entire display screen while gray display at a grayscale value of 0 shows a black color on the entire display screen. Single color display was achieved by applying voltage giving a grayscale value of 255 or an intermediate grayscale value to the pixels of one of the R, G, and B colors while applying voltage giving a grayscale value of 0 to the pixels of the other colors. Horizontal stripe display includes single stripe display and multiple stripe display. Single horizontal stripe display was achieved by applying voltage giving a grayscale value of 255 or an intermediate grayscale value to a row of pixels and voltage giving a grayscale value of 0 to another row of pixels alternately. Multiple horizontal stripe display was achieved by applying voltage giving a grayscale value of 255 or an intermediate grayscale value to n rows of pixels and voltage giving a grayscale value of 0 to n rows of pixels alternately, wherein n is an integer of 2 or greater. Vertical stripe display includes single stripe display and multiple stripe display. Single vertical stripe display was achieved by applying voltage giving a grayscale value of 255 or an intermediate grayscale value to a column of sub-pixels and voltage giving a grayscale value of 0 to a column of sub-pixels alternately. Multiple vertical stripe display was achieved by applying voltage giving a grayscale value of 255 or an intermediate grayscale value to n columns of sub-pixels and voltage giving a grayscale value of 0 to n columns of sub-pixels alternately, wherein n is an integer of 2 or greater. The results are shown in Table 2.

TABLE 2

| Display pattern | | | Influence on display quality |
|---|---|---|---|
| Gray display | | Grayscale value of 255 | None |
| | | Intermediate grayscale value | None |
| Single color display | | Grayscale value of 0 | None |
| | | Grayscale value of 255 | None |
| | | Intermediate grayscale value | None |
| Horizontal stripe display | Single stripe | Grayscale value of 255 | None |
| | | Intermediate grayscale value | Influenced (flicker) |
| | Multiple stripe | Grayscale value of 255 | None |
| | | Intermediate grayscale value | Almost none (flicker) |
| Vertical stripe display | Single stripe | Grayscale value of 255 | None |
| | | Intermediate grayscale value | Influenced (coloring) |
| | Multiple stripe | Grayscale value of 255 | None |
| | | Intermediate grayscale value | Almost none (coloring) |

Table 2 shows that most of the display patterns had no influence on the display quality in Example 1. Yet, in observation from an angle of 45°, flicker was observed in single horizontal stripe display at an intermediate grayscale value, and coloring was observed in single vertical stripe display at an intermediate grayscale value. Also, flicker was generated in multiple odd-number horizontal stripe display at an intermediate grayscale value, while coloring was generated in multiple odd-number vertical stripe display at an intermediate grayscale value. These phenomena, however, were hardly perceivable and thus had almost no influence on display.

Figure 12:
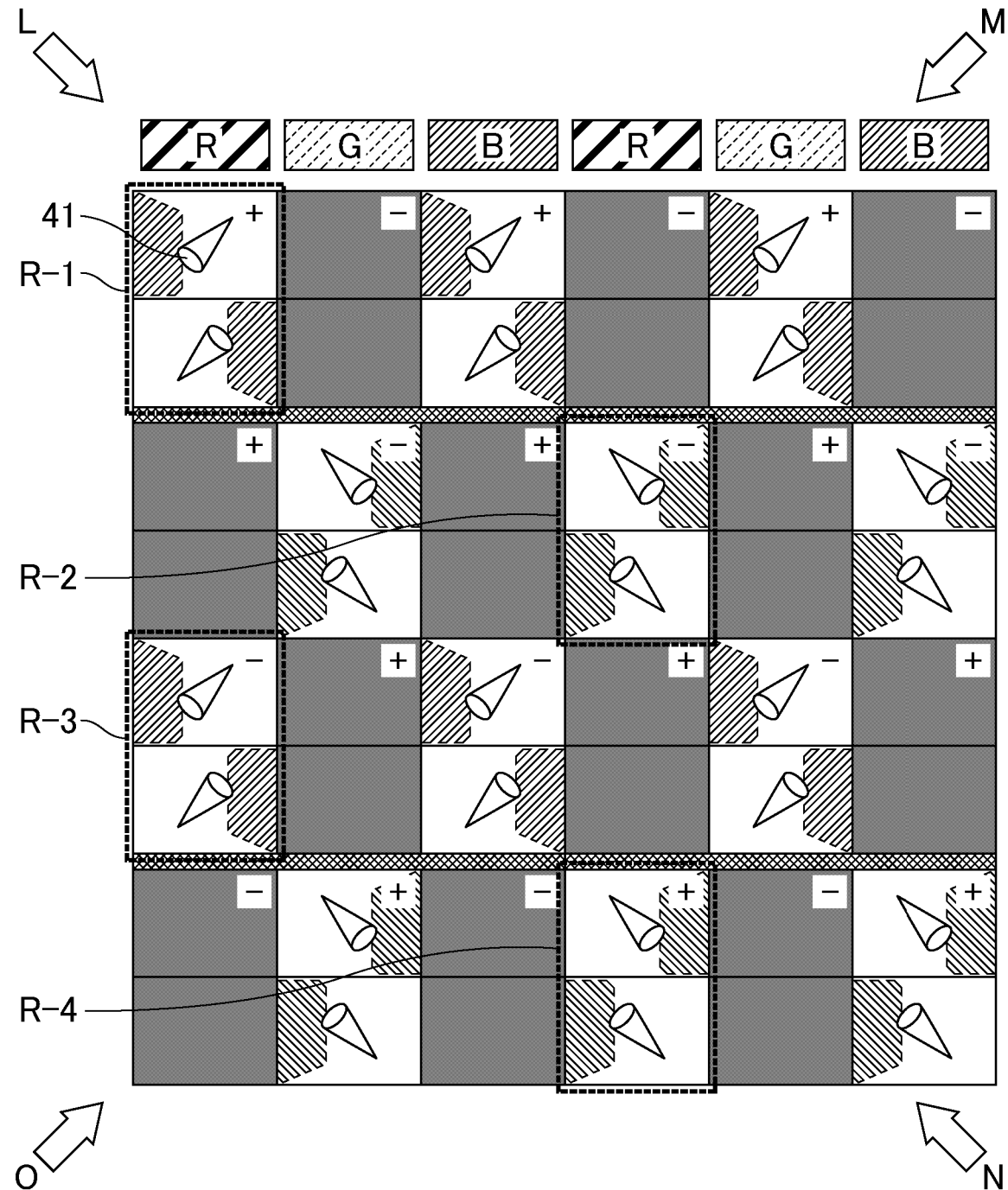
FIG. 12 is a schematic plan view of the liquid crystal display panel of Example 1 in gray display at an intermediate grayscale value.
Figure 13:
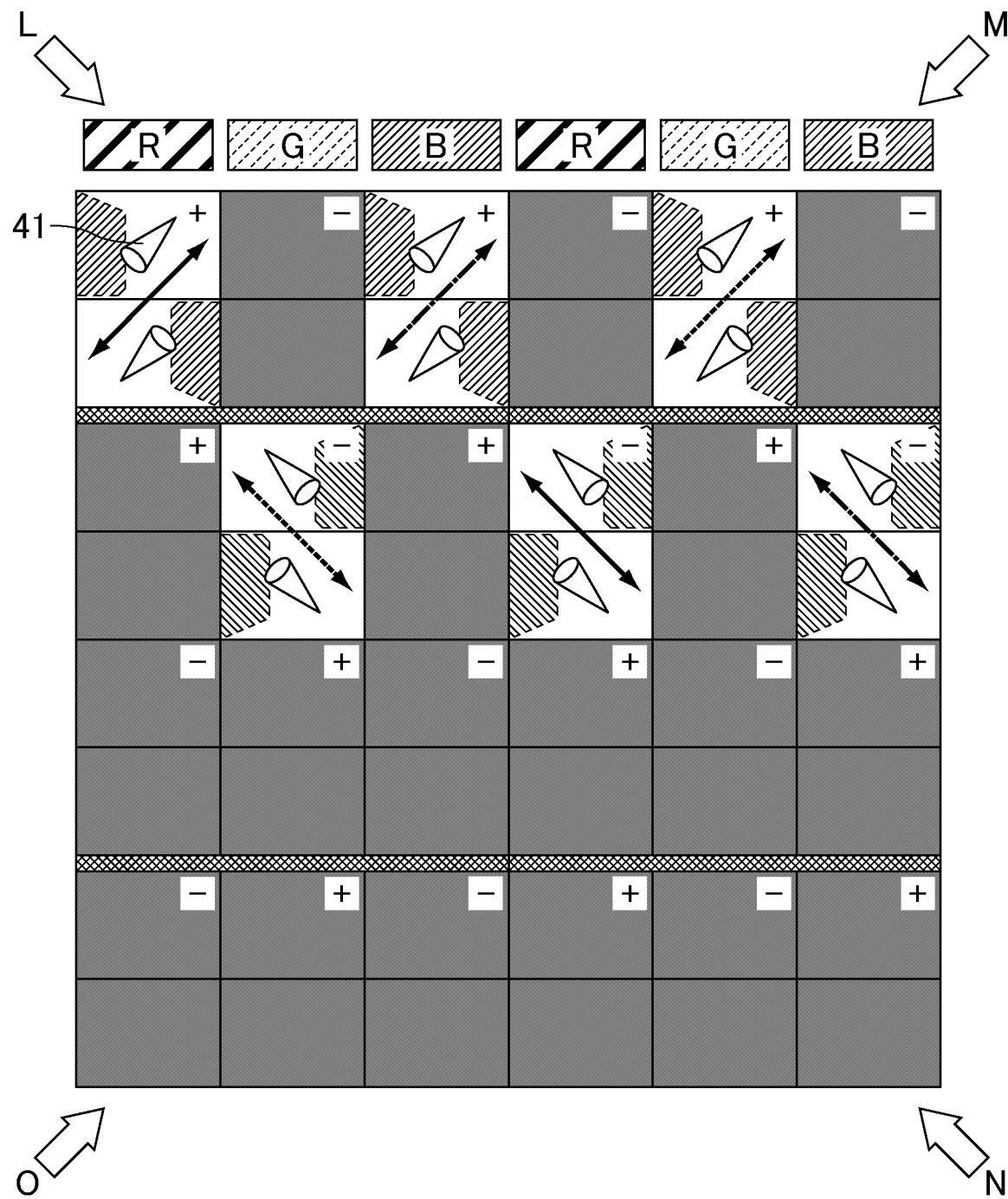
FIG. 13 is a schematic plan view of the liquid crystal display panel of Example 1 in single horizontal stripe display at an intermediate grayscale value.
Figure 14:
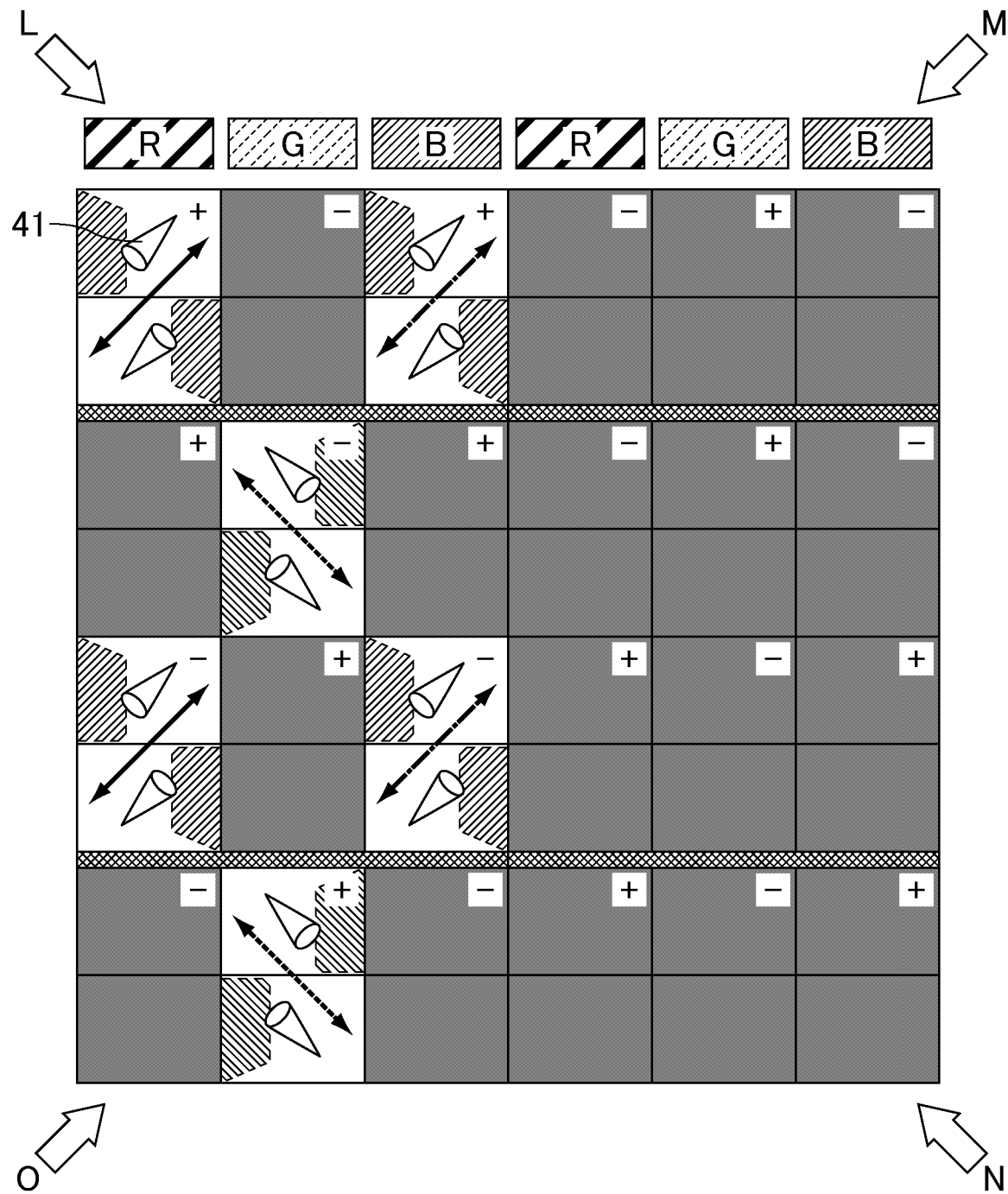
FIG. 14 is a schematic plan view of the liquid crystal display panel of Example 1 in single vertical stripe display at an intermediate grayscale value.

Hereinafter, influence on the display quality is described using FIG. 12 to FIG. 14, for gray display at an intermediate grayscale value, single horizontal stripe display at an intermediate grayscale value, and single vertical stripe display at an intermediate grayscale value. FIG. 12 to FIG. 14 are schematic plan views of the liquid crystal display panel of Example 1 in gray display at an intermediate grayscale value, single horizontal stripe display at an intermediate grayscale value, and single vertical stripe display at an intermediate grayscale value, respectively. In FIG. 12 to FIG. 14, white half pixels are in a bright tone while dark half pixels are in a dark tone. In each half pixel, only the main tilt direction of the liquid crystal molecules 41 is shown, and the liquid crystal molecules 41 near the edge of the pixel and the other components were not illustrated. Also, the liquid crystal molecules 41 were not illustrated in the dark half pixels. At upper right of each half pixel, the polarity of the half pixel is shown as positive (+) or negative (−). White arrows L, M, N, and O indicate the azimuths in observation from an angle of 45°. In FIG. 13 and FIG. 14, the double-headed arrows each indicate the tilt azimuth of the liquid crystal molecules 41 in the half pixel. Here, solid double-headed arrows are for red (R) half pixels, dotted double-headed arrows are for green (G) half pixels, and dot-dash double-headed arrows are for blue (B) half pixels. The same applies to the drawings mentioned below.

FIG. 12 shows gray display at an intermediate grayscale value. The drawing shows red (R) pixels in a bright tone, and the half pixel R-1 has an alignment pattern of Pattern a shown in FIG. 4 for the liquid crystal molecules 41 and has positive polarity. The half pixel R-2 has an alignment pattern of Pattern b shown in FIG. 4 for the liquid crystal molecules 41 and has negative polarity. The half pixel R-3 has an alignment pattern of Pattern a shown in FIG. 4 for the liquid crystal molecules 41 and has negative polarity. The half pixel R-4 has an alignment pattern of Pattern b shown in FIG. 4 for the liquid crystal molecules 41 and has positive polarity. In this manner, the half pixel R-1, the half pixel R-2, the half pixel R-3, and the half pixel R-4 have alignment patterns for the liquid crystal molecules 41 and polarities in different combinations. The same applies to green (G) and blue (B) pixels. In other words, for each color of red (R), green (G), and blue (B), half pixels with different combinations of the alignment patterns for the liquid crystal molecules 41 and the polarities are arranged evenly over the entire liquid crystal display panel. This configuration eliminates defects from display provided by the entire display panel.

FIG. 13 shows single horizontal stripe display at an intermediate grayscale value. The drawing shows half pixels in a bright tone, and the first row includes only half pixels with positive polarity and providing a tilt azimuth of 225° to the liquid crystal molecules 41 in the upper alignment region and a tilt azimuth of 45° to those in the lower alignment region. The second row includes only half pixels with negative polarity and providing a tilt azimuth of 315° to the liquid crystal molecules 41 in the upper alignment region and a tilt azimuth of 135° to those in the lower alignment region. This limits the polarity to positive or negative in observation at an angle of 45°, resulting in flicker observation. Multiple odd-number horizontal stripe display at an intermediate grayscale value caused flicker as in the case of the single horizontal stripe display, but this phenomenon had almost no influence on display provided by the entire liquid crystal display panel.

FIG. 14 shows single vertical stripe display at an intermediate grayscale value. Here, only half pixels having the same alignment pattern for the liquid crystal molecules 41 are arranged for each color, so that coloring was observed in observation at an angle of 45°. More specifically, green coloring was observed in observation from the azimuths of the white arrow L and the white arrow N in FIG. 14, and purple coloring was observed in observation from the azimuths of the white arrow M and the white arrow O. Here, multiple odd-number vertical stripe display at an intermediate grayscale value caused coloring as in the case of the single vertical stripe display, but this phenomenon had almost no influence on display provided by the entire liquid crystal display panel.

Example 2

Figure 15:
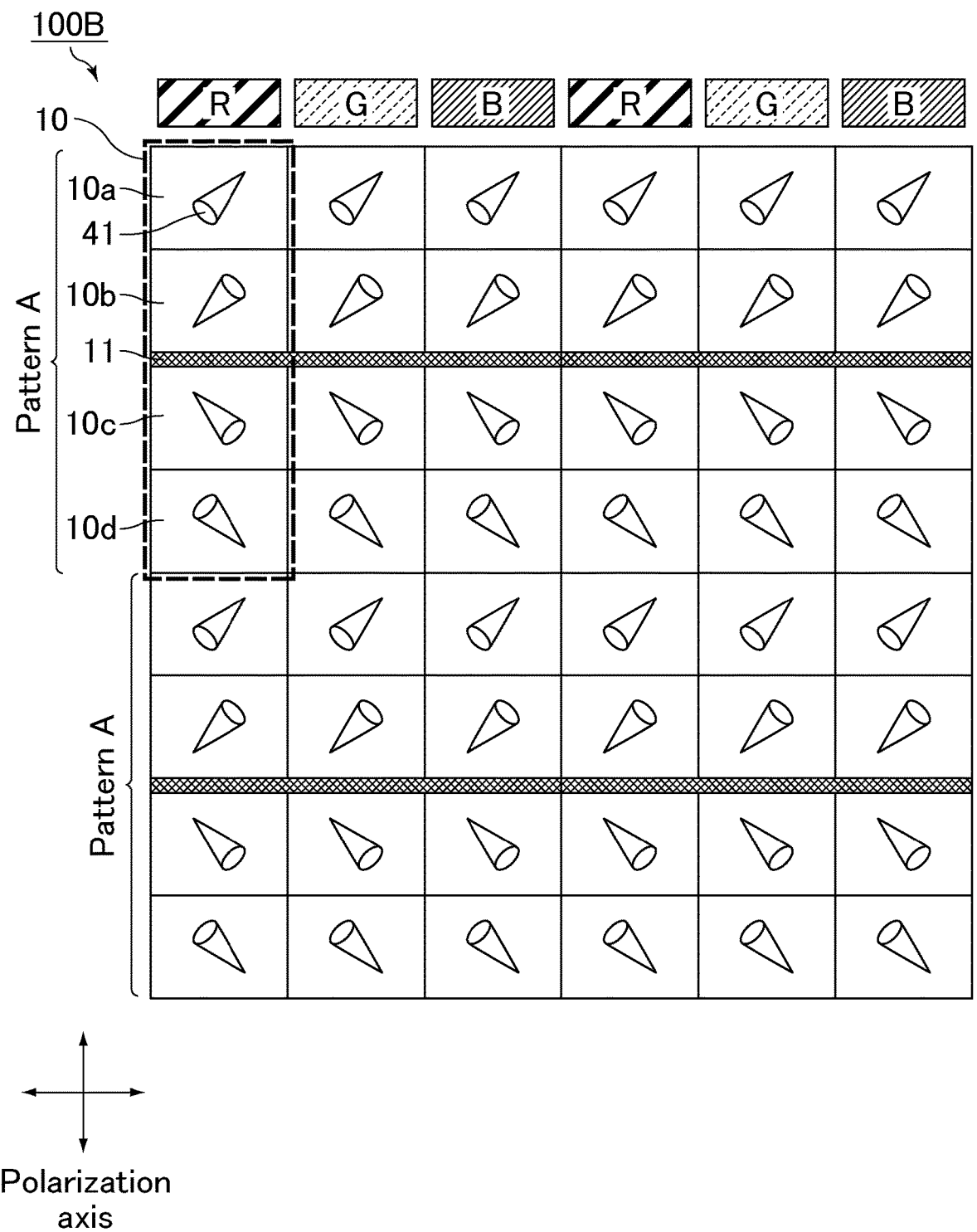
FIG. 15 is a schematic plan view of a liquid crystal display panel of Example 2.

A liquid crystal display panel of Example 2 was produced by a procedure similar to that in Example 1, except that the first pixel electrode and the second pixel electrode were electrodes provided with no slit. FIG. 15 is a schematic plan view of a liquid crystal display panel of Example 2. A liquid crystal display panel 100B of Example 2 exhibited a slightly decreased transmittance, but had favorable viewing angle characteristics as in Example 1.

Example 3

Figure 16:
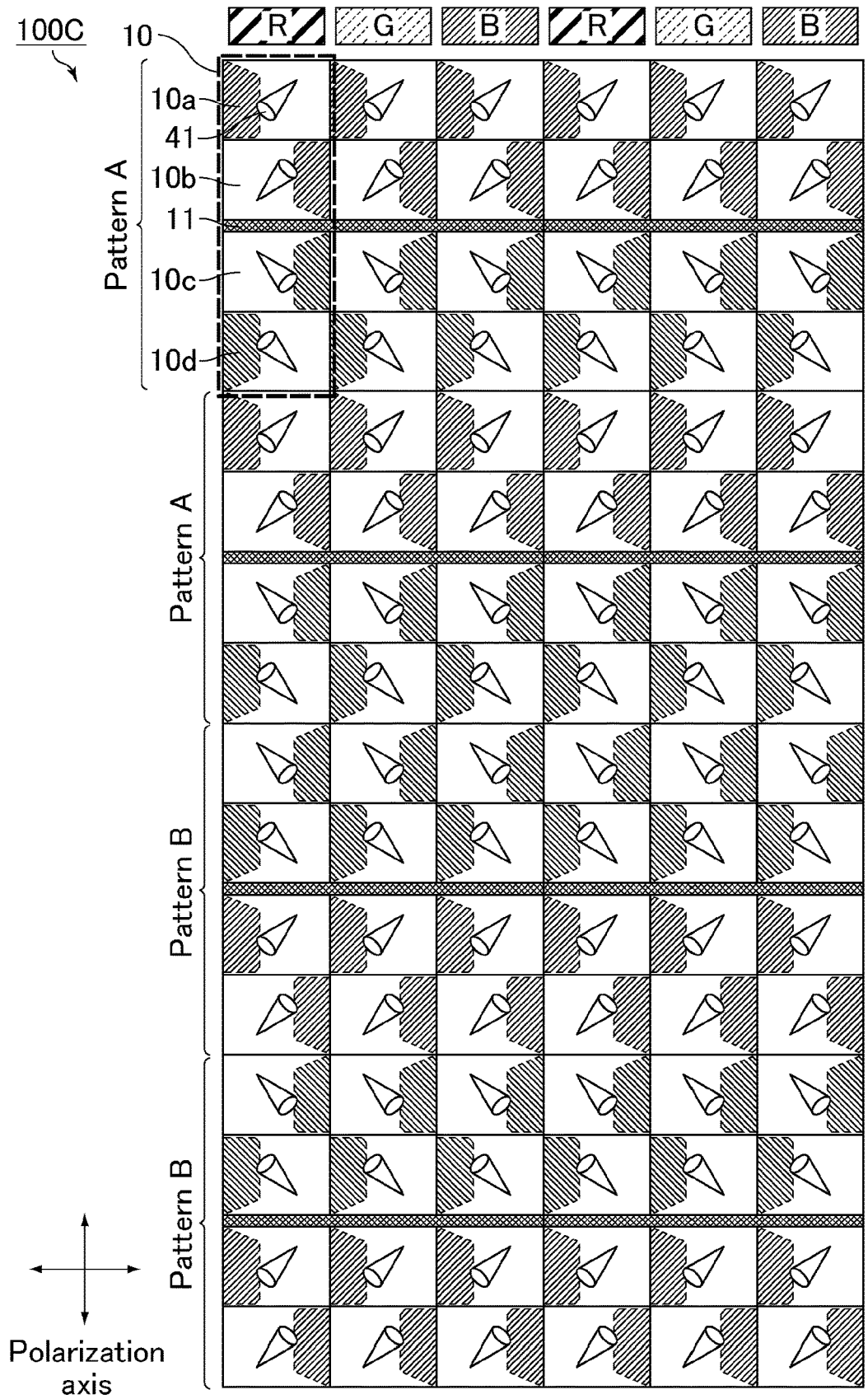
FIG. 16 is a schematic plan view of a liquid crystal display panel of Example 3.

A liquid crystal display panel 100C of Example 3 was produced by a procedure similar to that in Example 1, except that pixels in the row direction consecutively had an alignment division pattern of Pattern A or Pattern B and every two pixels in the column direction alternately had an alignment division pattern of Pattern A or Pattern B. FIG. 16 is a schematic plan view of a liquid crystal display panel of Example 3.

Display patterns, namely gray display at a grayscale value of 0 to 255, single color display, horizontal stripe display, and vertical stripe display at an intermediate grayscale value and a grayscale value of 255, were shown on the liquid crystal display panel of Example 3 as in Example 1, so that the influence on the display quality was determined. The results are shown in Table 3.

TABLE 3

| Display pattern | | | Influence on display quality |
|---|---|---|---|
| Gray display | | Grayscale value of 255 | None |
| | | Intermediate grayscale value | None |
| | | Grayscale value of 0 | None |
| Single color display | | Grayscale value of 255 | None |
| | | Intermediate grayscale value | None |
| Horizontal stripe display | Single stripe | Grayscale value of 255 | None |
| | | Intermediate grayscale value | Influenced (flicker) |
| | Multiple stripe | Grayscale value of 255 | None |
| | | Intermediate grayscale value | Almost none (flicker) |
| Vertical stripe display | Single stripe | Grayscale value of 255 | None |
| | | Intermediate grayscale value | None |
| | Multiple stripe | Grayscale value of 255 | None |
| | | Intermediate grayscale value | None |

Table 3 shows that most of the display patterns had no influence on the display quality in Example 3. Yet, in observation from an angle of 45°, flicker was observed in single horizontal stripe display at an intermediate grayscale value. Also, flicker was generated in multiple odd-number horizontal stripe display at an intermediate grayscale value. These phenomena, however, were hardly perceivable and thus had almost no influence on display.

Figure 17:
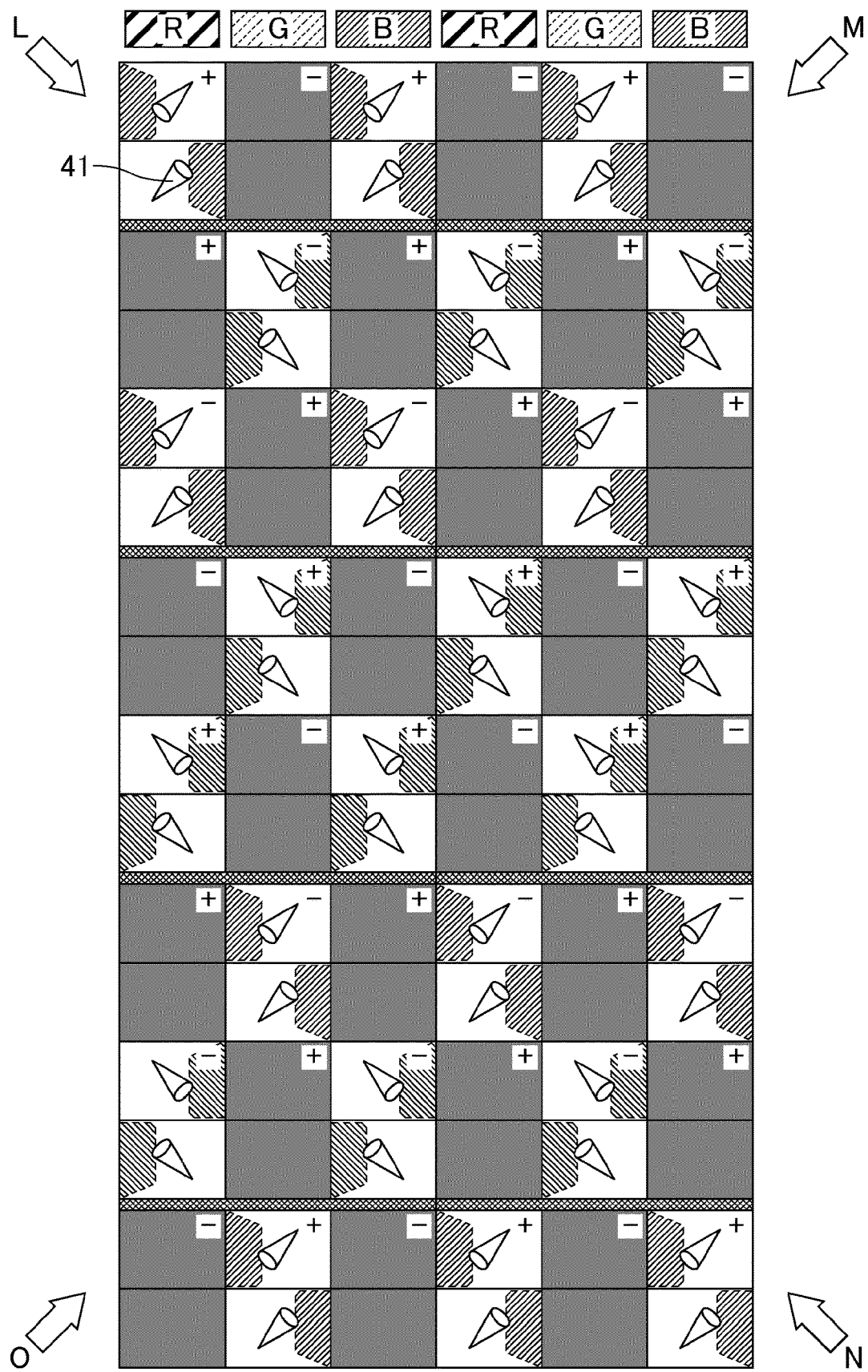
FIG. 17 is a schematic plan view of the liquid crystal display panel of Example 3 in gray display at an intermediate grayscale value.
Figure 18:
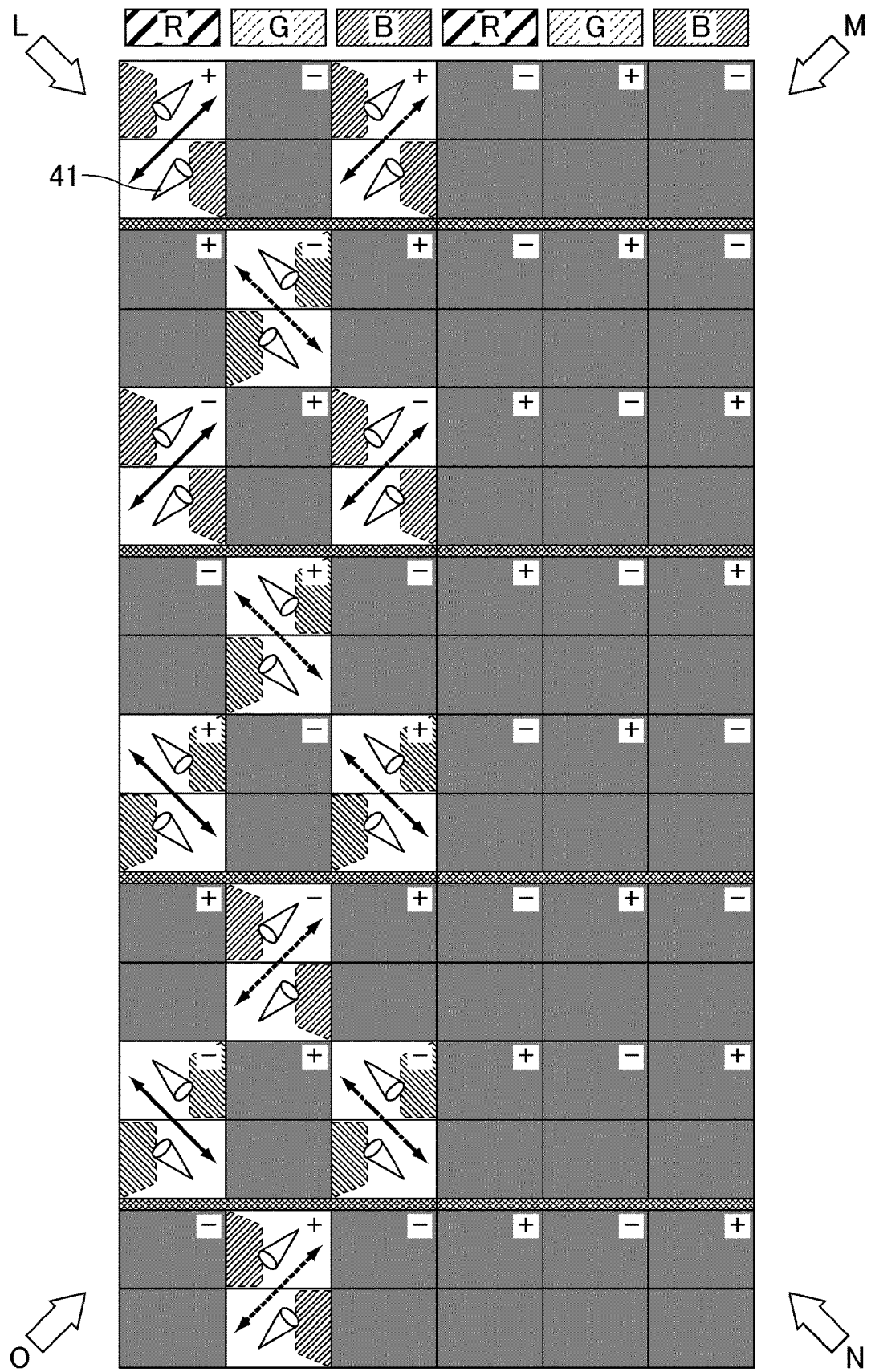
FIG. 18 is a schematic plan view of the liquid crystal display panel of Example 3 in single vertical stripe display at an intermediate grayscale value.

Hereinafter, influence on the display quality is described using FIG. 17 and FIG. 18, for gray display at an intermediate grayscale value and single vertical stripe display at an intermediate grayscale value. FIG. 17 and FIG. 18 are schematic plan views of the liquid crystal display panel of Example 3 in gray display at an intermediate grayscale value and single vertical stripe display at an intermediate grayscale value.

FIG. 17 shows gray display at an intermediate grayscale value. The drawing shows half pixels of red (R), green (G), and blue (B) with different tilt azimuths of the liquid crystal molecules 41 and different polarities arranged evenly. This configuration eliminates defects from display provided by the entire display panel.

Although not illustrated, since the polarity is limited to positive or negative in observation at an angle of 45° in single horizontal stripe display at an intermediate grayscale value as in Example 1, flicker was observed. Here, multiple odd-number horizontal stripe display at an intermediate grayscale value caused flicker as in the case of the single horizontal stripe display, but this phenomenon had almost no influence on display provided by the entire display panel.

FIG. 18 shows single vertical stripe display at an intermediate grayscale value. The drawing shows half pixels of red (R), green (G), and blue (B) with different tilt azimuths of the liquid crystal molecules 41 and different polarities arranged evenly. This configuration eliminates defects from display provided by the entire display panel and reduced coloring observed in Example 1. Coloring was also reduced in multiple vertical stripe display at an intermediate grayscale value.

Example 4

Figure 19:
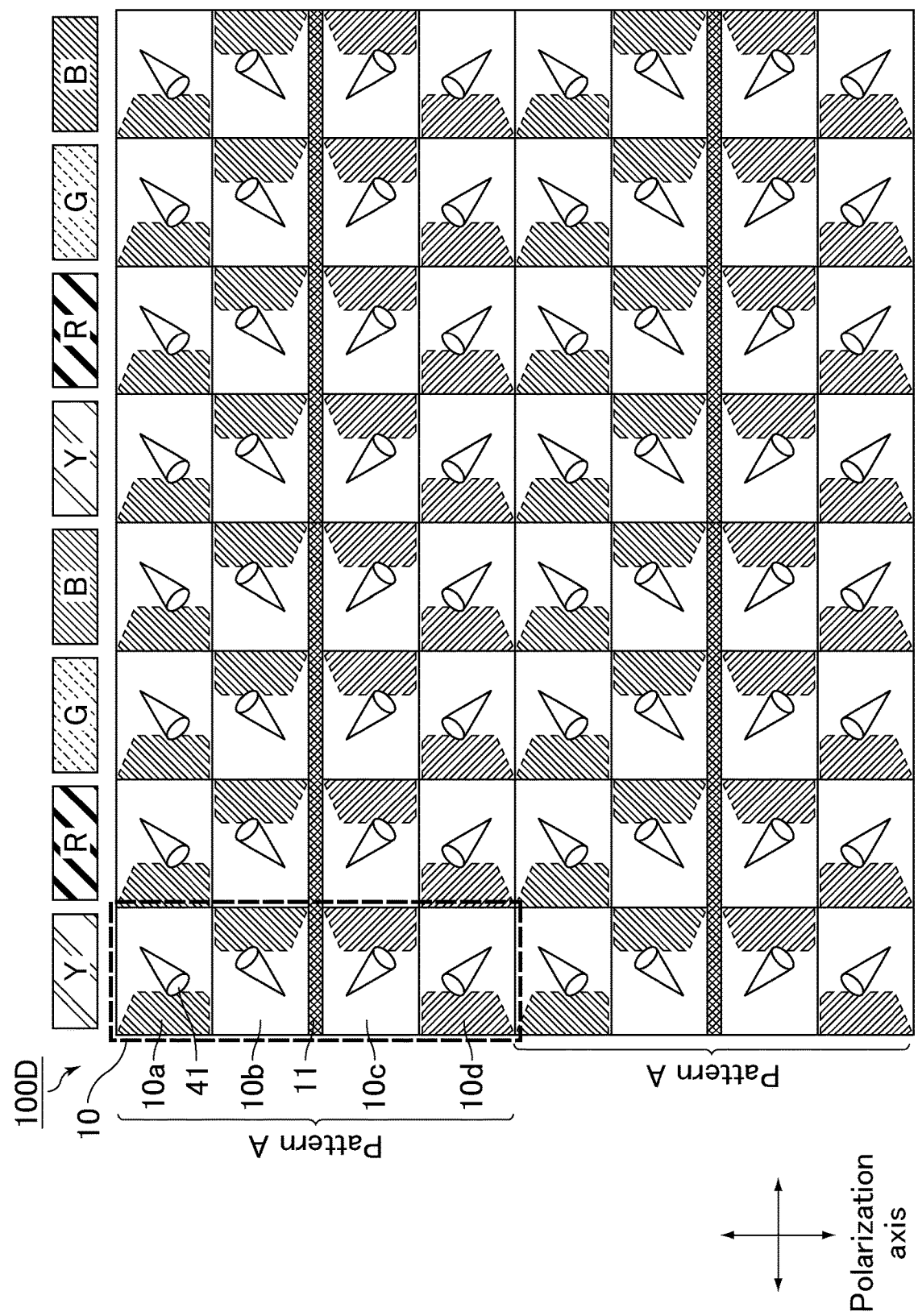
FIG. 19 is a schematic plan view of a liquid crystal display panel of Example 4.

A liquid crystal display panel 100D of Example 4 was produced by a procedure similar to that in Example 1, except that a CF substrate was used which included color filters in the order of yellow (Y), red (R), green (G), and blue (B) for the columns. FIG. 19 is a schematic plan view of a liquid crystal display panel of Example 4. The liquid crystal display panel 100D of Example 4 includes pixels corresponding to the Y, R, G, and B color filters constituting one unit to provide display.

Display patterns, namely gray display at a grayscale value of 0 to 255, and single color display, horizontal stripe display, and vertical stripe display at an intermediate grayscale value and a grayscale value of 255, were shown on the obtained liquid crystal display panel as in Example 1, so that the influence on the display quality was determined. The results are shown in Table 4.

TABLE 4

| Display pattern | | | Influence on display quality |
|---|---|---|---|
| Gray display | | Grayscale value of 255 | None |
| | | Intermediate grayscale value | None |
| | | Grayscale value of 0 | None |
| Single color display | | Grayscale value of 255 | None |
| | | Intermediate grayscale value | None |
| Horizontal stripe display | Single stripe | Grayscale value of 255 | None |
| | | Intermediate grayscale value | Influenced (flicker) |
| | Multiple stripe | Grayscale value of 255 | None |
| | | Intermediate grayscale value | Almost none (flicker) |
| Vertical stripe display | Single stripe | Grayscale value of 255 | None |
| | | Intermediate grayscale value | Influenced (coloring) |
| | Multiple stripe | Grayscale value of 255 | None |
| | | Intermediate grayscale value | Almost none (coloring) |

Table 4 shows that most of the display patterns had no influence on the display quality in Example 4. Yet, in observation from an angle of 45°, flicker was observed in single horizontal stripe display at an intermediate grayscale value, and coloring was observed in single vertical stripe display at an intermediate grayscale value. Also, flicker was generated in multiple odd-number horizontal stripe display at an intermediate grayscale value, while coloring was generated in multiple odd-number vertical stripe display at an intermediate grayscale value. These phenomena, however, were hardly perceivable and thus had almost no influence on display.

Figure 20:
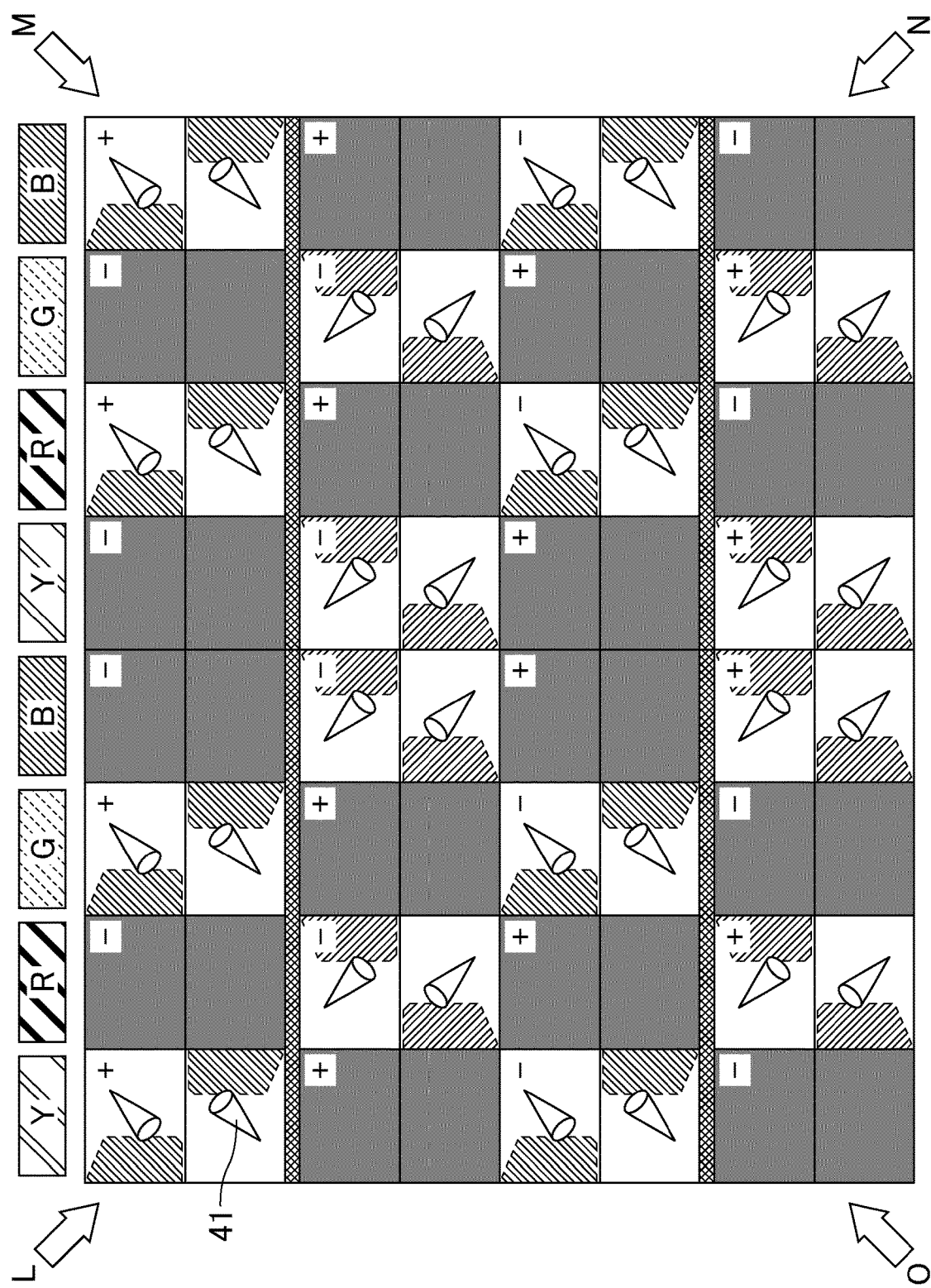
FIG. 20 is a schematic plan view of the liquid crystal display panel of Example 4 in gray display at an intermediate grayscale value.
Figure 21:
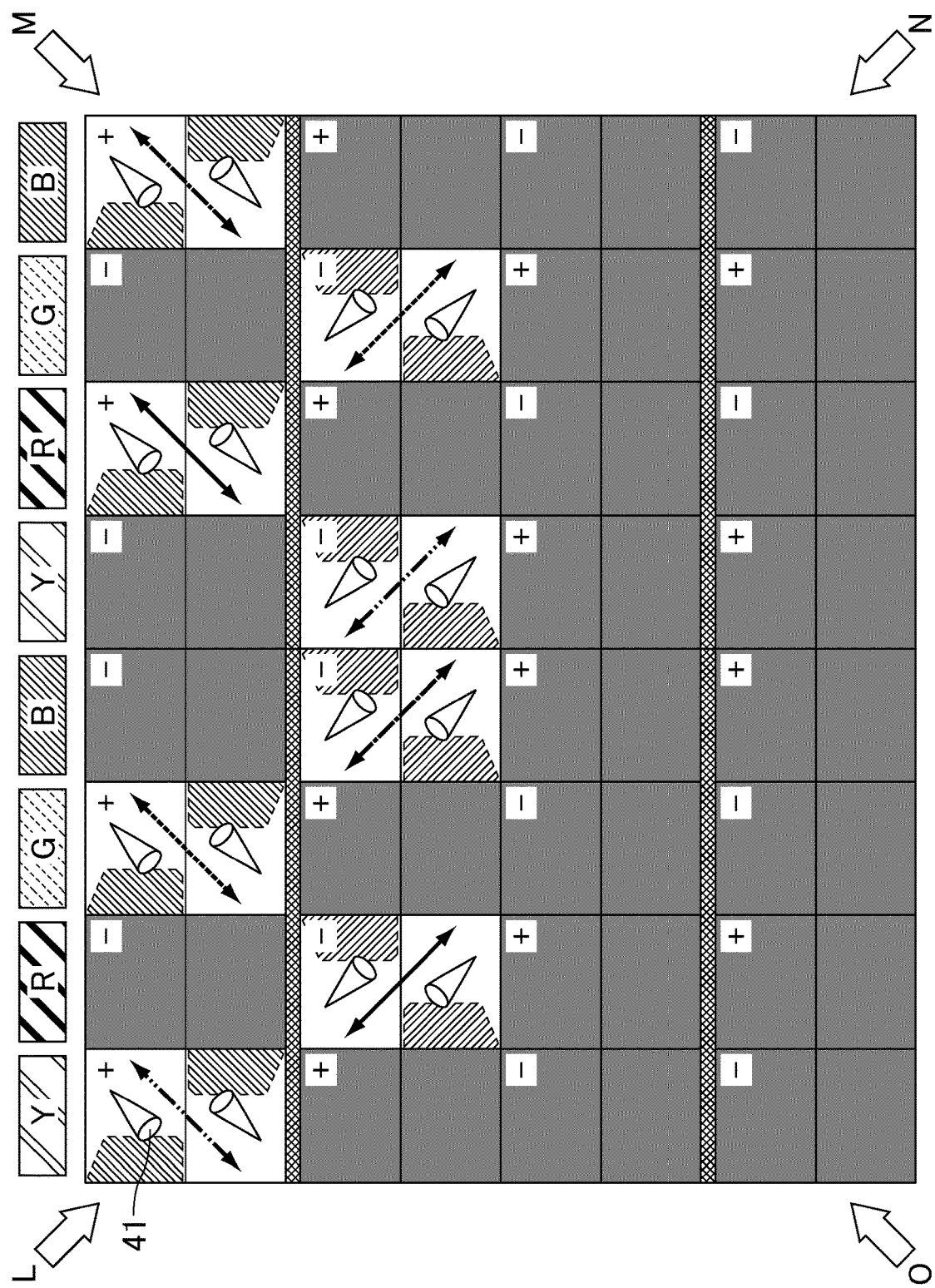
FIG. 21 is a schematic plan view of the liquid crystal display panel of Example 4 in single horizontal stripe display at an intermediate grayscale value.
Figure 22:
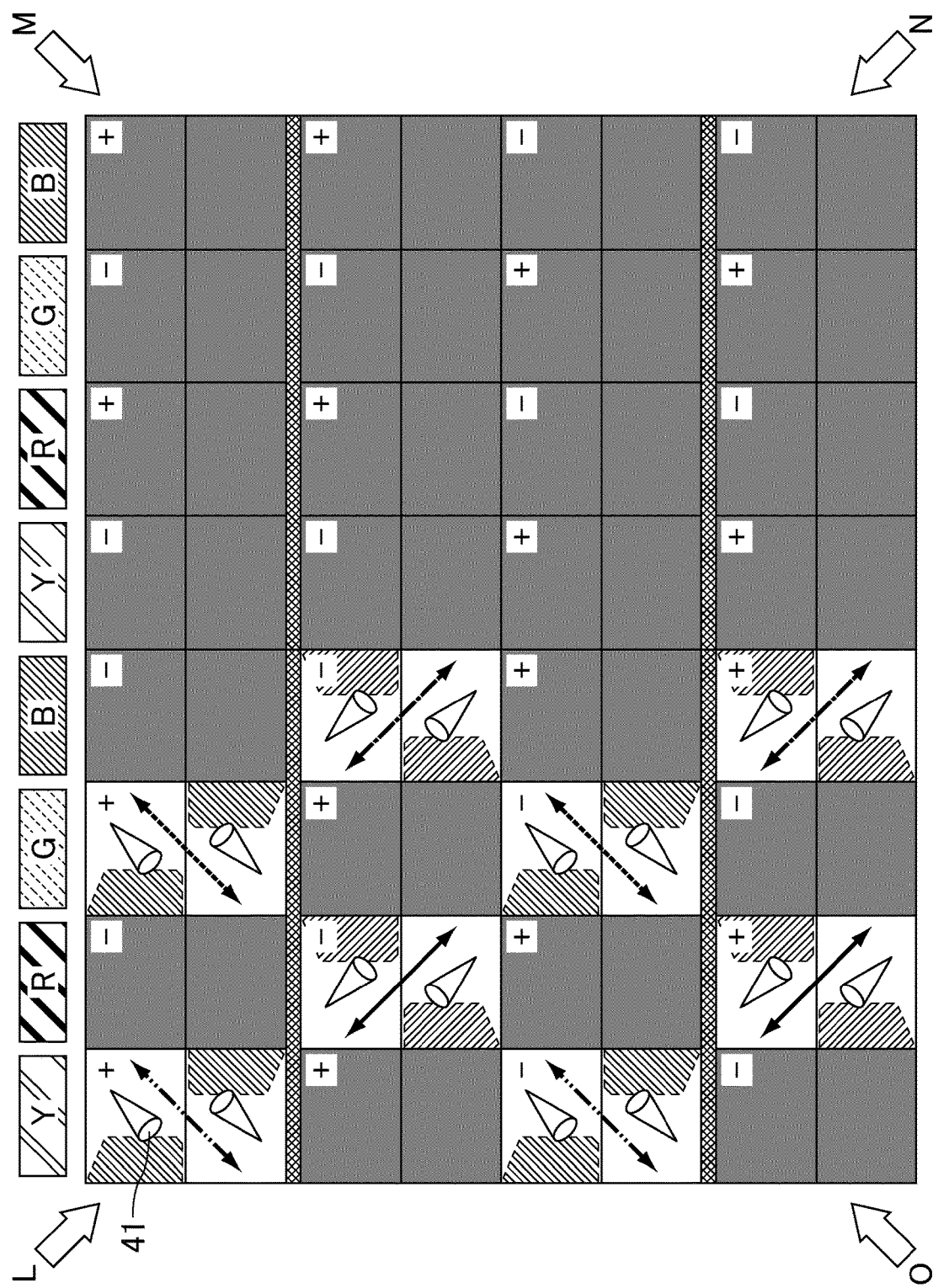
FIG. 22 is a schematic plan view of the liquid crystal display panel of Example 4 in single vertical stripe display at an intermediate grayscale value.

Hereinafter, influence on the display quality is described using FIG. 20 to FIG. 22, for gray display at an intermediate grayscale value, single horizontal stripe display at an intermediate grayscale value, and single vertical stripe display at an intermediate grayscale value. FIG. 20 to FIG. 22 are schematic plan views of the liquid crystal display panel of Example 4 in gray display at an intermediate grayscale value, single horizontal stripe display at an intermediate grayscale value, and single vertical stripe display at an intermediate grayscale value, respectively. In FIG. 21 and FIG. 22, double-dashed double-headed arrows each indicate the tilt azimuth of the liquid crystal molecules 41 for yellow (Y) half pixels. The same applies to the drawings mentioned below.

FIG. 20 shows gray display at an intermediate grayscale value. The drawing shows half pixels of yellow (Y), red (R), green (G), and blue (B) with different tilt azimuths of the liquid crystal molecules 41 and different polarities arranged evenly over the entire liquid crystal display panel. This configuration eliminates defects from display provided by the entire display panel. Here, in display using units of display each consisting of Y, R, G, and B colors, as shown in FIG. 20, pixels with the same polarity may be arranged next to each other and pixels in the same brightness level may be arranged next to each other at borders of adjacent units.

FIG. 21 shows single horizontal stripe display at an intermediate grayscale value. The drawing shows half pixels in a bright tone. The first row includes only half pixels with positive polarity and providing a tilt azimuth of 225° to the liquid crystal molecules 41 in the upper alignment region and a tilt azimuth of 45° to those in the lower alignment region. The second row includes only half pixels with negative polarity and providing a tilt azimuth of 315° to the liquid crystal molecules 41 in the upper alignment region and a tilt azimuth of 135° to those in the lower alignment region. This limits the polarity to positive or negative in observation at an angle of 45°, resulting in flicker observation. Multiple odd-number horizontal stripe display at an intermediate grayscale value caused flicker as in the case of the single horizontal stripe display, but this phenomenon had almost no influence on display provided by the entire liquid crystal display panel.

FIG. 22 shows single vertical stripe display at an intermediate grayscale value. Here, only half pixels having the same alignment pattern for the liquid crystal molecules 41 are arranged for each color, so that coloring was observed in observation at an angle of 45°. More specifically, purple coloring was observed in observation from the azimuths of the white arrow L and the white arrow N in FIG. 22, and yellow green coloring was observed in observation from the azimuths of the white arrow M and the white arrow O. Here, multiple odd-number vertical stripe display at an intermediate grayscale value caused coloring as in the case of the single vertical stripe display, but this phenomenon had almost no influence on display provided by the entire liquid crystal display panel.

Example 5

Figure 23:
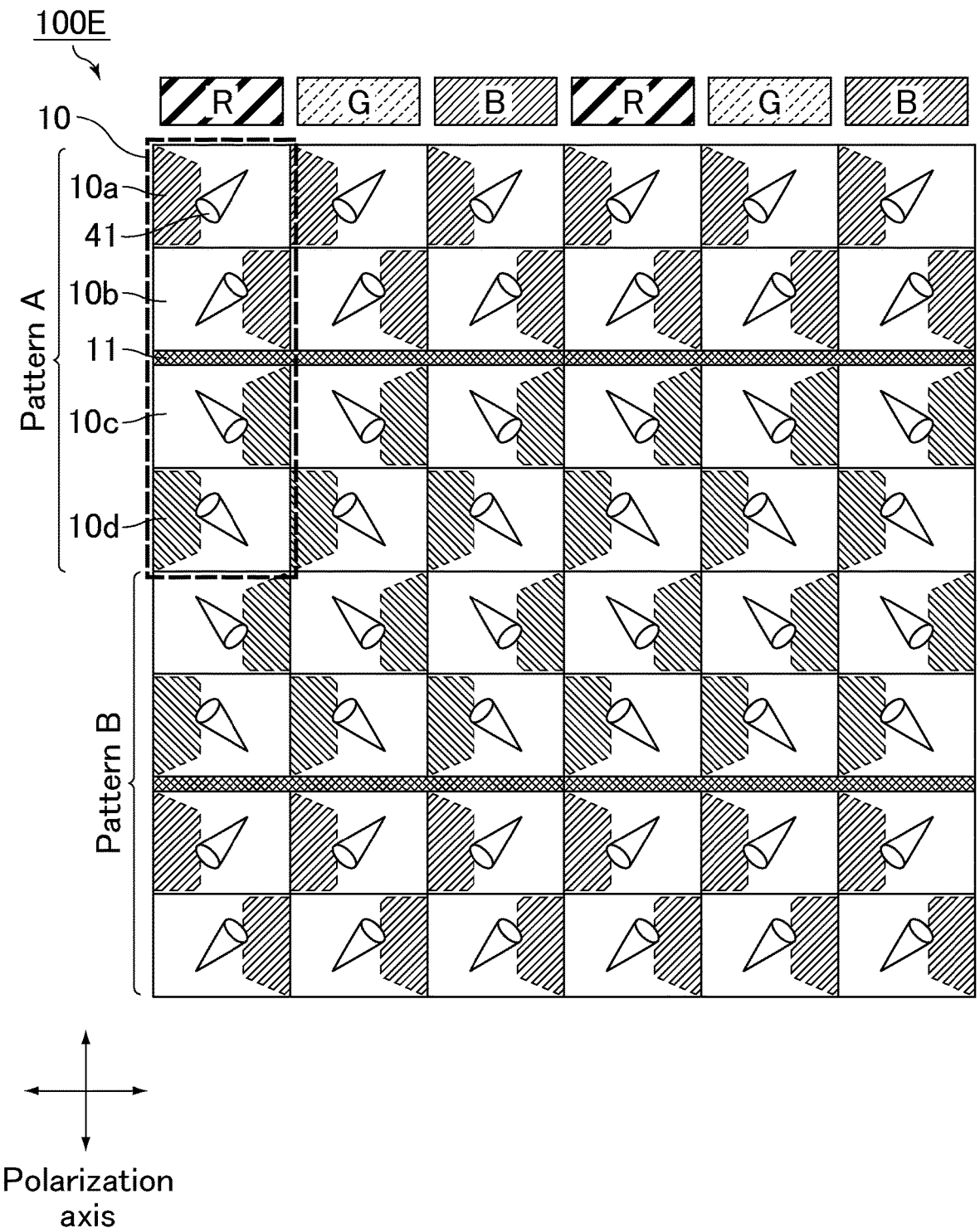
FIG. 23 is a schematic plan view of a liquid crystal display panel of Example 5.

In Example 5, pixels in the row direction of the liquid crystal display panel consecutively had the same alignment division pattern, and pixels in the column direction alternately had different alignment division patterns. FIG. 23 is a schematic plan view of a liquid crystal display panel of Example 5. In FIG. 23, the portion surrounded by the dotted line corresponds to one pixel. In Example 5, a CF substrate was used which included color filters in the order of red (R), green (G), and blue (B) for the columns.

A liquid crystal display panel 100E of Example 5 employed an alignment division pattern of Pattern A or Pattern B consecutively in the row direction, and Pattern A and Pattern B alternately in the column direction. The liquid crystal display panel was in a linear brightness mode which provides the bright tone and the dark tone alternately to the half pixel rows. Also, the liquid crystal display panel included pixels with positive voltage polarity and pixels with negative voltage polarity in a checkered pattern and was driven by inverting the polarities in cycles.

Display patterns, namely gray display at a grayscale value of 0 to 255, single color display, horizontal stripe display, and vertical stripe display at an intermediate grayscale value and a grayscale value of 255, were shown on the liquid crystal display panel of Example 5 as in Example 1, so that the influence on the display quality was determined. The results are shown in Table 5.

TABLE 5

| Display pattern | | | Influence on display quality |
|---|---|---|---|
| Gray display | | Grayscale value of 255 | None |
| | | Intermediate grayscale value | None |
| | | Grayscale value of 0 | None |
| Single color display | | Grayscale value of 255 | None |
| | | Intermediate grayscale value | None |
| Horizontal stripe display | Single stripe | Grayscale value of 255 | None |
| | | Intermediate grayscale value | Influenced (horizontal brightness difference) |
| | Multiple stripe | Grayscale value of 255 | None |
| | | Intermediate grayscale value | Almost none (horizontal brightness difference) |
| Vertical stripe display | Single stripe | Grayscale value of 255 | None |
| | | Intermediate grayscale value | None |
| | Multiple stripe | Grayscale value of 255 | None |
| | | Intermediate grayscale value | None |

Table 5 shows that most of the display patterns had no influence on the display quality in Example 5. Yet, in observation from an angle of 45°, horizontal luminance difference was observed in single horizontal stripe display at an intermediate grayscale value. Also, horizontal luminance difference was generated in multiple odd-number horizontal stripe display at an intermediate grayscale value. These phenomena, however, were hardly perceivable and thus had almost no influence on display.

Figure 24:
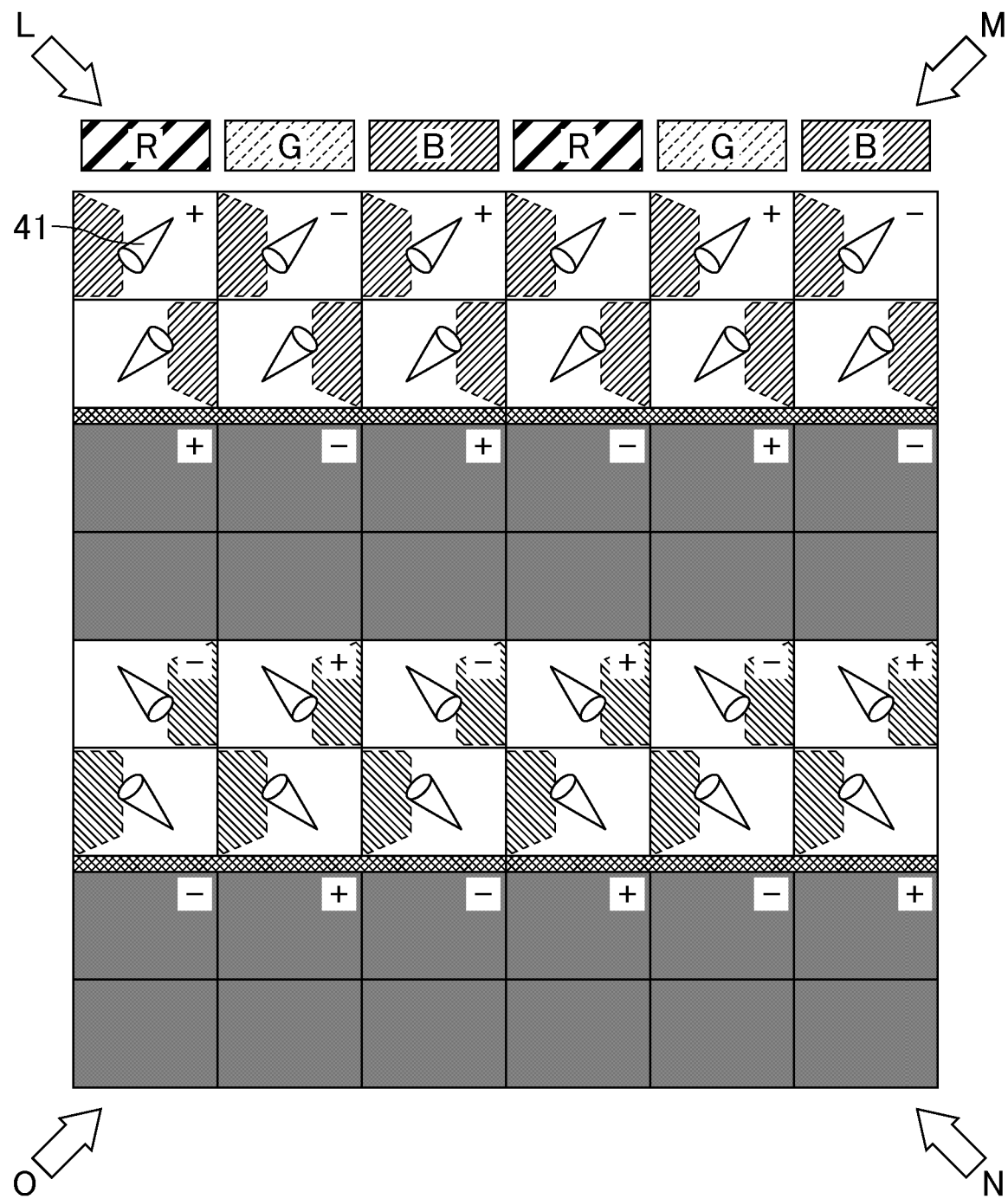
FIG. 24 is a schematic plan view of the liquid crystal display panel of Example 5 in gray display at an intermediate grayscale value.
Figure 25:
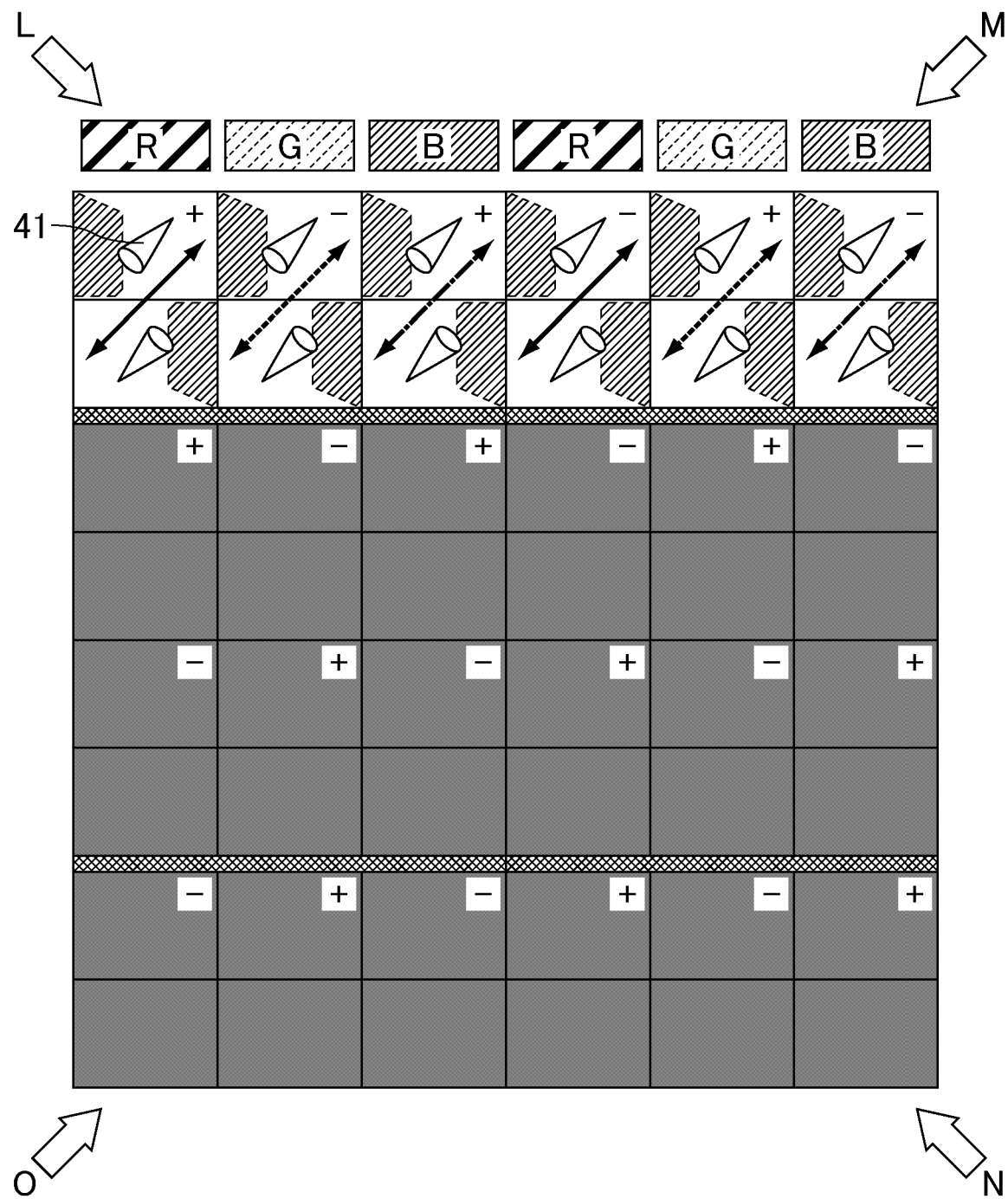
FIG. 25 is a schematic plan view of the liquid crystal display panel of Example 5 in single horizontal stripe display at an intermediate grayscale value.

Hereinafter, influence on the display quality is described using FIG. 24 and FIG. 25, for gray display at an intermediate grayscale value and single horizontal stripe display at an intermediate grayscale value. FIG. 24 and FIG. 25 are schematic plan views of the liquid crystal display panel of Example 5 in gray display at an intermediate grayscale value and single horizontal stripe display at an intermediate grayscale value, respectively.

FIG. 24 shows gray display at an intermediate grayscale value. The drawing shows half pixels of red (R), green (G), and blue (B) with different tilt azimuths of the liquid crystal molecules 41 and different polarities arranged evenly. This configuration eliminates defects from display provided by the entire display panel.

FIG. 25 shows single horizontal stripe display at an intermediate grayscale value. The drawing shows rows in a bright tone. The rows include only half pixels having the same pattern (Pattern a) for the tilt azimuths of the liquid crystal molecules 41 in the upper and lower alignment regions. This configuration produced different viewing angle characteristics between observation from the azimuths of the white arrow M and the white arrow O and observation from the azimuths of the white arrow L and the white arrow N, resulting in luminance difference. Here, multiple odd-number horizontal stripe display at an intermediate grayscale value caused horizontal luminance difference as in the case of the single horizontal stripe display, but this phenomenon had almost no influence on the display provided by the entire liquid crystal display panel.

Example 6

Figure 26:
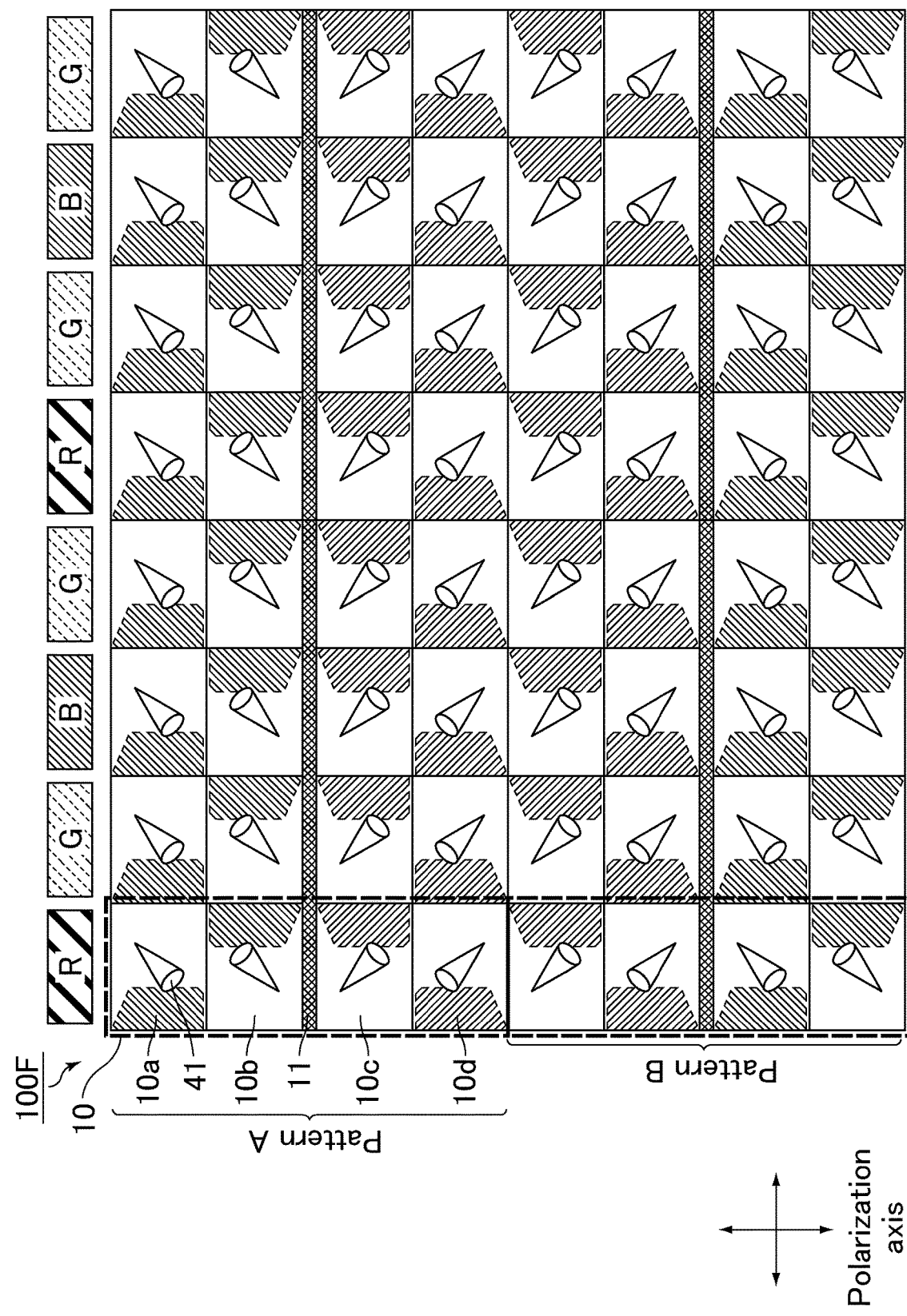
FIG. 26 is a schematic plan view of a liquid crystal display panel of Example 6.

A liquid crystal display panel 100F of Example 6 was produced by a procedure similar to that in Example 5, except that a CF substrate was used which included color filters in the order of red (R), green (G), blue (B), and green (G) for the columns. FIG. 26 is a schematic plan view of a liquid crystal display panel of Example 6. In Example 6, four pixels corresponding to the R, G, B, and G color filters constitute one unit to provide display.

Display patterns, namely gray display at a grayscale value of 0 to 255, single color display, horizontal stripe display, and vertical stripe display at an intermediate grayscale value and a grayscale value of 255, were shown on the liquid crystal display panel of Example 6 as in Example 1, so that the influence on the display quality was determined. The results are shown in Table 6.

TABLE 6

| Display pattern | | | Influence on display quality |
|---|---|---|---|
| Gray display | | Grayscale value of 255 | None |
| | | Intermediate grayscale value | None |
| | | Grayscale value of 0 | None |
| Single color display | | Grayscale value of 255 | None |
| | | Intermediate grayscale value | None |
| Horizontal stripe display | Single stripe | Grayscale value of 255 | None |
| | | Intermediate grayscale value | Influenced (horizontal brightness difference) |
| | Multiple stripe | Grayscale value of 255 | None |
| | | Intermediate grayscale value | Almost none (horizontal brightness difference) |
| Vertical stripe display | Single stripe | Grayscale value of 255 | None |
| | | Intermediate grayscale value | None |
| | Multiple stripe | Grayscale value of 255 | None |
| | | Intermediate grayscale value | None |

Table 6 shows that most of the display patterns had no influence on the display quality in Example 6. Yet, in observation from an angle of 45°, horizontal luminance difference was observed in single horizontal stripe display at an intermediate grayscale value. Also, horizontal luminance difference was observed in multiple odd-number horizontal stripe display at an intermediate grayscale value. These phenomena, however, were hardly perceivable and thus had almost no influence on display.

Figure 27:
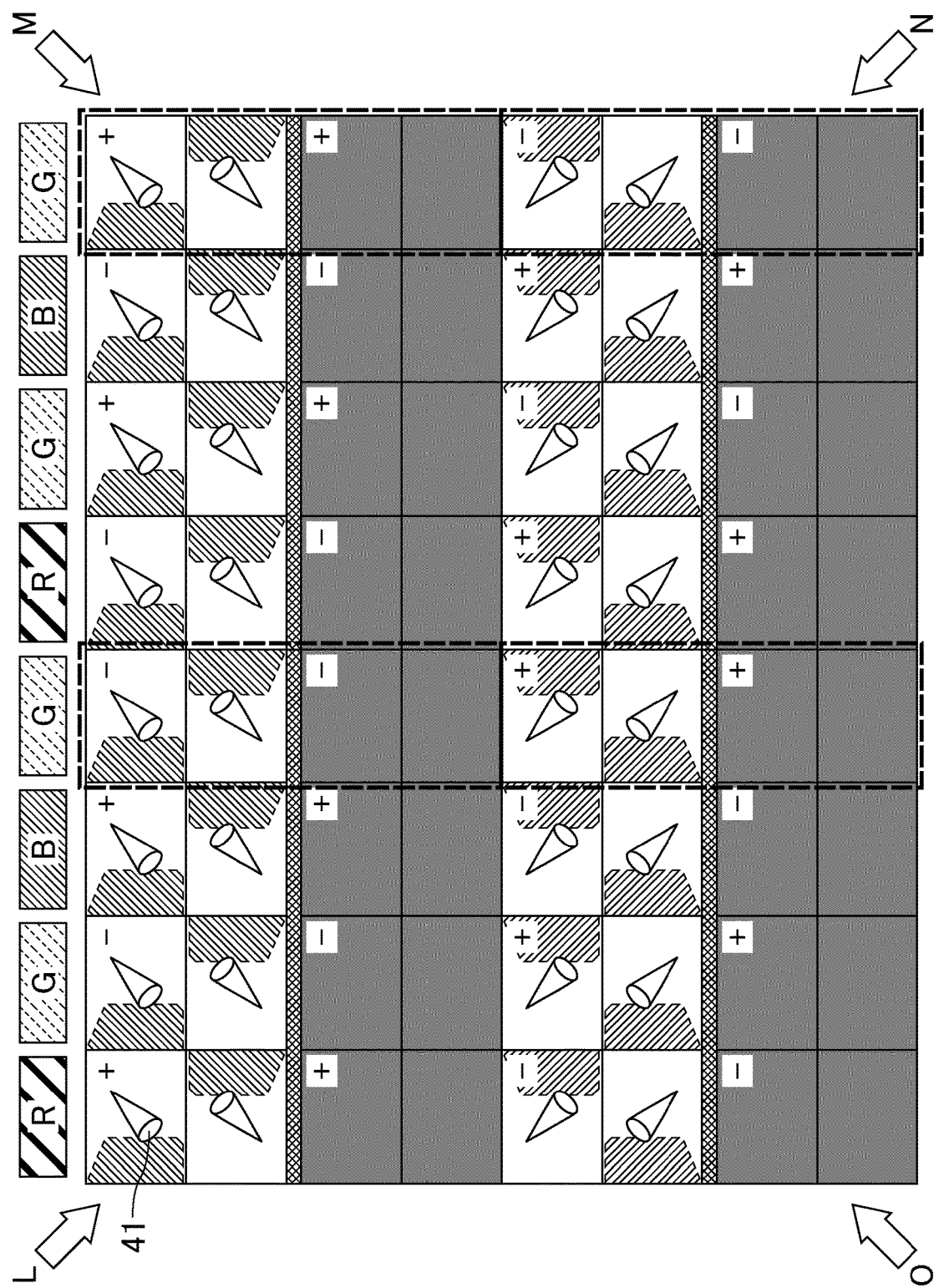
FIG. 27 is a schematic plan view of the liquid crystal display panel of Example 6 in gray display at an intermediate grayscale value.
Figure 28:
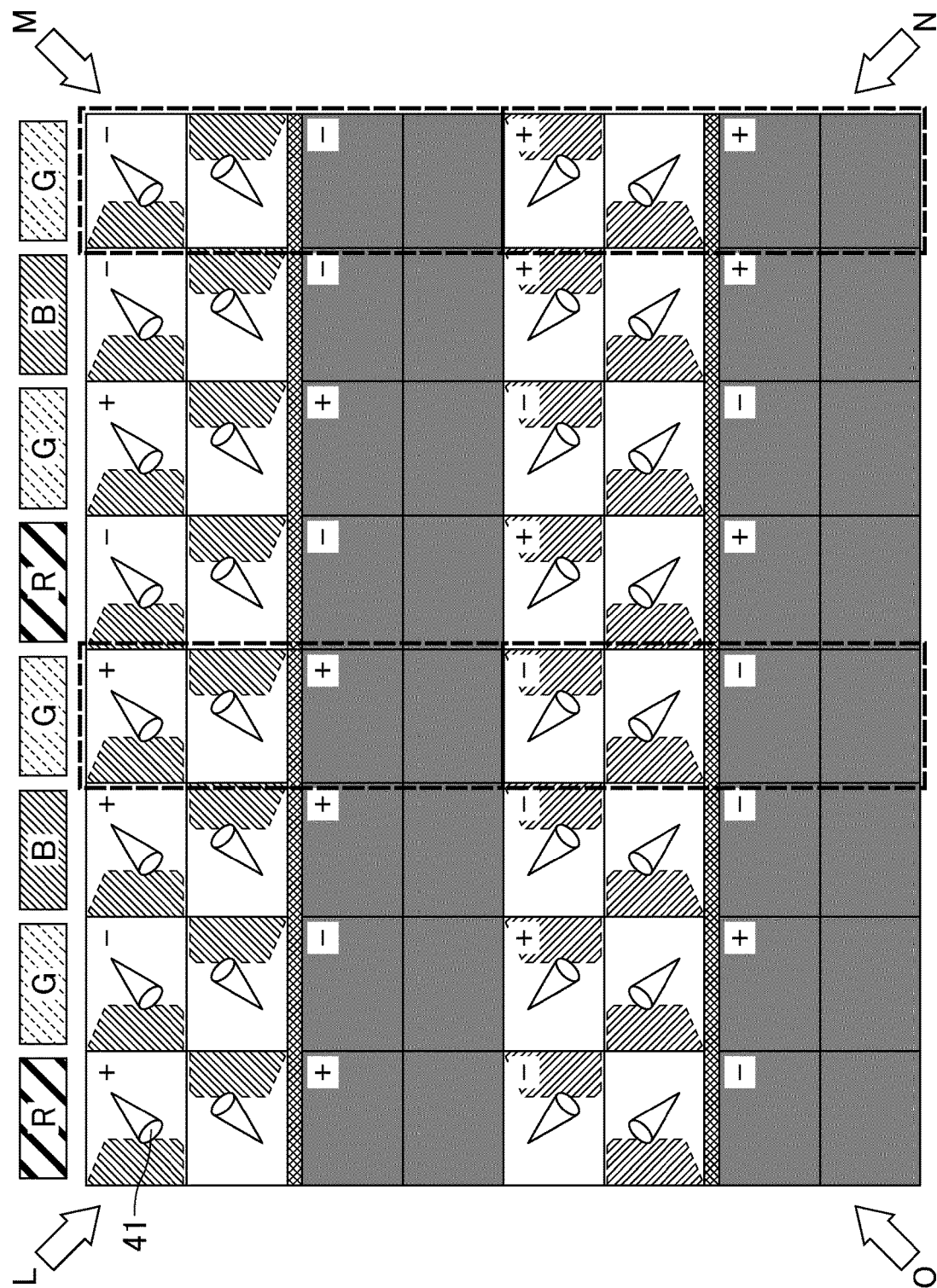
FIG. 28 is another schematic plan view of the liquid crystal display panel of Example 6 in gray display at an intermediate grayscale value.
Figure 29:
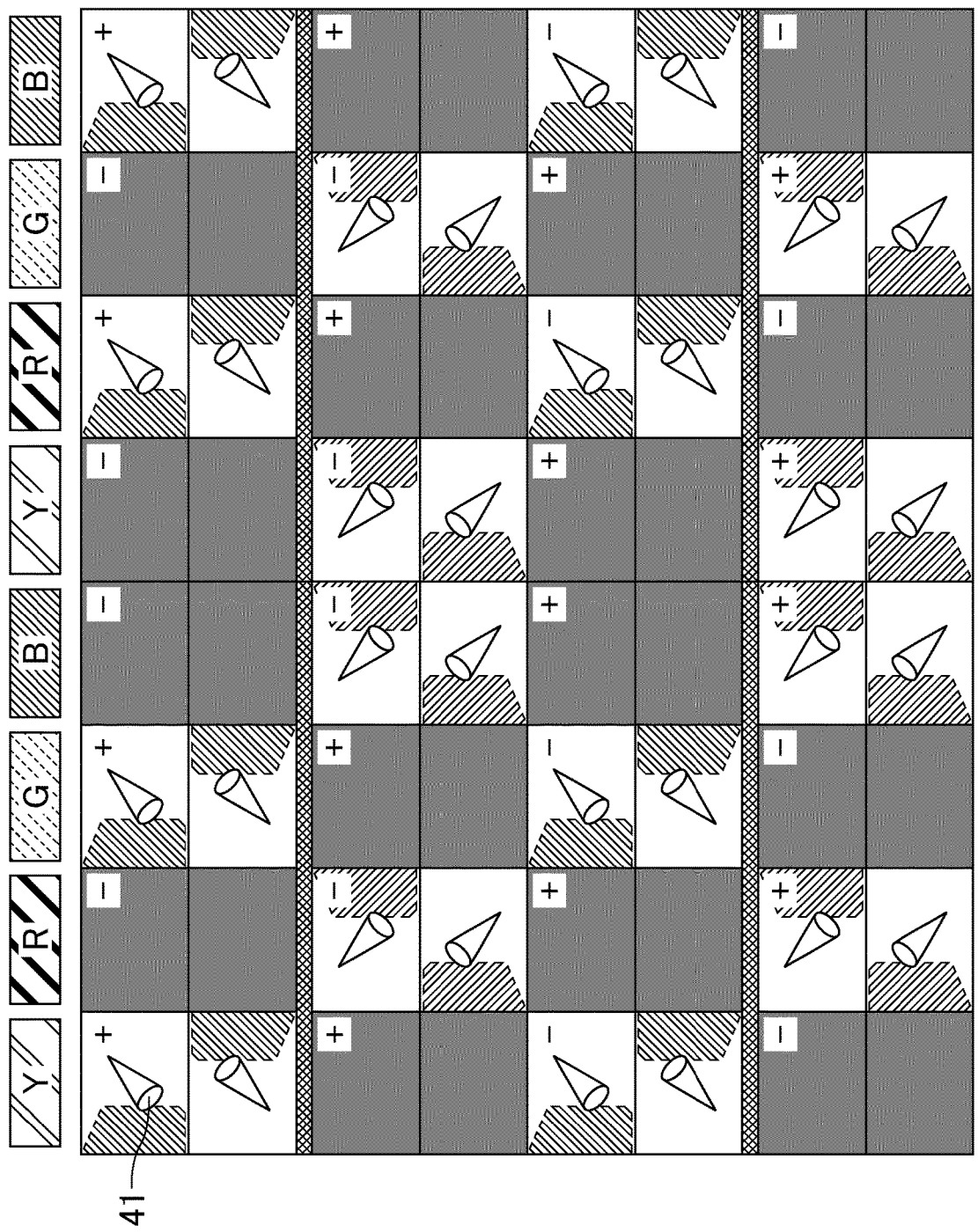
FIG. 29 is a schematic plan view of gray display at an intermediate grayscale value in a liquid crystal display panel of Example 7 wherein the frame unit is n.
Figure 30:
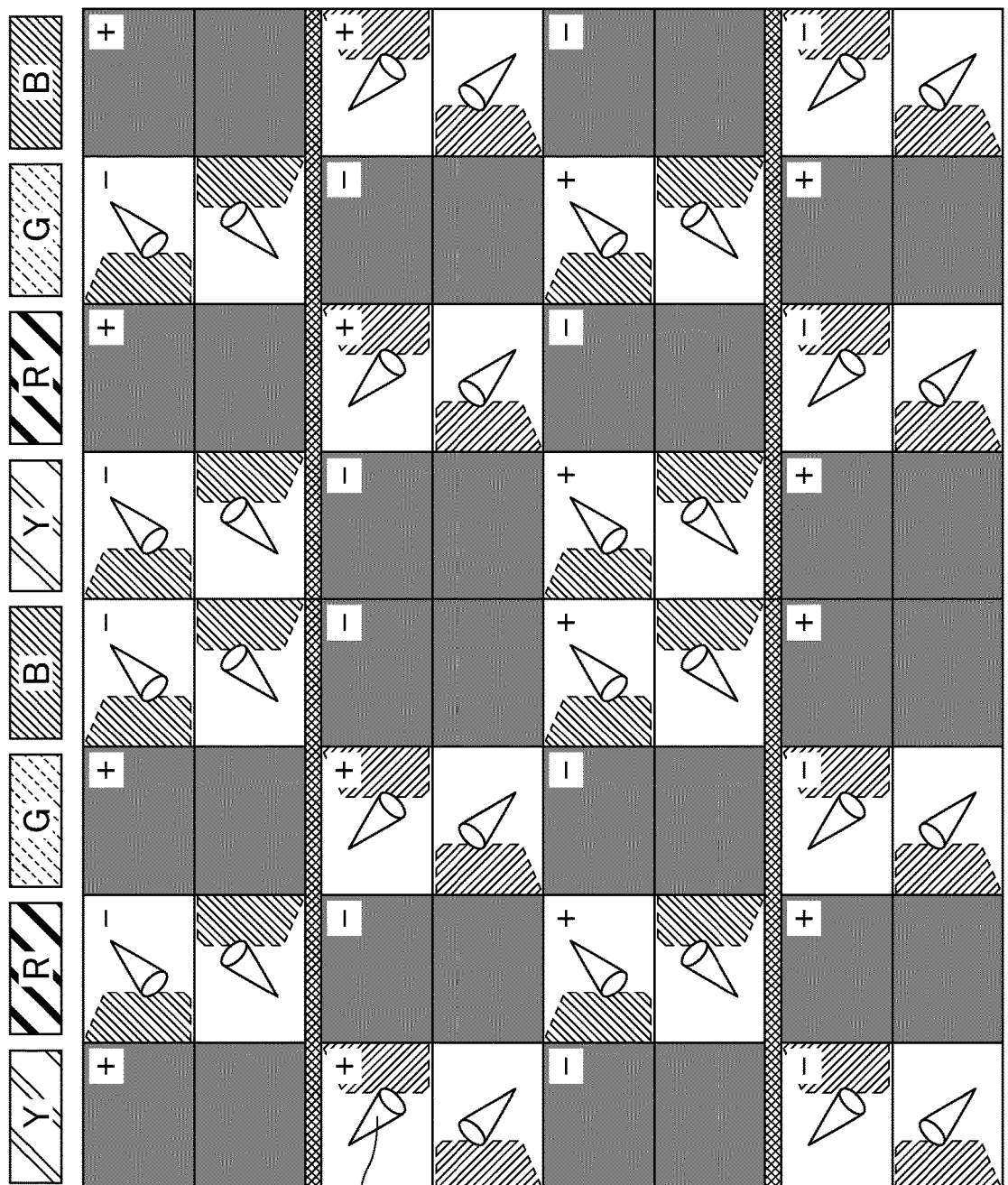
FIG. 30 is a schematic plan view of gray display at an intermediate grayscale value in the liquid crystal display panel of Example 7 wherein the frame unit is n+1.
Figure 31:
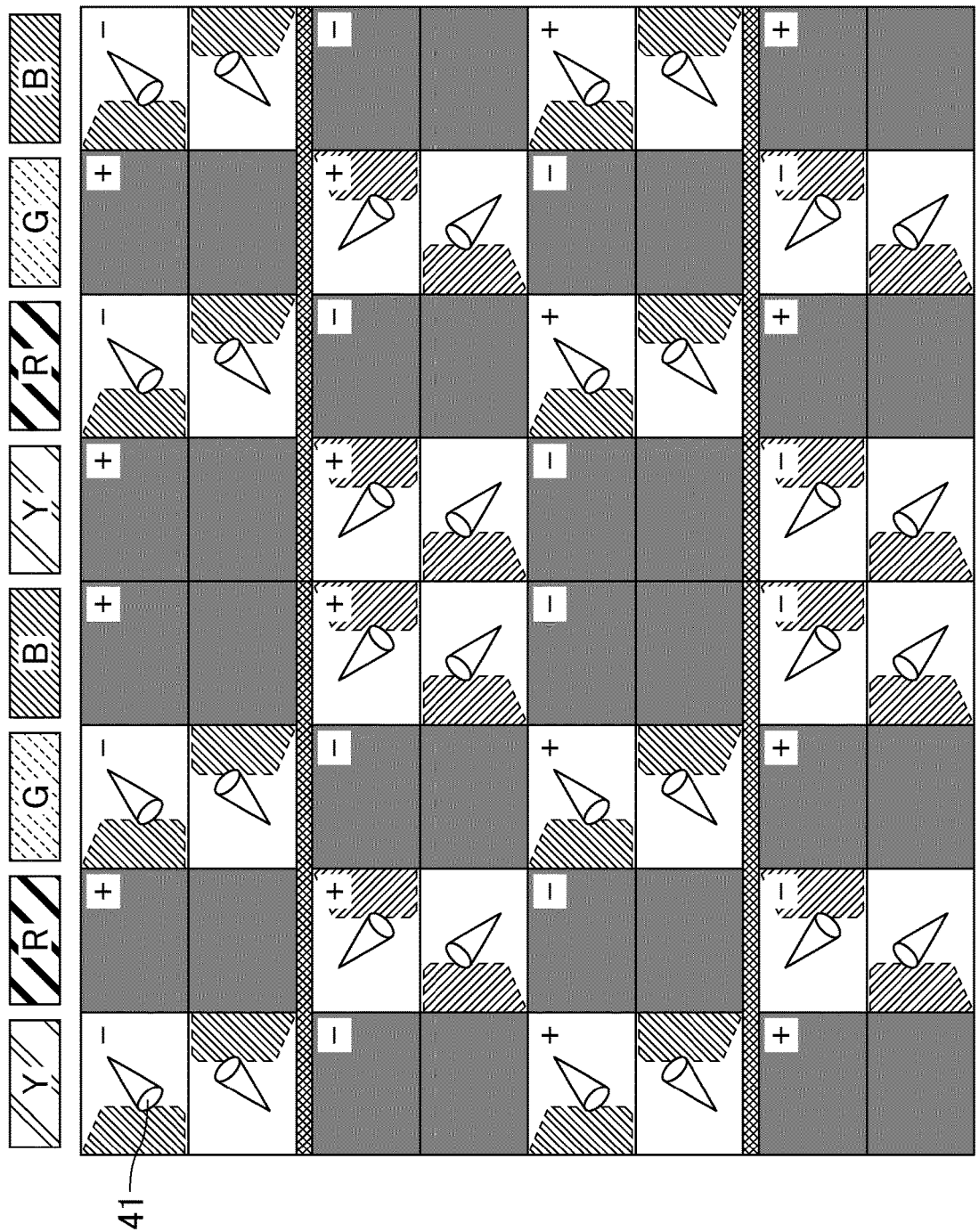
FIG. 31 is a schematic plan view of gray display at an intermediate grayscale value in the liquid crystal display panel of Example 7 wherein the frame unit is n+2.
Figure 32:
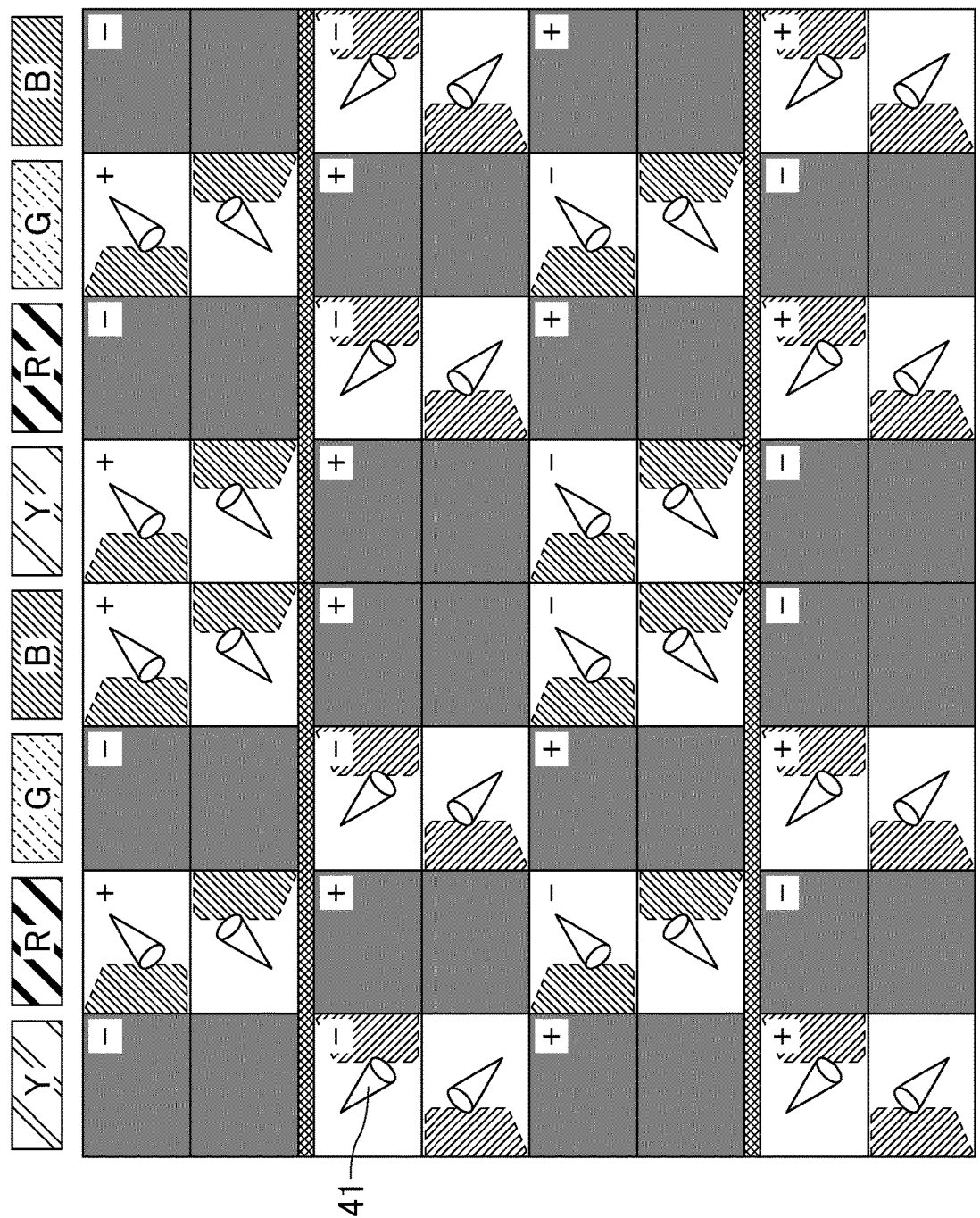
FIG. 32 is a schematic plan view of gray display at an intermediate grayscale value in the liquid crystal display panel of Example 7 wherein the frame unit is n+3.

Hereinafter, influence on the display quality is described using FIG. 27 and FIG. 28, for gray display at an intermediate grayscale value. FIG. 27 and FIG. 28 are schematic plan views of the liquid crystal display panel of Example 6 both in gray display at an intermediate grayscale value. FIG. 27 and FIG. 28 show gray display at an intermediate grayscale value. The drawings show half pixels of red (R), green (G), and blue (B) with different tilt azimuths of the liquid crystal molecules 41 and different polarities arranged evenly over the entire liquid crystal display panel. This configuration eliminates defects from display provided by the entire display panel. Here, in display using units of display each consisting of R, G, B, and G colors, the polarities of G pixels surrounded by the dotted lines in FIG. 27 and FIG. 28 may be positive or negative, and pixels with the same polarity may be arranged next to each other and pixels in the same brightness level may be arranged next to each other at borders of adjacent sub-pixels.

Although not illustrated, since the tilt azimuths of the liquid crystal molecules 41 tend to be the same in the rows in a bright tone as described in Example 5 in single horizontal stripe display at an intermediate grayscale value. This configuration caused luminance difference between observation from the azimuths of the white arrow M and the white arrow O and observation from the azimuths of the white arrow L and the white arrow N. Here, multiple odd-number horizontal stripe display at an intermediate grayscale value caused horizontal luminance difference as in the case of the single horizontal stripe display, but this phenomenon had almost no influence on the display provided by the entire liquid crystal display panel.

Example 7

A liquid crystal display panel of Example 7 was produced by a procedure similar to that in Example 4, except that a driving mode was employed in which the brightness inversion and polarity inversion were combined. Table 7 shows comparison between the driving mode of Example 7 and a typical driving mode.

TABLE 7

|  |  | Frame unit | | | |
| --- | --- | --- | --- | --- | --- |
|  |  | n (8.3 msec) | n + 1 (8.3 msec) | n + 2 (8.3 msec) | n + 3 (8.3 msec) |
| Driving mode in Example 7 | Brightness Polarity | Bright + | Dark + | Bright − | Dark − |
| Typical driving mode | Brightness Polarity | Bright + | Bright − | Bright + | Bright − |

Table 7 shows that a liquid crystal display panel repeatedly displays images with frame units of n, n+1, n+2, and n+3 in a cycle of 8.3 milliseconds (msec). Example 7 employed a driving mode in which 120-Hz cycle brightness inversion and 60-Hz cycle polarity inversion were combined. A typical driving mode employs only 120-Hz cycle polarity inversion without brightness inversion.

Display patterns, namely gray display at a grayscale value of 0 to 255, single color display, horizontal stripe display, and vertical stripe display at an intermediate grayscale value and a grayscale value of 255, were shown on the liquid crystal display panel of Example 7 as in Example 1, so that the influence on the display quality was determined. The results are shown in Table 8.

TABLE 8

| Display pattern | | | Influence on display quality |
| --- | --- | --- | --- |
| Gray display | | Grayscale value of 255 | None |
|  | | Intermediate grayscale value | None |
|  | | Grayscale value of 0 | None |
| Single color display | | Grayscale value of 255 | None |
|  | | Intermediate grayscale value | None |
| Horizontal stripe display | Single stripe | Grayscale value of 255 | None |
|  |  | Intermediate grayscale value | Influenced (flicker) |
|  | Multiple stripe | Grayscale value of 255 | None |
|  |  | Intermediate grayscale value | Almost none (flicker) |
| Vertical stripe display | Single stripe | Grayscale value of 255 | None |
|  |  | Intermediate grayscale value | None |
|  | Multiple stripe | Grayscale value of 255 | None |
|  |  | Intermediate grayscale value | None |

Table 8 shows that most of the display patterns had no influence on the display quality in Example 7. Yet, in observation from an angle of 45°, flicker was observed in single horizontal stripe display at an intermediate grayscale value. Also, flicker was generated in multiple odd-number horizontal stripe display at an intermediate grayscale value. These phenomena, however, were hardly perceivable and thus had almost no influence on display. In particular, comparison with Example 4 shows that coloring was reduced in both single vertical stripe display and multiple vertical stripe display.

Hereinafter, the driving mode in Example 7 is described with reference to FIG. 29 to FIG. 32. FIG. 29 to FIG. 32 are schematic plan views of gray display at an intermediate grayscale value in a liquid crystal display panel of Example 7 wherein the frame unit is n, n+1, n+2, and n+3, respectively. In FIG. 29 to FIG. 32, in the most upper right half pixel, for example, the brightness inversion and the polarity inversion are combined such that the brightness is inverted in the order of bright, dark, bright, and dark, while the polarity changes in the order of positive, positive, negative, and negative, and the cycle of the brightness inversion and the cycle of the polarity inversion are different.

Figure 33:
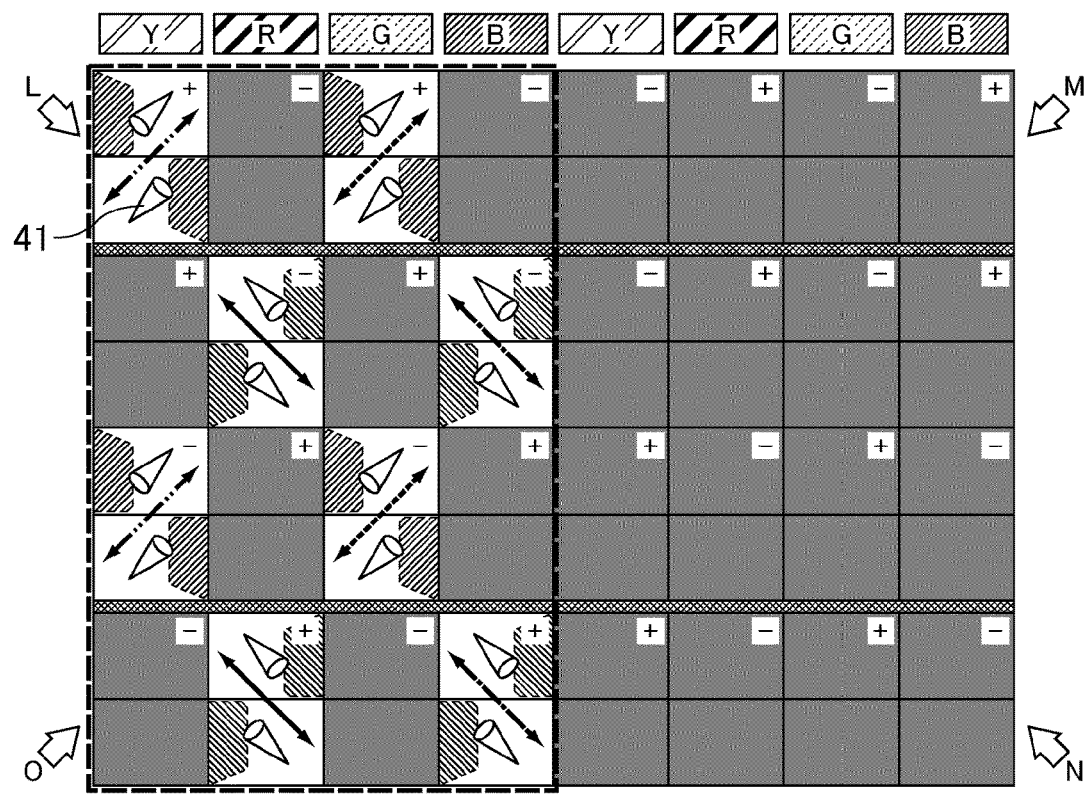
FIG. 33 includes schematic plan views of the liquid crystal display panels of Example 4 and Example 7 each in single vertical stripe display at an intermediate grayscale value.
Figure 33:
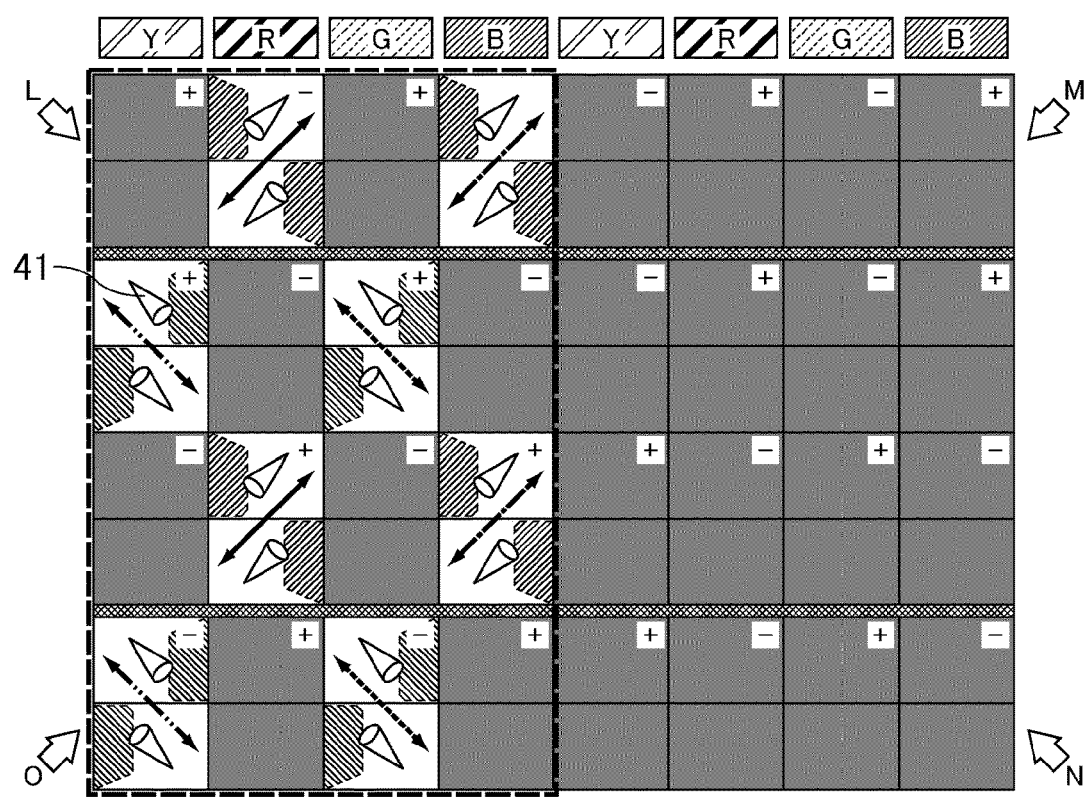

FIG. 33 includes schematic plan views of the liquid crystal display panels each in single vertical stripe display at an intermediate grayscale value; FIG. 33(a) shows the liquid crystal display panel of Example 4 and FIG. 33(b) shows the liquid crystal display panel of Example 7. In single vertical stripe display at an intermediate grayscale value, the half pixels in the columns of the same color have the same alignment pattern for the liquid crystal molecules as described in Example 4. This caused coloring in observation at an angle of 45°. In contrast, in Example 7, the brightness is inverted for each sub-frame (120 Hz), so that the tilt azimuths of the liquid crystal molecules 41 vary in each color and thus coloring was reduced. Also, in multiple odd-number vertical stripe display at an intermediate grayscale value, the tilt azimuths of the liquid crystal molecules 41 can vary in each color, whereby coloring was reduced.

The driving mode employed in Example 7 can be applied to Examples 1, 2, 3, 5, and 6 as well as Example 4, and can effectively prevent flicker, coloring, and horizontal luminance difference.

In Examples 1, 2, 4, and 7, pixels in the row direction and the column direction of the liquid crystal display panel consecutively had an alignment division pattern of Pattern A. A liquid crystal display panel having excellent viewing angle characteristics and a high transmittance can also be produced when pixels in the row direction and the column direction of the liquid crystal display panel consecutively had an alignment division pattern of Pattern B.

Reference Example 1

Figure 34:
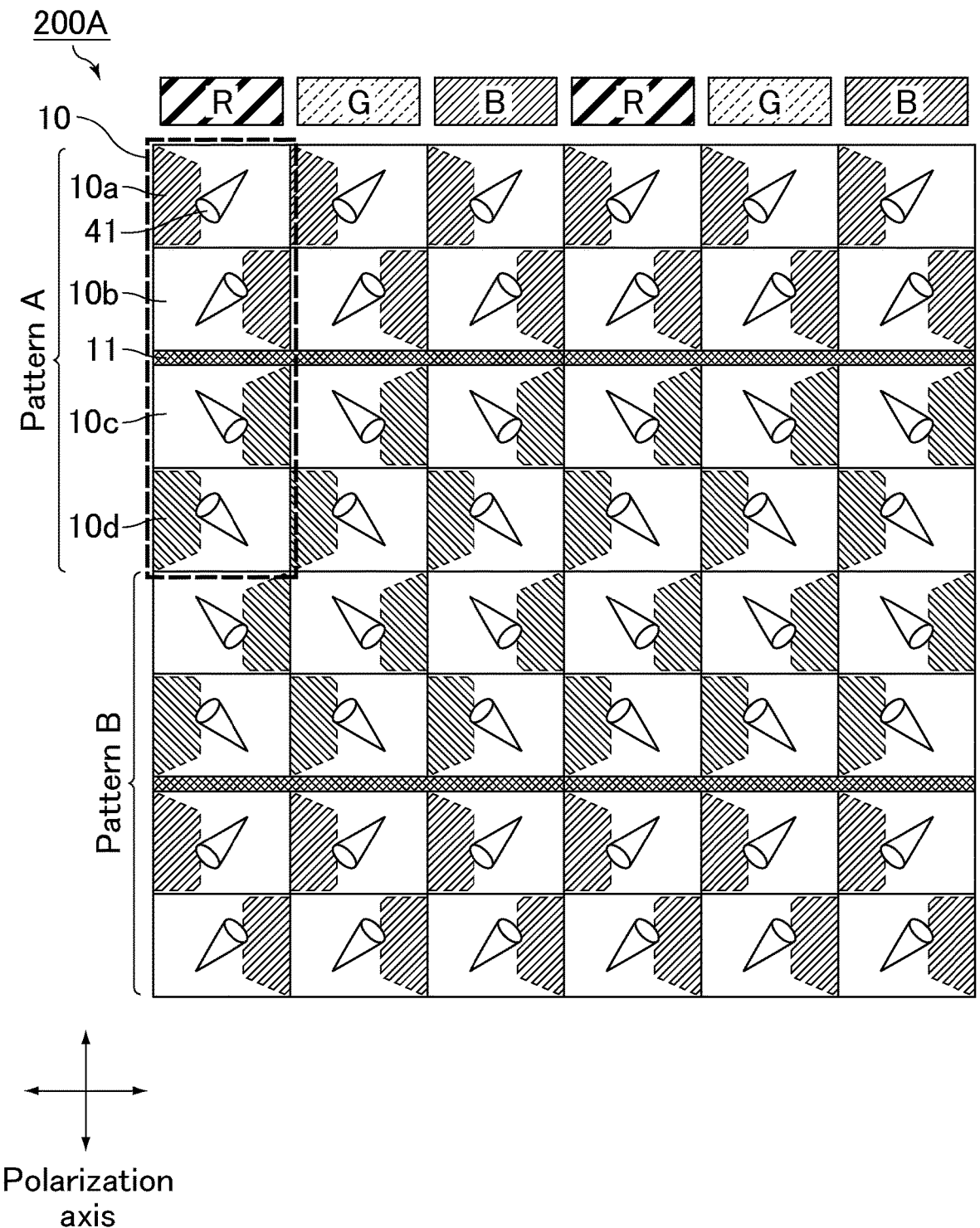
FIG. 34 is a schematic plan view of a liquid crystal display panel of Reference Example 1.
Figure 35:
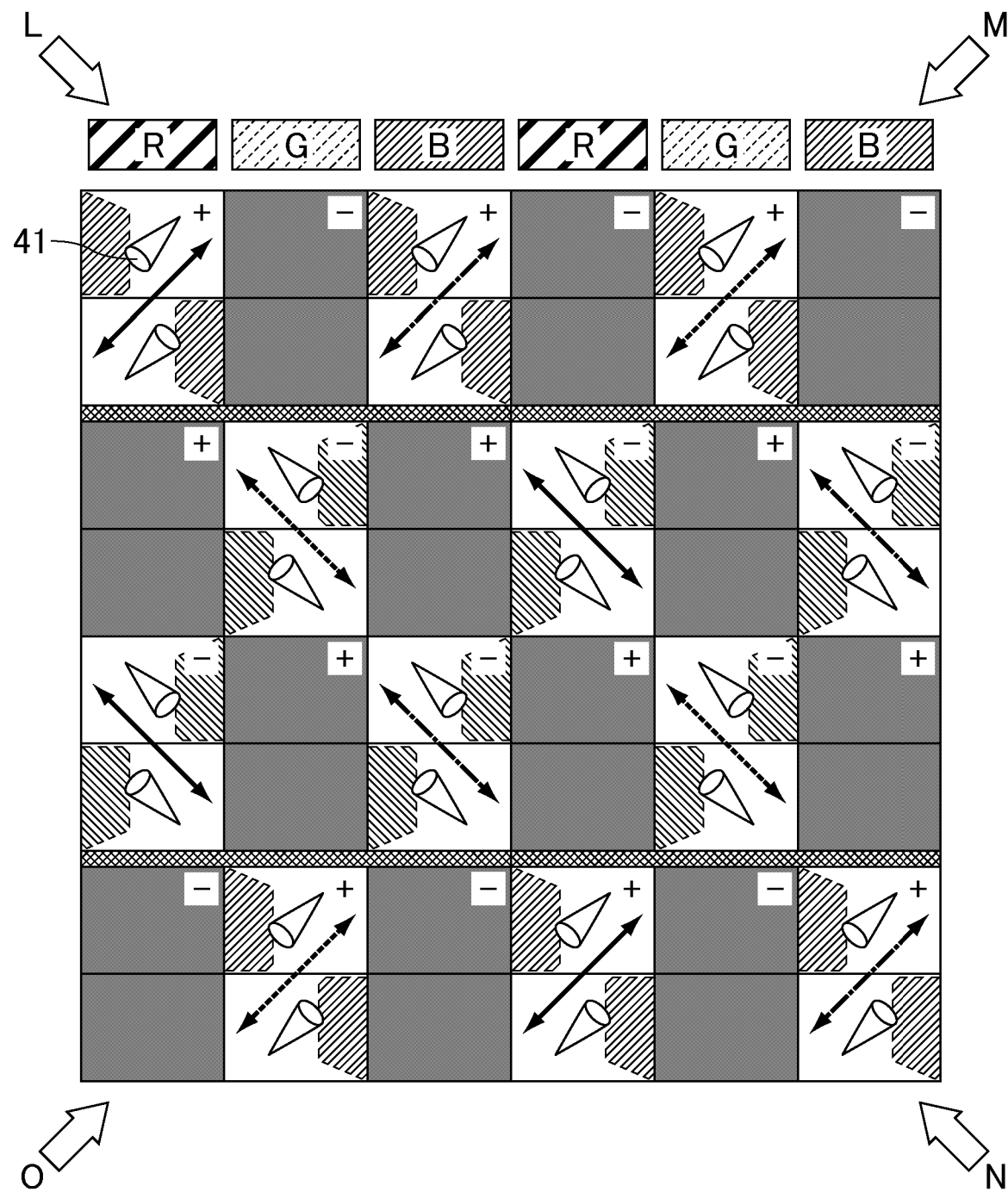
FIG. 35 is a schematic plan view of the liquid crystal display panel of Reference Example 1 in gray display at an intermediate grayscale value.
Figure 36:
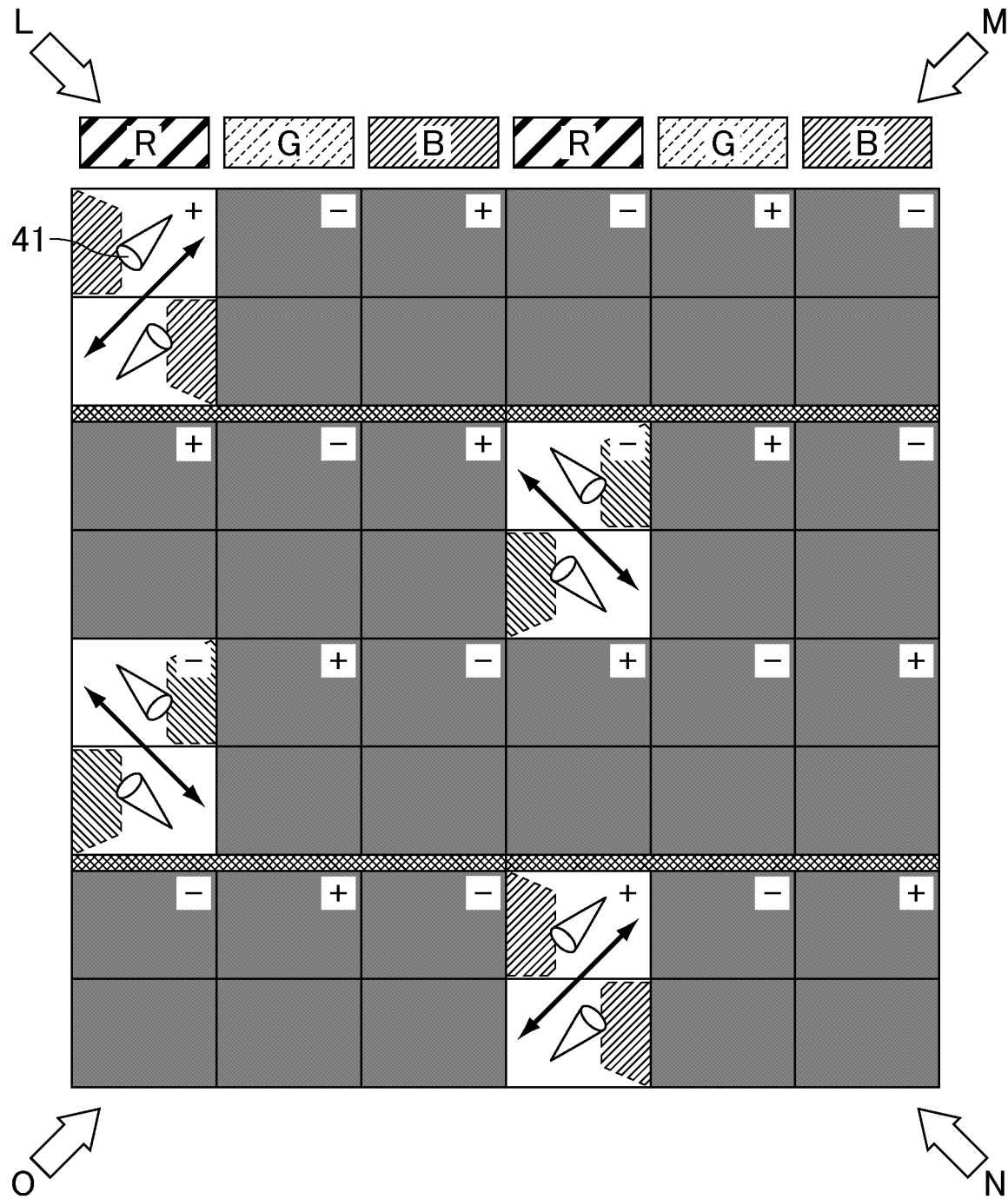
FIG. 36 is a schematic plan view of the liquid crystal display panel of Reference Example 1 in single color display at an intermediate grayscale value.
Figure 37:
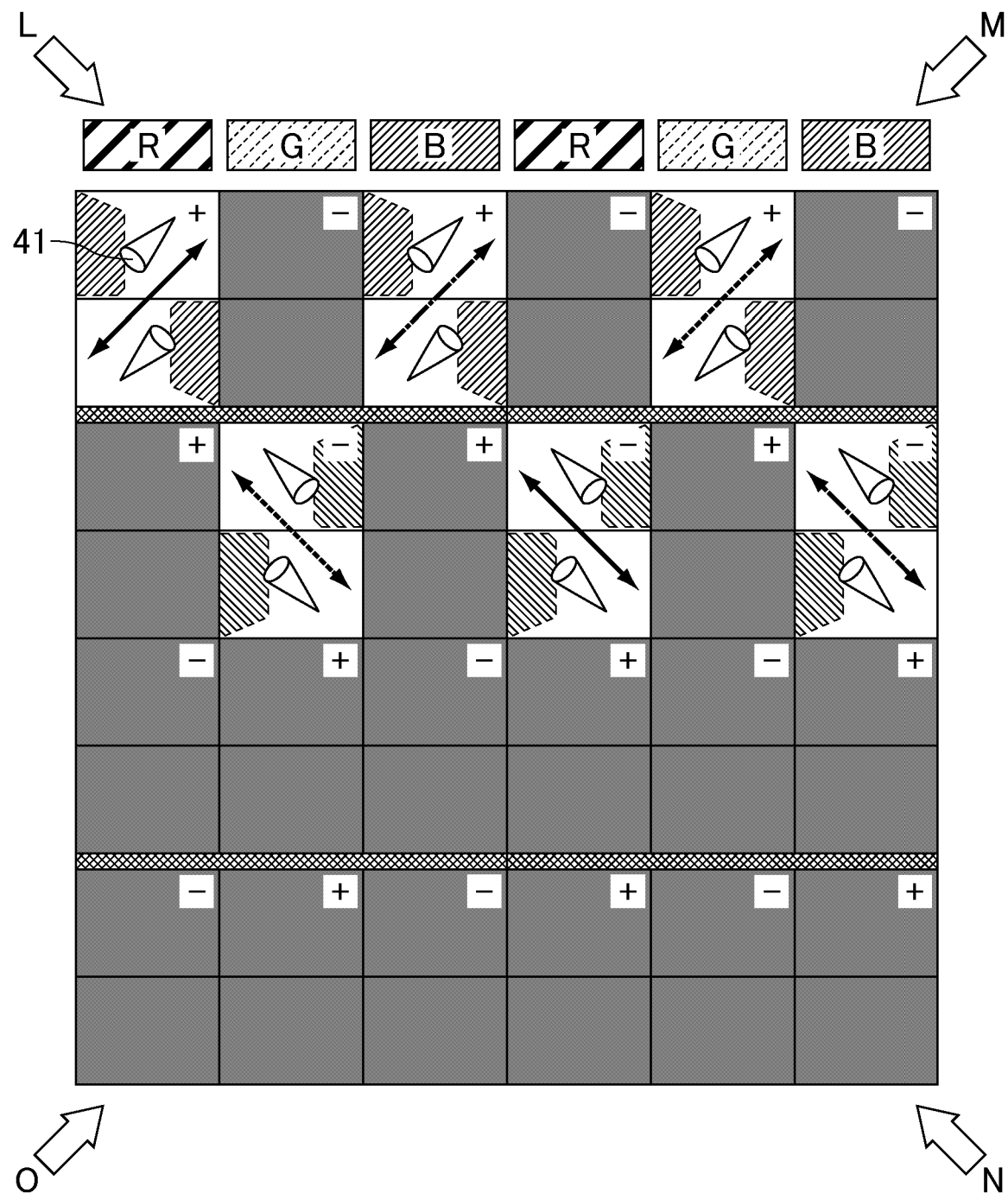
FIG. 37 is a schematic plan view of the liquid crystal display panel of Reference Example 1 in single horizontal stripe display at an intermediate grayscale value.
Figure 38:
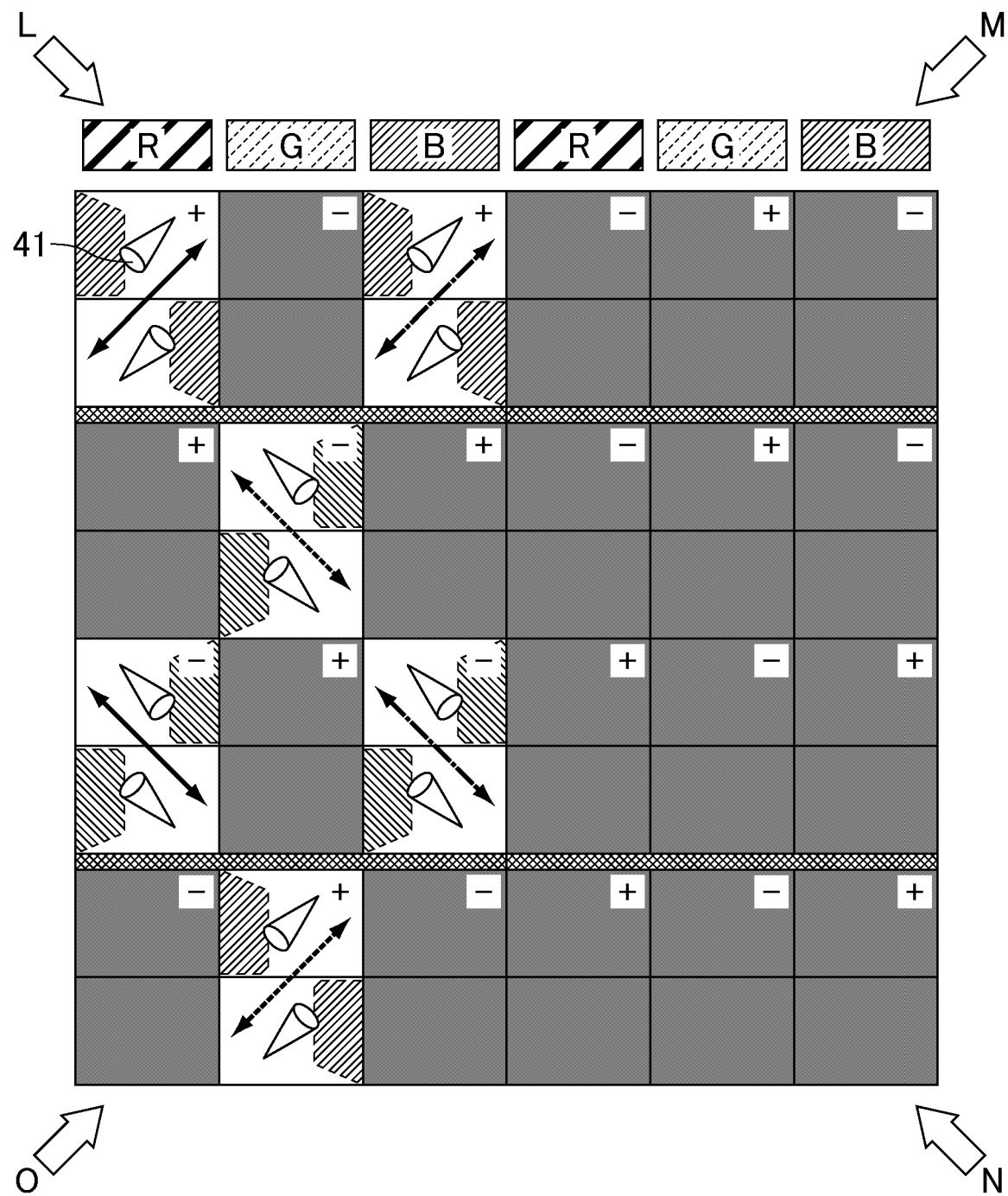
FIG. 38 is a schematic plan view of the liquid crystal display panel of Reference Example 1 in single vertical stripe display at an intermediate grayscale value.

A liquid crystal display panel 200A of Reference Example 1 was produced by a procedure similar to that in Example 1, except that pixels in the row direction of the liquid crystal display panel consecutively had the same alignment division pattern and pixels in the column direction alternately had different alignment division patterns. FIG. 34 is a schematic plan view of a liquid crystal display panel of Reference Example 1.

In Reference Example 1, pixels in the row direction of the liquid crystal display panel consecutively had an alignment division pattern of Pattern A or Pattern B and pixels in the column direction alternately had Pattern A and Pattern B. The liquid crystal display panel was in a multi-sub-pixel driving mode which provides the bright tone and the dark tone in a checkered pattern to half pixels. Also, the liquid crystal display panel included pixels with positive voltage polarity and pixels with negative voltage polarity in a checkered pattern and was driven by inverting the polarities in cycles.

Display patterns, namely gray display at a grayscale value of 0 to 255, single color display, horizontal stripe display, and vertical stripe display at an intermediate grayscale value and a grayscale value of 255, were shown on the obtained liquid crystal display panel as in Example 1, so that the influence on the display quality was determined. The results are shown in Table 9.

TABLE 9

| Display pattern | | | Influence on display quality |
|---|---|---|---|
| Gray display | | Grayscale value of 255 | None |
| | | Intermediate grayscale value | Influenced (flicker) |
| | | Grayscale value of 0 | None |
| Single color display | | Grayscale value of 255 | None |
| | | Intermediate grayscale value | Influenced (flicker) |
| Horizontal stripe display | Single stripe | Grayscale value of 255 | None |
| | | Intermediate grayscale value | Influenced (flicker) |
| | Multiple stripe | Grayscale value of 255 | None |
| | | Intermediate grayscale value | Influenced (flicker) |
| Vertical stripe display | Single stripe | Grayscale value of 255 | None |
| | | Intermediate grayscale value | Influenced (flicker) |
| | Multiple stripe | Grayscale value of 255 | None |
| | | Intermediate grayscale value | Influenced (flicker) |

Table 9 shows that flicker was observed in all the display patterns at an intermediate grayscale value in Reference Example 1, and thus had influence on the display quality.

Hereinafter, influence on the display quality in display patterns at an intermediate grayscale value is described using FIG. 35 to FIG. 38. FIG. 35 to FIG. 38 are schematic plan views of the liquid crystal display panel of Reference Example 1 in gray display at an intermediate grayscale value, single color display at an intermediate grayscale value, single horizontal stripe display at an intermediate grayscale value, and single vertical stripe display at an intermediate grayscale value, respectively.

FIG. 35 to FIG. 38 show the display patterns at an intermediate grayscale value. The drawings show half pixels in a bright tone, and the half pixels with + polarity provide a tilt azimuth of 225° to the liquid crystal molecules 41 in the upper alignment region and a tilt azimuth of 45° to those in the lower alignment region. The half pixels with − polarity provide a tilt azimuth of 315° to the liquid crystal molecules 41 in the upper alignment region and a tilt azimuth of 135° to those in the lower alignment region. In every display pattern, the polarities of the half pixels and the tilt azimuths of the liquid crystal molecules were the same in display at an intermediate grayscale value. Also, the polarity was limited to one of positive and negative in observation at an angle of 45°, and thus flicker was observed.

Reference Example 2

Figure 39:
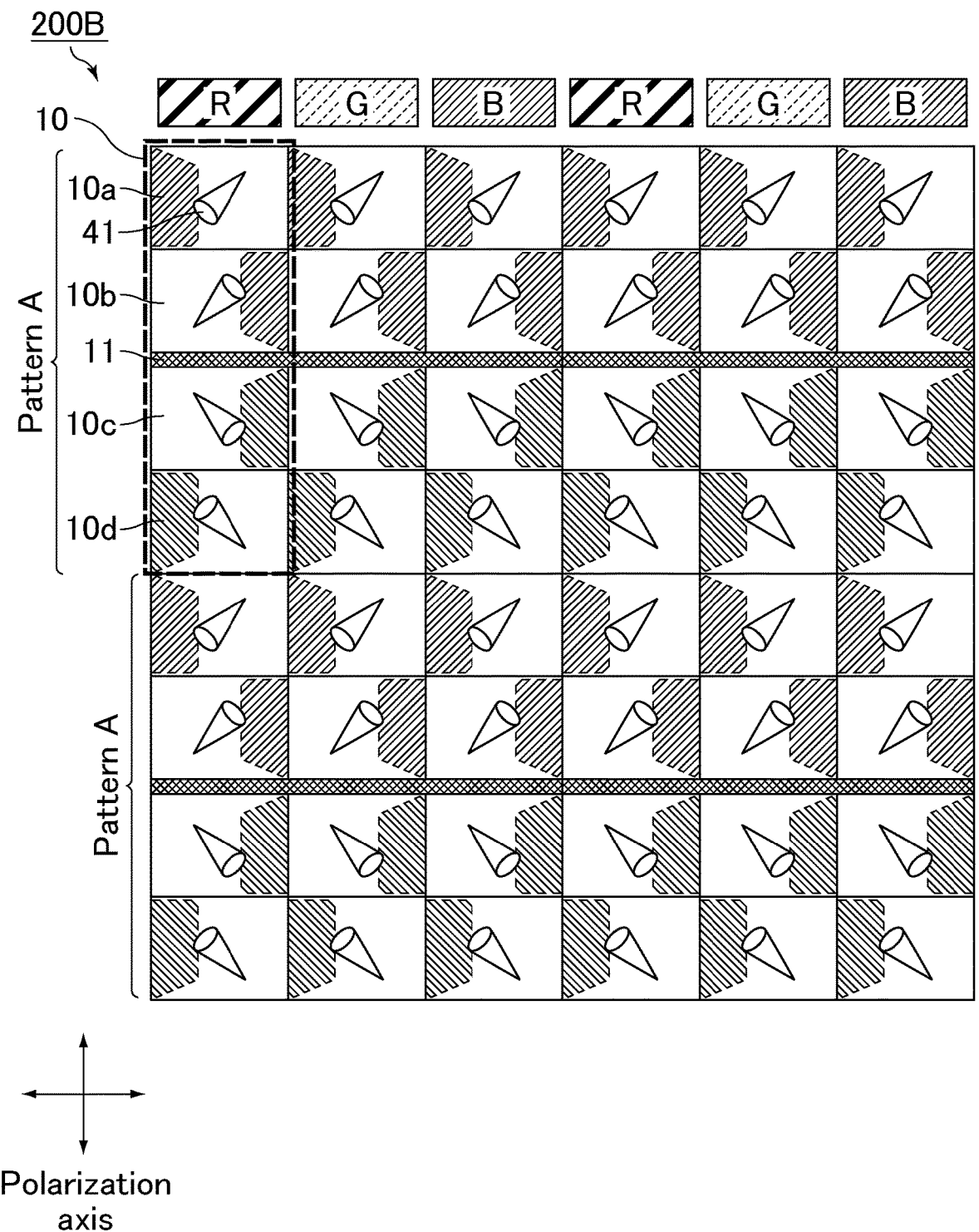
FIG. 39 is a schematic plan view of a liquid crystal display panel of Reference Example 2.
Figure 40:
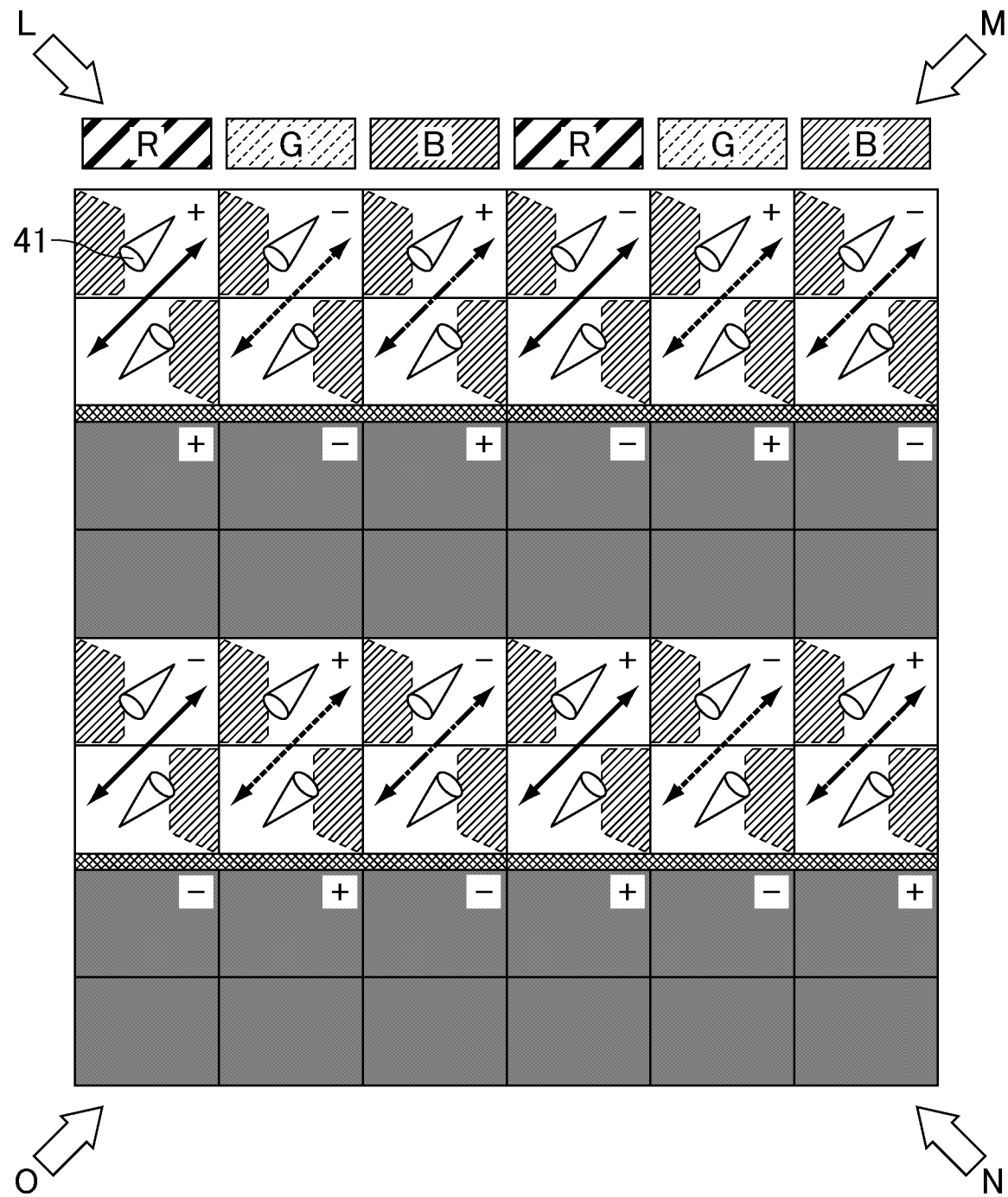
FIG. 40 is a schematic plan view of the liquid crystal display panel of Reference Example 2 in gray display at an intermediate grayscale value.
Figure 41:
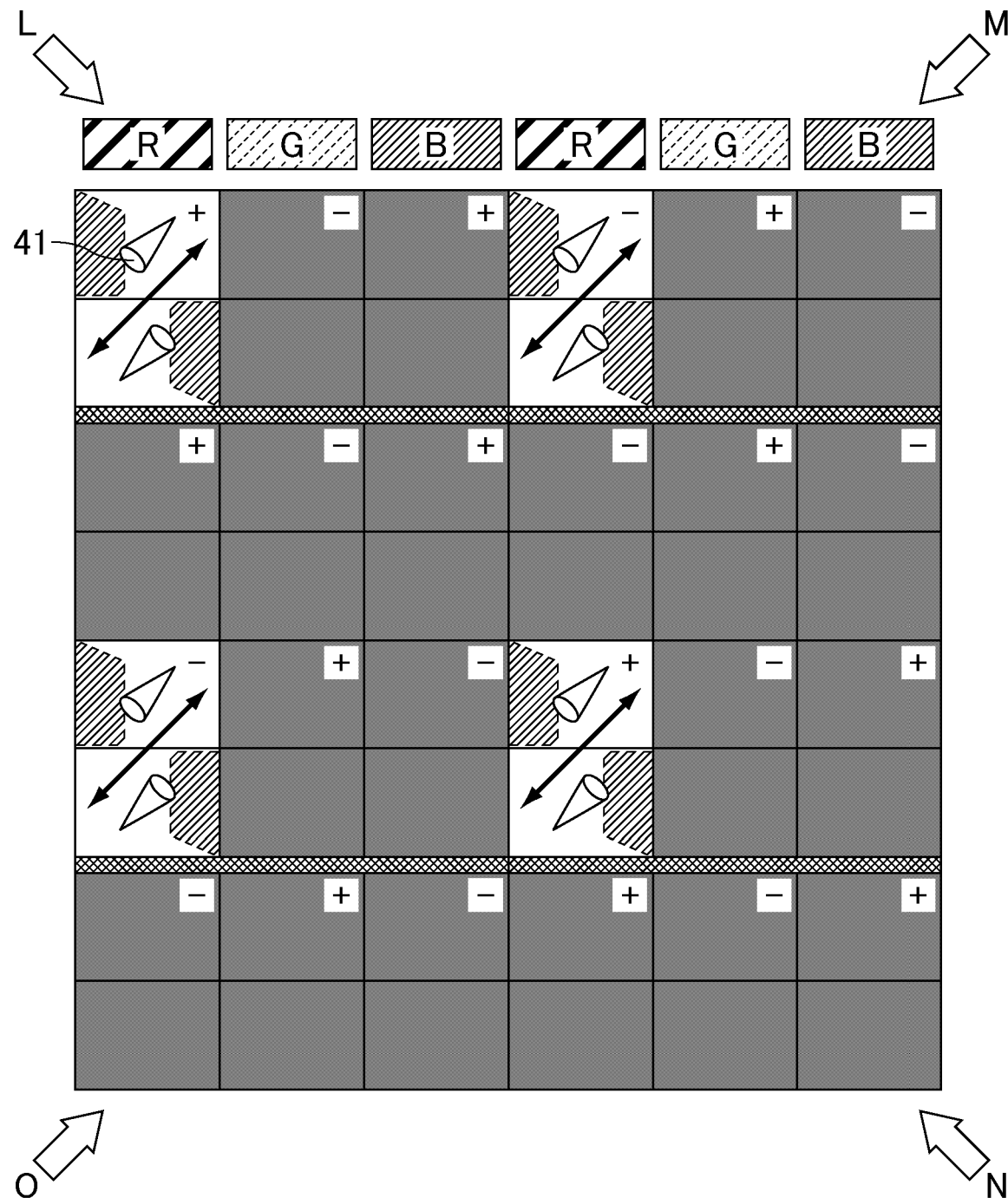
FIG. 41 is a schematic plan view of the liquid crystal display panel of Reference Example 2 in single color display at an intermediate grayscale value.
Figure 42:
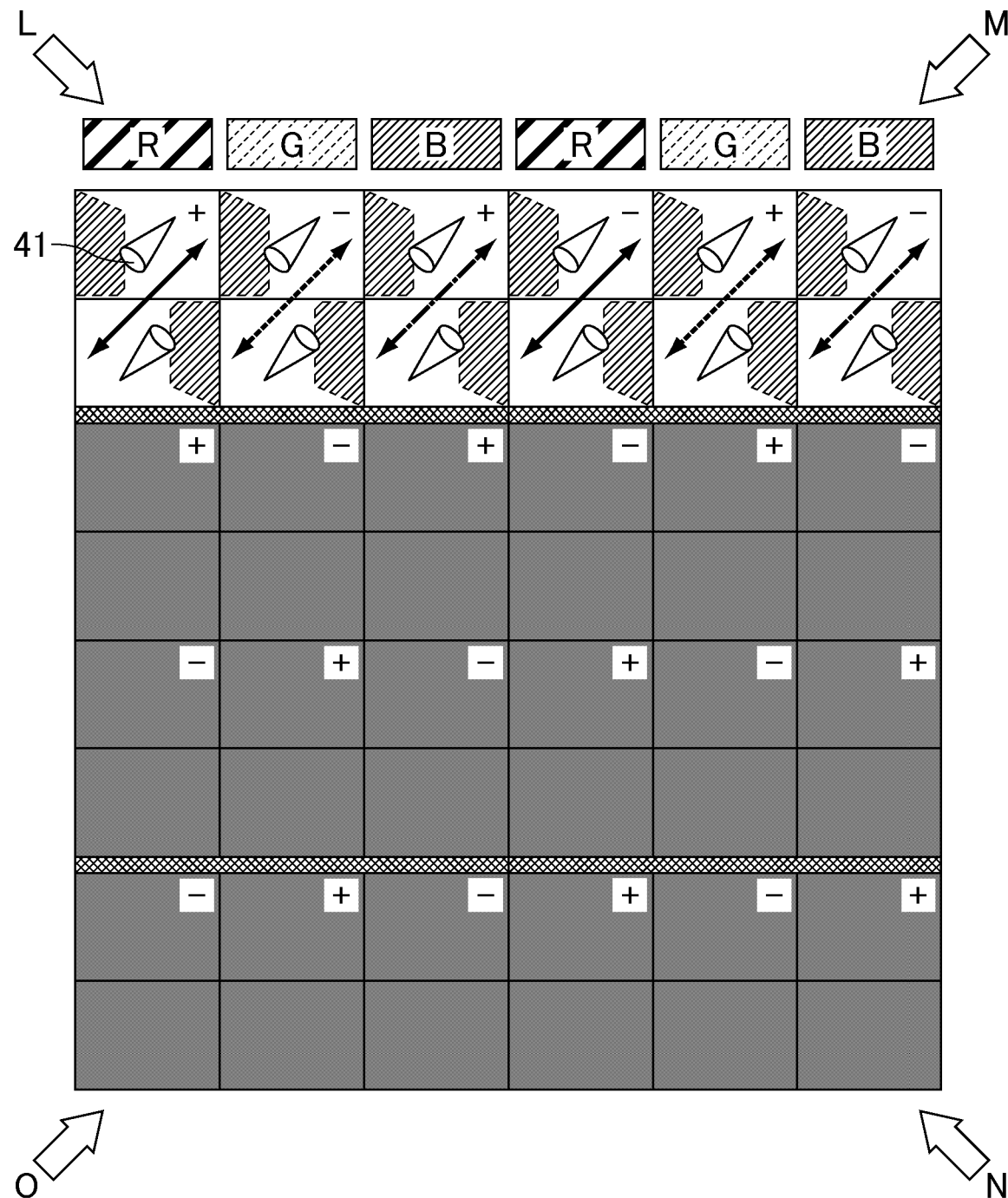
FIG. 42 is a schematic plan view of the liquid crystal display panel of Reference Example 2 in single horizontal stripe display at an intermediate grayscale value.
Figure 43:
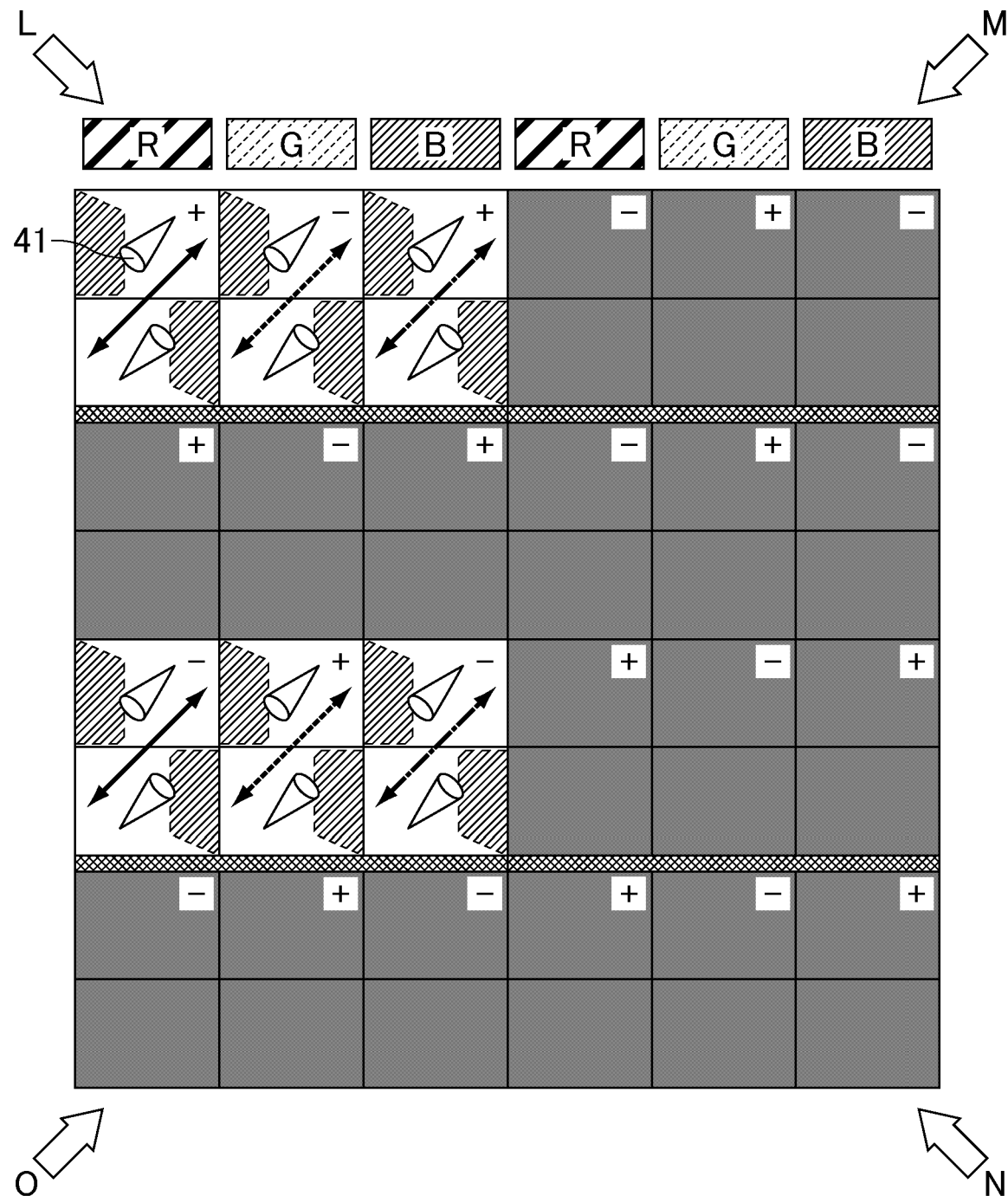
FIG. 43 is a schematic plan view of the liquid crystal display panel of Reference Example 2 in single vertical stripe display at an intermediate grayscale value.
Figure 44:
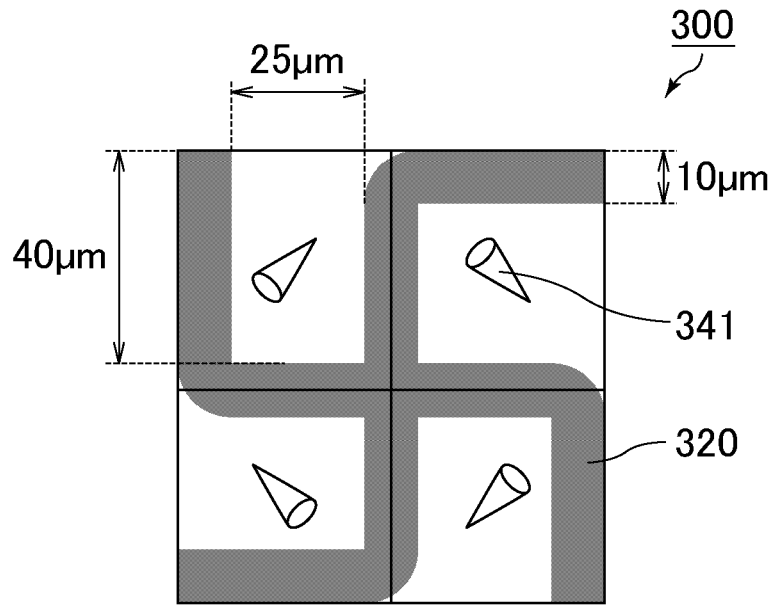
FIG. 44 is a schematic plan view of a half pixel in which dark lines are generated in a conventional 4D-RTN mode liquid crystal display panel.
Figure 45:
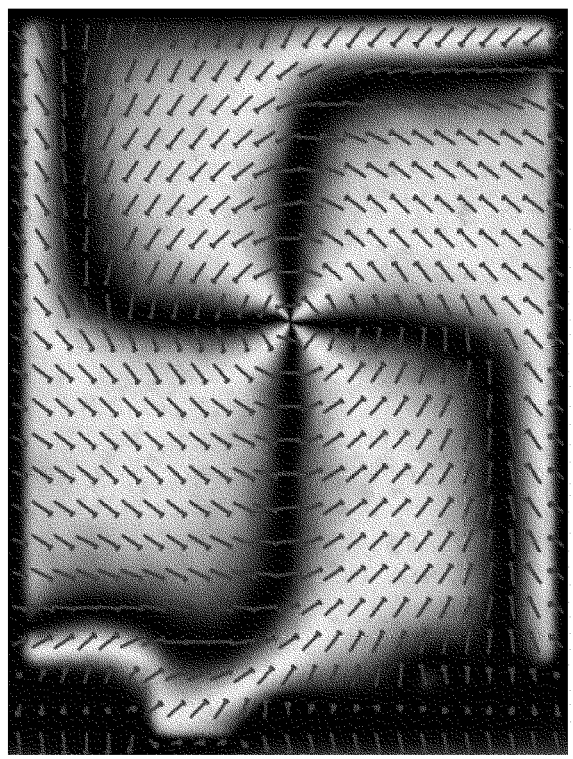
FIG. 45 is a photograph of a half pixel showing a simulation result of dark line generation in a conventional 4D-RTN mode liquid crystal display panel.

A liquid crystal display panel 200B of Reference Example 2 was produced by a procedure similar to that in Example 5, except that pixels in the row direction and the column direction of the liquid crystal display panel consecutively had the same alignment division pattern. FIG. 39 is a schematic plan view of a liquid crystal display panel of Reference Example 2.

In Reference Example 2, pixels both in the row and column directions had Pattern A for the liquid crystal molecules 41. The liquid crystal display panel was in a linear brightness mode which provides the bright tone and the dark tone alternately to the half pixel rows. Also, the liquid crystal display panel included pixels with positive voltage polarity and pixels with negative voltage polarity in a checkered pattern and was driven by inverting the polarities in cycles.

Display patterns, namely gray display at a grayscale value of 0 to 255, and single color display, horizontal stripe display, vertical stripe display at an intermediate grayscale value and a grayscale value of 255, were shown on the obtained liquid crystal display panel as in Example 1, so that the influence on the display quality was determined. The results are shown in Table 10.

TABLE 10

| Display pattern | | | Influence on display quality |
|---|---|---|---|
| Gray display | | Grayscale value of 255 | None |
| | | Intermediate grayscale value | Influenced (horizontal brightness difference) |
| | | Grayscale value of 0 | None |
| Single color display | | Grayscale value of 255 | None |
| | | Intermediate grayscale value | Influenced (horizontal brightness difference) |
| Horizontal stripe display | Single stripe | Grayscale value of 255 | None |
| | | Intermediate grayscale value | Influenced (horizontal brightness difference) |
| | Multiple stripe | Grayscale value of 255 | None |
| | | Intermediate grayscale value | Influenced (horizontal brightness difference) |
| Vertical stripe display | Single stripe | Grayscale value of 255 | None |
| | | Intermediate grayscale value | Influenced (horizontal brightness difference) |
| | Multiple stripe | Grayscale value of 255 | None |
| | | Intermediate grayscale value | Influenced (horizontal brightness difference) |

Table 10 shows that horizontal luminance difference was observed in all the display patterns at an intermediate grayscale value in Reference Example 2, and thus had influence on the display quality.

Hereinafter, influence on the display quality in display patterns at an intermediate grayscale value is described using FIG. 40 to FIG. 43. FIG. 40 to FIG. 43 are schematic plan views of the liquid crystal display panel of Reference Example 2 in gray display at an intermediate grayscale value, single color display at an intermediate grayscale value, single horizontal stripe display at an intermediate grayscale value, and single vertical stripe display at an intermediate grayscale value, respectively.

FIG. 40 to FIG. 43 show the display patterns at an intermediate grayscale value. All the half pixels in a bright tone provide a tilt azimuth of 225° to the liquid crystal molecules 41 in the upper alignment region and a tilt azimuth of 45° to those in the lower alignment region. Hence, in every display pattern, pixels in the row direction in a bright tone tend to provide the same tilt azimuth at an intermediate grayscale value. This configuration caused luminance difference between observation from the azimuths of the white arrow M and the white arrow O and observation from the azimuths of the white arrow L and the white arrow N.

ADDITIONAL REMARKS

One aspect of the present invention may be a liquid crystal display panel including in the following order: a first substrate including pixel electrodes; a liquid crystal layer containing liquid crystal molecules; and a second substrate including a counter electrode, the liquid crystal display panel including pixels each including at least four alignment regions of a first alignment region, a second alignment region, a third alignment region, and a fourth alignment region, the four alignment regions providing different tilt azimuths to the liquid crystal molecules, the first alignment region, the second alignment region, the third alignment region, and the fourth alignment region being arranged in the given order in a longitudinal direction of each pixel, the first alignment region and the second alignment region providing tilt azimuths approximately 180° different from each other to the liquid crystal molecules or the third alignment region and the fourth alignment region providing tilt azimuths approximately 180° different from each other to the liquid crystal molecules.

With the azimuth in a transverse direction of each pixel being defined as 0°, the first alignment region, the second alignment region, the third alignment region, and the fourth alignment region may each be an alignment region providing a tilt azimuth of approximately 45°, an alignment region providing a tilt azimuth of approximately 135°, an alignment region providing a tilt azimuth of approximately 225°, or an alignment region providing a tilt azimuth of approximately 315°.

Each pixel may have a first alignment division pattern in which the first alignment region providing a tilt azimuth of approximately 225°, the second alignment region providing a tilt azimuth of approximately 45°, the third alignment region providing a tilt azimuth of approximately 315°, and the fourth alignment region providing a tilt azimuth of approximately 135° are arranged in the given order, or a second alignment division pattern in which the first alignment region providing a tilt azimuth of approximately 315°, the second alignment region providing a tilt azimuth of approximately 135°, the third alignment region providing a tilt azimuth of approximately 225°, and the fourth alignment region providing a tilt azimuth of approximately 45° are arranged in the given order.

The liquid crystal display panel may include an alignment-stabilizing region between the first alignment region and the second alignment region and between the third alignment region and the fourth alignment region.

The liquid crystal molecules may be aligned substantially perpendicular to the first substrate and the second substrate and at a tilt in the respective tilt azimuth directions with no voltage applied to the liquid crystal layer and may be more tilted in the tilt azimuth direction upon application of voltage to the liquid crystal layer, and the liquid crystal molecules may be at a twist angle of 45° or smaller in each of the four alignment regions in a plan view of the liquid crystal display panel.

The liquid crystal molecules may be aligned substantially perpendicular to the first substrate and the second substrate and at a tilt in the respective tilt azimuth directions with no voltage applied to the liquid crystal layer and may be more tilted in the tilt azimuth direction upon application of voltage to the liquid crystal layer, and the liquid crystal molecules may be at a twist angle of approximately 0° in each of the four alignment regions in a plan view of the liquid crystal display panel.

The pixel electrodes may include a first pixel electrode configured to apply voltage to the first alignment region and the second alignment region and a second pixel electrode configured to apply voltage to the third alignment region and the fourth alignment region, the first pixel electrode and the second pixel electrode being configured to apply different voltages to the liquid crystal layer, and the liquid crystal display panel may include pixels with $|V1(k)|>|V2(k)|$ and pixels with $|V1(k)|<|V2(k)|$ in display at a grayscale value k in the range of 0 to n, where n is an integer of 2 or greater, k is $0<k<n$ and an integer of 1 or greater, $V1(k)$ is voltage applied to the liquid crystal layer by the first pixel electrode and $V2(k)$ is voltage applied to the liquid crystal layer by the second pixel electrode.

The liquid crystal display panel may include a pixel with $|V1(k)|>|V2(k)|$ resulting from application of positive voltage to the first pixel electrode and a pixel with $|V1(k)|>|V2(k)|$ resulting from application of negative voltage to the first pixel electrode, in a row or column direction, and a pixel with $|V1(k)|<|V2(k)|$ resulting from application of positive voltage to the second pixel electrode and a pixel with $|V1(k)|<|V2(k)|$ resulting from application of negative voltage to the second pixel electrode, in a row or column direction.

The first pixel electrode and the second pixel electrode may each include slits extending parallel to the respective tilt azimuths of the liquid crystal molecules in the respective alignment regions.

The pixels may be arranged next to each other, and the liquid crystal display panel may be driven by applying voltage of the same polarity to the first pixel electrode and the second pixel electrode and making adjacent pixels have different polarities from each other.

The pixels may be arranged next to each other and may constitute pixel groups of N rows×M columns where N is an integer of 1 or greater and M is an integer of 1 or greater, and the liquid crystal display panel may be driven by applying voltage of the same polarity to the first pixel electrode and the second pixel electrode and making adjacent pixel groups have different polarities from each other.

A pixel with $|V1(k)|>|V2(k)|$ may be arranged next to a pixel with $|V1(k)|>|V2(k)|$ in the column direction and next to a pixel with $|V1(k)|<|V2(k)|$ in the row direction.

The pixels in the row direction and the column direction may consecutively have the first alignment division pattern.

The pixels in the row direction and the column direction may consecutively have the second alignment division pattern.

The pixels in the row direction may consecutively have the first alignment division pattern or the second alignment division pattern, and every multiple pixels in the column direction may alternately have the first alignment division pattern and the second alignment division pattern.

The pixels with $|V1(k)|>|V2(k)|$ may be arranged consecutively in the row direction and the column direction or the pixels with |V1(k)|<|V2(k)| may be arranged consecutively in the row direction and the column direction.

The pixels in the row direction may consecutively have the first alignment division pattern or the second alignment division pattern, and the pixels in the column direction may alternately have the first alignment division pattern and the second alignment division pattern.

These features of the present invention described above may appropriately be combined within the spirit of the present invention.

REFERENCE SIGNS LIST

10: pixel
10a: first alignment region
10b: second alignment region
10c: third alignment region
10d: fourth alignment region
11, 311, 411: signal line
13, 13a, 13b: TFT
20: first polarizing plate
30: first substrate
31, 431: pixel electrode
31a: first pixel electrode
31b: second pixel electrode
33, 431: slit
40: liquid crystal layer
41, 341, 441: liquid crystal molecule
50: second substrate
51: counter electrode
60: second polarizing plate
70: alignment film
80: sealing material
100, 100A, 100B, 100C, 100D, 100E, 100F, 200A, 200B: liquid crystal display panel
300, 400: conventional 4D-RTN mode liquid crystal display panel

What is claimed is:

1. A liquid crystal display panel comprising in the following order:
a first substrate including a first pixel electrode and a second pixel electrode being electrically connected to different thin film transistors;
a liquid crystal layer containing liquid crystal molecules; and
a second substrate including a counter electrode, wherein
pixels arranged in a matrix each including at least four alignment regions of a first alignment region, a second alignment region, a third alignment region, and a fourth alignment region being arranged in the given order in a longitudinal direction of each pixel,
the four alignment regions providing different tilt azimuths to the liquid crystal molecules,
the first pixel electrode overlapping the first alignment region and the second alignment region, and the second pixel electrode overlapping the third alignment region and the fourth alignment region, and
the tilt azimuths in the four alignment regions being arranged in a same combination in a row direction, wherein
the first pixel electrode is configured to apply voltage to the first alignment region and the second alignment region, and the second pixel electrode is configured to apply voltage to the third alignment region and the fourth alignment region, the first pixel electrode and the second pixel electrode being configured to apply different voltages to the liquid crystal layer,
the liquid crystal display panel includes pixels with |V1(k)|>|V2(k)| and pixels with |V1(k)|<|V2(k)| in display at a grayscale value k in the range of 0 to n, where n is an integer of 2 or greater, k is 0<k<n and an integer of 1 or greater, V1(k) is voltage applied to the liquid crystal layer by the first pixel electrode and V2(k) is voltage applied to the liquid crystal layer by the second pixel electrode,
a pixel with |V1(k)|>|V2(k)| is arranged next to a pixel with |V1(k)|>|V2(k)| in the column direction and next to a pixel with |V1(k)|<|V2(k)| in the row direction,
the pixels in the row direction consecutively have the first alignment division pattern or the second alignment division pattern, and
every multiple pixels in the column direction alternately have the first alignment division pattern and the second alignment division pattern.

2. The liquid crystal display panel according to claim 1, wherein with the azimuth in a transverse direction of each pixel being defined as 0°, the first alignment region, the second alignment region, the third alignment region, and the fourth alignment region are each an alignment region providing a tilt azimuth of approximately 45°, an alignment region providing a tilt azimuth of approximately 135°, an alignment region providing a tilt azimuth of approximately 225°, or an alignment region providing a tilt azimuth of approximately 315°.

3. The liquid crystal display panel according to claim 2, wherein each pixel has a first alignment division pattern in which the first alignment region providing a tilt azimuth of approximately 225°, the second alignment region providing a tilt azimuth of approximately 45°, the third alignment region providing a tilt azimuth of approximately 315°, and the fourth alignment region providing a tilt azimuth of approximately 135° are arranged in the given order, or a second alignment division pattern in which the first alignment region providing a tilt azimuth of approximately 315°, the second alignment region providing a tilt azimuth of approximately 135°, the third alignment region providing a tilt azimuth of approximately 225°, and the fourth alignment region providing a tilt azimuth of approximately 45° are arranged in the given order.

4. The liquid crystal display panel according to claim 1, wherein the liquid crystal display panel includes an alignment-stabilizing region between the first alignment region and the second alignment region and between the third alignment region and the fourth alignment region.

5. The liquid crystal display panel according to claim 1, wherein
the liquid crystal molecules are aligned substantially perpendicular to the first substrate and the second substrate and at a tilt in the respective tilt azimuth directions with no voltage applied to the liquid crystal layer and are to be more tilted in the tilt azimuth direction upon application of voltage to the liquid crystal layer, and
the liquid crystal molecules are at a twist angle of 45° or smaller in each of the four alignment regions in a plan view of the liquid crystal display panel.

6. The liquid crystal display panel according to claim 5, wherein
the liquid crystal molecules are aligned substantially perpendicular to the first substrate and the second substrate and at a tilt in the respective tilt azimuth directions with no voltage applied to the liquid crystal layer and are to be more tilted in the tilt azimuth direction upon application of voltage to the liquid crystal layer, and the liquid crystal molecules are at a twist angle of approximately 0° in each of the four alignment regions in a plan view of the liquid crystal display panel.

7. The liquid crystal display panel according to claim 1, wherein the liquid crystal display panel includes:

a pixel with $|V1(k)|>|V2(k)|$ resulting from application of positive voltage to the first pixel electrode and a pixel with $|V1(k)|>|V2(k)|$ resulting from application of negative voltage to the first pixel electrode, in a row or column direction, and a pixel with $|V1(k)|<|V2(k)|$ resulting from application of positive voltage to the second pixel electrode and a pixel with $|V1(k)|<|V2(k)|$ resulting from application of negative voltage to the second pixel electrode, in a row or column direction.

8. The liquid crystal display panel according to claim 1, wherein the first pixel electrode and the second pixel electrode each include slits extending parallel to the respective tilt azimuths of the liquid crystal molecules in the respective alignment regions.

9. The liquid crystal display panel according to claim 1, wherein the pixels are arranged next to each other, and the liquid crystal display panel is driven by applying voltage of the same polarity to the first pixel electrode and the second pixel electrode and making adjacent pixels have different polarities from each other.

10. The liquid crystal display panel according to claim 1, wherein the pixels are arranged next to each other and constitute pixel groups of N rows×M columns where N is an integer of 1 or greater and M is an integer of 1 or greater, and the liquid crystal display panel is driven by applying voltage of the same polarity to the first pixel electrode and the second pixel electrode and making adjacent pixel groups have different polarities from each other.

11. The liquid crystal display panel according to claim 1, wherein the pixels in the row direction and the column direction consecutively have the first alignment division pattern.

12. The liquid crystal display panel according to claim 1, wherein the pixels in the row direction and the column direction consecutively have the second alignment division pattern.

13. The liquid crystal display panel according to claim 1, wherein the pixels with $|V1(k)|>|V2(k)|$ are arranged consecutively in the row direction and the column direction or the pixels with $|V1(k)|<|V2(k)|$ are arranged consecutively in the row direction and the column direction.

14. The liquid crystal display panel according to claim 13, wherein the pixels in the row direction consecutively have the first alignment division pattern or the second alignment division pattern, and the pixels in the column direction alternately have the first alignment division pattern and the second alignment division pattern.

* * * * *